(12) United States Patent
Haba et al.

(10) Patent No.: US 10,178,250 B2
(45) Date of Patent: Jan. 8, 2019

(54) COOPERATION SYSTEM, INFORMATION PROCESSING APPARATUS, COOPERATION METHOD AND NON-TRANSITORY COMPUTER-READABLE RECORDING MEDIUM ENCODED WITH COOPERATION PROGRAM

(71) Applicant: Konica Minolta, Inc., Chiyoda-ku, Tokyo (JP)

(72) Inventors: Shoko Haba, Toyokawa (JP); Yoichi Kurumasa, Toyokawa (JP); Kazuhiro Tomiyasu, Toyokawa (JP); Ryosuke Nishimura, Toyokawa (JP); Mie Kawabata, Toyokawa (JP); Zhenhuan Qu, Toyokawa (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 15/722,931

(22) Filed: Oct. 2, 2017

(65) Prior Publication Data
US 2018/0115660 A1 Apr. 26, 2018

(30) Foreign Application Priority Data
Oct. 21, 2016 (JP) .................................. 2016-207240

(51) Int. Cl.
*G06F 3/12* (2006.01)
*H04N 1/00* (2006.01)
(Continued)

(52) U.S. Cl.
CPC ..... *H04N 1/00307* (2013.01); *H04N 1/00411* (2013.01); *H04N 1/32767* (2013.01);
(Continued)

(58) Field of Classification Search
None
See application file for complete search history.

(56) References Cited

U.S. PATENT DOCUMENTS

| 2008/0291283 A1 | 11/2008 | Achiwa et al. |
| 2014/0078317 A1* | 3/2014 | Nakano .............. H04N 1/00411 348/207.11 |
| 2015/0378516 A1 | 12/2015 | Achiwa et al. |

FOREIGN PATENT DOCUMENTS

| JP | 2008-123476 | 5/2008 |
| JP | 2013-223137 | 10/2013 |

(Continued)

*Primary Examiner* — Dov Popovici
(74) *Attorney, Agent, or Firm* — Squire Patton Boggs (US) LLP

(57) ABSTRACT

An information processing apparatus includes a display, a position detector that detects a position in a display surface of the display and a hardware processor. The hardware processor, in response to detection of the position with which an object has been in contact, detects a portable device; establishes a communication path with the portable device; detects a continuation state based on a state of the portable device or a state of the information processing apparatus; in the case where the communication path is established with the portable device, and the portable device is detected, switches to a cooperation mode; in the case where the portable device is no longer detected, if the continuation state is detected, maintains the cooperation mode; and in the case where the portable device is no longer detected, if the continuation state is not detected, switches from the cooperation mode to the single mode.

19 Claims, 27 Drawing Sheets

(51) Int. Cl.
*H04W 76/10* (2018.01)
*H04N 1/327* (2006.01)
*H04N 1/333* (2006.01)
*G06K 15/00* (2006.01)

(52) U.S. Cl.
CPC ............ *H04N 1/333* (2013.01); *H04W 76/10* (2018.02); *H04N 2201/0039* (2013.01); *H04N 2201/0055* (2013.01); *H04N 2201/0094* (2013.01)

(56) References Cited

FOREIGN PATENT DOCUMENTS

JP   2014-186654   10/2014
JP   2015-178223   10/2015

* cited by examiner

COOPERATION SYSTEM, INFORMATION PROCESSING APPARATUS, COOPERATION METHOD AND NON-TRANSITORY COMPUTER-READABLE RECORDING MEDIUM ENCODED WITH COOPERATION PROGRAM

Japanese Patent Application No. 2016-207240 filed on Oct. 21, 2016, including description, claims, drawings, and abstract, the entire disclosure is incorporated herein by reference in its entirety.

BACKGROUND

Technological Field

The present invention relates to a cooperation system, an information processing apparatus, a cooperation method and a non-transitory computer-readable recording medium encoded with a cooperation program. In particular, the present invention relates to a cooperation system, including an information processing apparatus that executes a process in cooperation with a portable device carried by a user, the information processing apparatus, a cooperation method performed in the information processing apparatus and a non-transitory computer-readable recording medium encoded with a cooperation program.

Description of the Related Art

In recent years, a technique, for remotely operating an image processing apparatus such as an MFP (Multi Function Peripheral) by a portable device such as a smartphone or a PDA (Personal Digital Assistant) carried by a user, has been known.

For example, Japanese Patent Laid-Open No. 2008-123476discloses an image processing apparatus that determines whether an operation of pressing on a display surface of a liquid crystal panel is performed by placement of a portable information terminal on the display surface or designation made by a user with his or her finger. In the case where it is determined that the portable information terminal is placed on the display surface, only during a period in which the portable information terminal is placed on the display surface, a communication path is established between an image processing apparatus and the portable information terminal, and a process menu screen for the portable information terminal is displayed.

However, another process is sometimes executed in the portable information terminal in the case where an incoming call is received with the portable information terminal placed on the liquid crystal panel, for example. In the case where preferably selecting another process in the portable information terminal, the user sometimes operates with the portable information terminal detached from the liquid crystal panel. Therefore, there has been a problem that operations that had been input in the information processing apparatus till then become wasteful.

SUMMARY

According to one aspect of the present invention, an information processing apparatus includes a display that displays an image, a position detector that detects a position with which an object has been in contact in a display surface of the display, and a hardware processor, wherein the hardware processor, in response to detection by the position detector of the position with which the object has been in contact, detects a portable device, establishes a communication path with the portable device, detects a continuation state based on a state of the portable device or a state of the information processing apparatus, in the case where the communication path is established with the portable device, and the device detector detects the portable device, switches from a single mode to a cooperation mode, the single mode being an operation mode in which the information processing apparatus is not in cooperation with the portable device, and the cooperation mode being an operation mode in which the information processing apparatus is in cooperation with the portable device, in the case where the device detector no longer detects the portable device in the cooperation mode, if the continuation state is detected, maintains the cooperation mode, and in the case where the device detector no longer detects the portable device in the cooperation mode, if the continuation state is not detected, switches from the cooperation mode to the single mode.

According to another aspect of the present invention, an information processing apparatus includes a hardware processor, wherein the hardware processor establishes a communication path with a portable device, accepts an operation by a user, detects a continuation state based on a state of the portable device or a state of the information processing apparatus, in response to satisfaction of a cooperation start condition corresponding to the portable device, switches from a single mode to a cooperation mode, the single mode being an operation mode in which the information processing apparatus is not in cooperation with the portable device, and the cooperation mode being an operation mode in which the information processing apparatus is in cooperation with the portable device, in response to satisfaction of a predetermined cooperation end condition for ending the cooperation mode, switches from the cooperation mode to the single mode, in the cooperation mode, sets a device-side setting value used for execution of a device-side process defined as a process, executed by the information processing apparatus, of a cooperation process defining a series of a plurality of processes executed by the information processing apparatus and the portable device that are in cooperation with each other, in the single mode, sets a device single setting value used for execution of a device single process different from the device-side process in accordance with an accepted operation, in the cooperation mode, executes the device-side process in accordance with the device-side setting value in cooperation with the portable device, in the single mode, executes the device single process in accordance with the device single setting value, in the case where the cooperation end condition includes disconnection of a communication path established with the portable device, and the continuation state is detected in a stage where the operation mode is switched from the cooperation mode to the single mode, in response to the disconnection of the communication path established with the portable device, stores the device-side setting value set in association with the portable device, in the case where the operation mode is switched from the single mode to the cooperation mode, if the device-side setting value associated with the portable device is stored, restarts setting of the device-side setting value associated with the portable device, and in the case where the operation mode is switched from the single mode to the cooperation mode, if the device-side setting value associated with the portable device is not stored, sets a device-side setting value from its beginning.

According to yet another aspect of the present invention, a cooperation system includes the above-mentioned information processing apparatus and a portable device carried by a user, and the portable device includes a portable-side hardware processor, wherein the portable-side hardware processor accepts an operation by the user, in accordance with the accepted operation, sets a portable-side setting value used for execution of a portable-side process defined as a process, executed by the portable device, of the cooperation process, or a portable single setting value used for execution of a portable single process other than the portable-side process, in the case where the information processing apparatus is in any one of the single mode and the cooperation mode, executes the portable single process, and in the case where the information processing apparatus is in the cooperation mode, executes the portable-side process in cooperation with the information processing apparatus.

According to yet another aspect of the prevent invention, a cooperation method is performed in an information processing apparatus, and the information processing apparatus includes a display that displays an image, and a position detector that detects a position with which an object has been in contact in a display surface of the display, and the cooperation method causes the information processing apparatus to, in response to detection by the position detector of the position with which the object has been in contact, detect a portable device, establish a communication path with the portable device, detect a continuation state based on a state of the portable device or a state of the information processing apparatus, in the case where the communication path is established with the portable device, and the portable device is detected, switch from a single mode to a cooperation mode, the single mode being an operation mode in which the information processing apparatus is not in cooperation with the portable device, and the cooperation mode being an operation mode in which the information processing apparatus is in cooperation with the portable device, in the case where the portable device is no longer detected during the cooperation mode, if the continuation state is detected, maintain the cooperation mode, and in the case where the portable device is no longer detected during the cooperation mode, if the continuation state is not detected, switch from the cooperation mode to the single mode.

According to yet another aspect of the prevent invention, a cooperation method causes the information processing apparatus to establish a communication path with a portable device, accept an operation by a user, detect a continuation state based on a state of the portable device or a state of the information processing apparatus, in response to satisfaction of a cooperation start condition corresponding to the portable device, switch from a single mode to a cooperation mode, the single mode being an operation mode in which the information processing apparatus is not in cooperation with the portable device, and the cooperation mode being an operation mode in which the information processing apparatus is in cooperation with the portable device, in response to satisfaction of a predetermined cooperation end condition for ending the cooperation mode, switch from the cooperation mode to the single mode, in the cooperation mode, set a device-side setting value used for execution of a device-side process defined as a process, executed by the information processing apparatus, of a cooperation process defining a series of a plurality of processes executed by the information processing apparatus and the portable device that are in cooperation with each other, and in the single mode, set a device single setting value used for execution of a device single process different from the device-side process in accordance with an accepted operation, in the cooperation mode, execute the device-side process in accordance with the device-side setting value in cooperation with the portable device, in the single mode, execute the device single process in accordance with the device single setting value, in the case where the cooperation end condition includes disconnection of a communication path established with the portable device, and the continuation state is detected in a stage where the operation mode is switched from the cooperation mode to the single mode in response to the disconnection of the communication path established with the portable device, store the device-side setting value set in association with the portable device, in the case where the operation mode is switched from the single mode to the cooperation mode if the device-side setting value associated with the portable device is stored, restart setting of the device-side setting value associated with the portable device, and in the case where the operation mode is switched from the single mode to the cooperation mode, if the device-side setting value associated with the portable device is not stored, set a device-side setting value from its beginning.

According to yet another aspect of the prevent invention, a non-transitory computer-readable recording medium is encoded with a cooperation program, wherein the cooperation program causes a computer, which controls an information processing apparatus, to perform the above-mentioned cooperation method.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DESCRIPTION OF THE PREFERRED EMBODIMENTS

Figure 1:
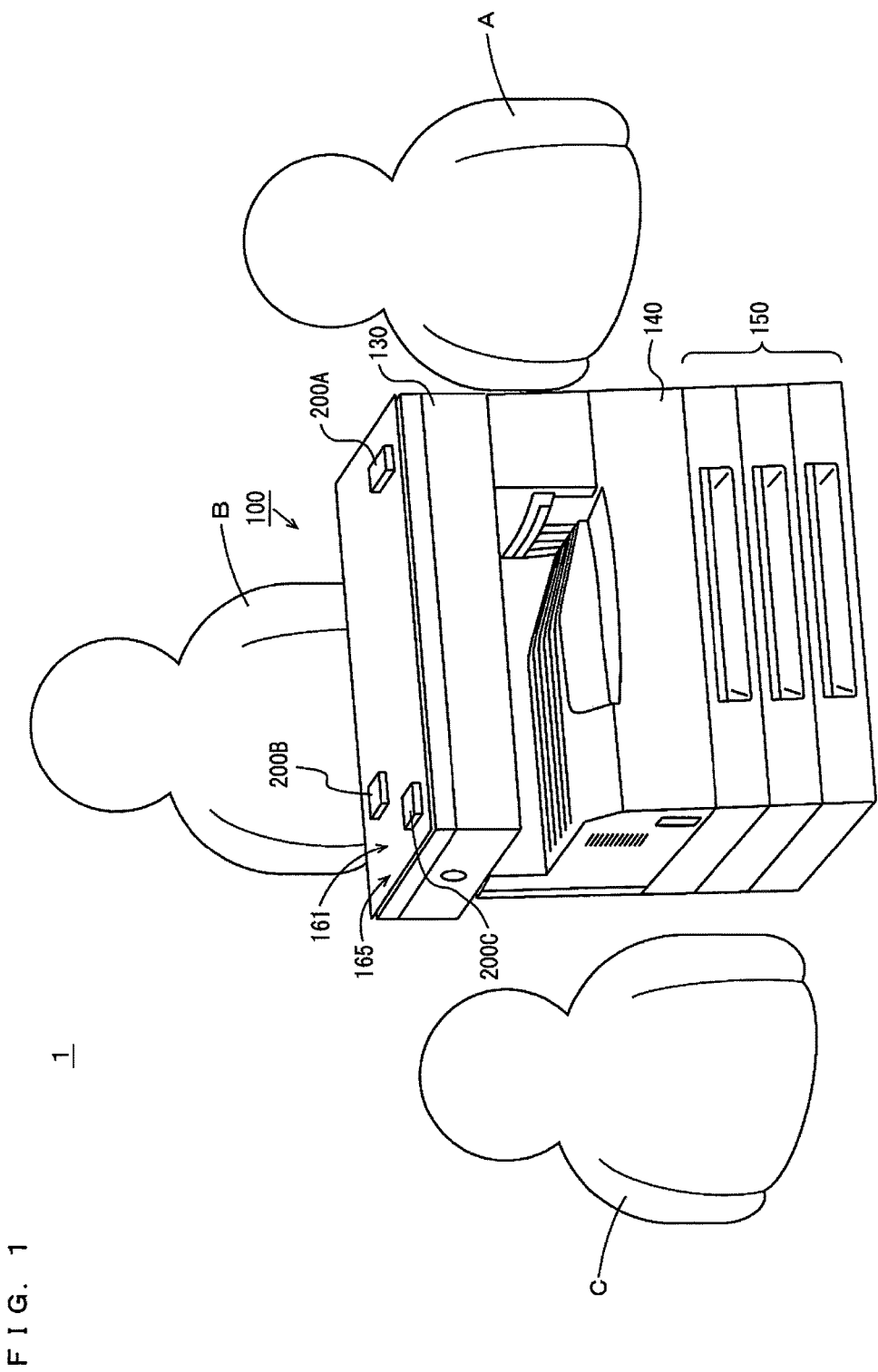
FIG. 1 is a diagram showing one example of an overview of a cooperation system in embodiments of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

<First Embodiment>

FIG. 1 is a diagram showing one example of an overview of a cooperation system in embodiments of the present invention. Referring to FIG. 1, the cooperation system 1 includes an MFP (Multi Function Peripheral) 100 and smartphones 200A, 200B, 200C. The case where the three users A, B and C carry the smartphones 200A, 200B, 200C, respectively and simultaneously operate the MFP 100 is described here as an example.

While the case where the three users A, B and C simultaneously operate the MFP 100 is described here as an example, the number of users is not limited. One or more users may operate the MFP 100.

The MFP 100 is one example of an information processing apparatus and includes a display unit 161, a touch panel 165, a document scanning unit 130 for scanning a document, an image forming unit 140 for forming an image on a sheet of paper or other medium based on data, and a paper feed unit 150 for supplying sheets of paper to the image forming unit 140. The display unit 161 is a display device such as an LCD (Liquid Crystal Display) or an organic ELD (Electro-Luminescence Display). The display unit 161 is provided on an upper surface of a main body of the MFP 100. The touch panel 165 is provided on an upper surface or a lower surface of the display unit 161 in a superimposed manner, and detects a position with which an object has been in contact in the display surface of the display unit 161. The touch panel 165 is a multi-touch-supporting touch panel. Therefore, in the case where objects come into contact with a plurality of positions in the display surface of the display unit 161, the touch panel 165 can detect the plurality of positions with which the objects have been in contact. In addition to fingers of the users, the objects that are described here include the smartphones 200A, 200B, 200C.

The touch panel 165 may be one touch panel or the combination of a plurality of touch panels. In the case where the touch panel 165 is the combination of the plurality of touch panels, the display surface of the display unit 161 may be divided into a plurality of regions, and the plurality of touch panels may respectively correspond to the plurality of regions, for example. The touch panel 165 may be of any type, for example, a resistive type, a surface acoustic wave type, an infrared type, an electromagnetic type, or a capacitive type.

The three users A, B and C are respectively positioned around of the MFP 100. The MFP 100 can be used for a conference, which the users A, B and C attend. Because being respectively positioned around the MFP 100, the users A, B and C can view the entire display surface of the display unit 161. Therefore, if the data that has been prepared for the conference is stored in the MFP 100 in advance and so on, and the data is displayed in the display unit 161, the users A, B and C can simultaneously view the same data. Further, the touch panel 165 of the MFP 100 is used as an input device by the users A, B and C for operating the MFP 100. For example, in the case where an application program for editing a document is installed in the MFP 100, the touch panel 165 may be used as a keyboard, and a document may be created by the MFP 100.

Each of the smartphones 200A, 200B, 200C is one example of a portable device, and carried and used by each of the users A, B and C. The users A, B and C have placed the smartphones 200A, 200B, 200C on the display surface of the display unit 161. Therefore, each of the smartphones 200A, 200B, 200C is arranged in the vicinity of the side close to the position of each of the users A, B and C on the display surface of the display unit 161. In this case, because the touch panel 165 detects each of the smartphones 200A, 200B, 200C, the MFP 100 can detect a position of each of the smartphones 200A, 200B, 200C.

Each of the MFP 100 and the smartphones 200A, 200B, 200C has a short-range wireless communication function, and can establish a one-to-one correspondence with another party for communication in the case where his or her device is within a predetermined range. Further, each of the MFP 100 and the smartphones 200A, 200B, 200C has a wireless LAN function, and can communicate with a radio base station connected to a network. The radio base station is a relay device of the network, communicates with the MFP 100 and the smartphones 200A, 200B, 200C and connect each of the MFP 100 and the smartphones 200A, 200B, 200C to the network. Therefore, the MFP 100 and the smartphones 200A, 200B, 200C can communicate with one another through the network by communicating with the radio base station. The network may further be connected to the Internet. In this case, the MFP 100 and the smartphones 200A, 200B, 200C can respectively communicate with a computer connected to the Internet. The network is a Local Area Network (LAN), for example, either wired or wireless. The network is not limited to a LAN and may be a network such as a PSTN (Public Switched Telephone Networks). Further, the network may be a Wide Area Network (WAN) such as the Internet.

In the cooperation system 1 in the present embodiment, any one of the smartphones 200A, 200B, 200C can execute a cooperation process in cooperation with the MFP 100. For example, the smartphone 200A and the MFP 100 communicate using a short-range communication function or a wireless LAN function, and execute the cooperation process in cooperation with each other. The cooperation process defines a series of a plurality of processes. The series of the plurality of processes defined by the cooperation process include a device-side process executed in the MFP 100 and a portable-side process executed in the smartphone 200A. For example, in the case where a cooperation process, which defines a process of selecting data as a portable-side process, and defines a process of forming an image as a device-side process, is executed in the MFP 100 and the smartphone 200A, the MFP 100 forms an image of the data stored in the smartphone 200A and selected by the user A who operates the smartphone 200A on a sheet of paper in accordance with an image forming condition set by the user A who operates the MFP 100. Further, in the case where a process of selecting data is defined as a device-side process, and a process of transmitting data is defined as a portable-side process, a cooperation process executed in the MFP 100 and the smartphone 200A is a process of transmitting the data by the smartphone 200A in accordance with a transmission condition, the data being stored in the MFP 100 and selected by the user A who operates the MFP 100, and the transmission condition being set by the user A who operates the smartphone 200A. The transmission condition is determined when a destination is selected by the user from an address book stored in the smartphone 200A, and a transmission method is selected by the user, for example.

Each of the smartphones 200A, 200B, 200C is described as one example of the portable device carried by a user. However, if a device can be carried by the user, the portable device may be a PDA (Personal Digital Assistant) and the like.

Figure 2:
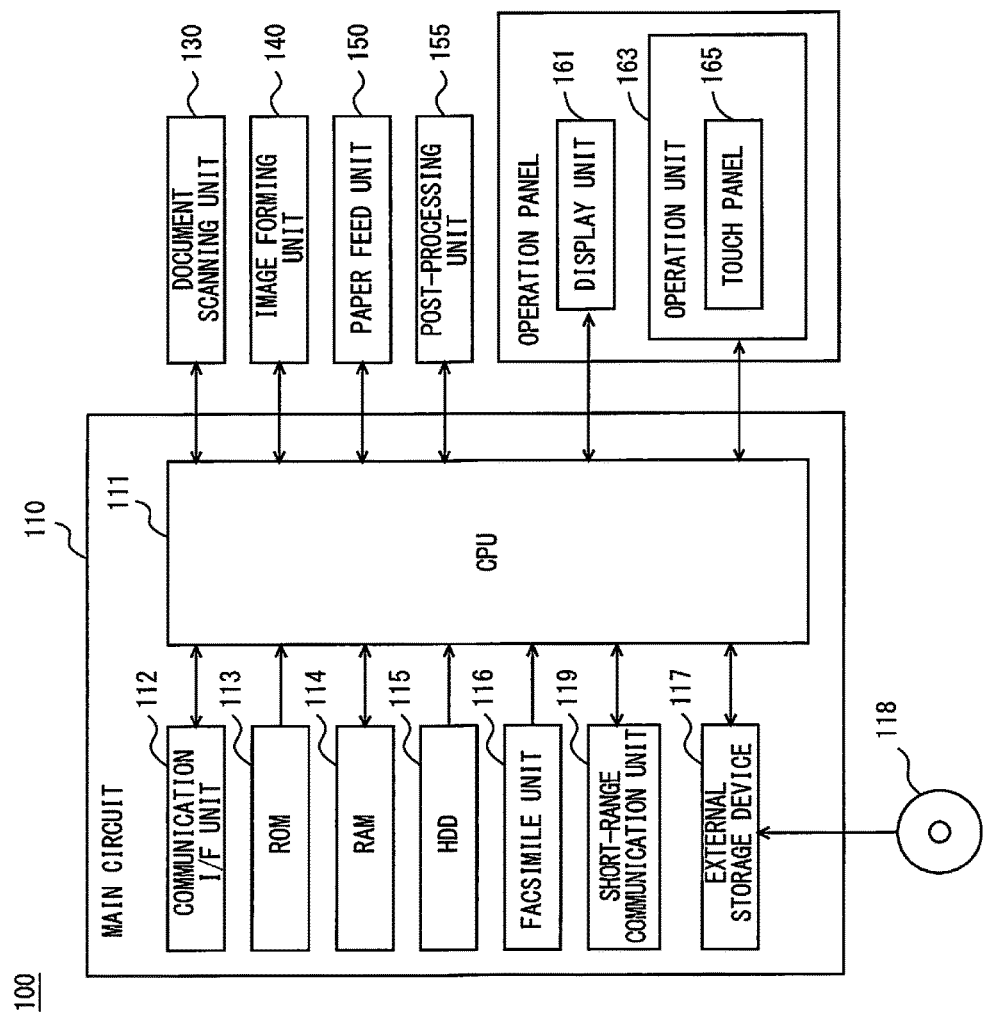
FIG. 2 is a block diagram showing one example of a hardware configuration of an MFP in a first embodiment.

FIG. 2 is a block diagram showing one example of a hardware configuration of the MFP in the first embodiment. Referring to FIG. 2, the MFP 100 includes a main circuit 110, a document scanning unit 130, an image forming unit 140, a paper feed unit 150, a display unit 161 and a touch panel 165.

The main circuit 110 includes a CPU 111, a communication interface (I/F) unit 112, a ROM 113, a RAM 114, a hard disk drive (HDD) 115 used as a mass storage, a facsimile unit 116, an external storage device 117 on which a CD-ROM 118 is mounted, and a short-range communication unit 119. The CPU 111 is connected to the document scanning unit 130, the image forming unit 140, the paper feed unit 150, the display unit 161 and the touch panel 165, and controls the entire MFP 100.

The ROM 113 stores a program executed by the CPU 111 or data necessary for execution of the program. The RAM 114 is used as a work area when the CPU 111 executes the program. Further, the RAM 114 temporarily stores scan data (image data) successively transmitted from the document scanning unit 130.

The communication I/F unit 112 is an interface for connecting the MFP 100 to the network. The CPU 111 communicates with each of the smartphones 200A, 200B, 200C via the communication I/F unit 112 for transmitting and receiving data. Further, the communication I/F unit 112 can communicate with a computer connected to the Internet via the radio base station and the network.

The short-range communication unit 119 wirelessly communicates with the smartphones 200A, 200B, 200C on the basis of a GAP (Generic Access Profile) of the Bluetooth (registered trademark) standard or the like. When a distance from the smartphone 200A is equal to or less than a communicable distance, the short-range communication unit 119 communicates with the smartphone 200A. The communicable distance for the short-range communication unit 119 is several meters. Further, the short-range communication unit 119 may communicate using a short-range wireless communication system called NFC (Near Field Communication). In this case, a communicable distance for the short-range communication unit 119 is several tens of centimeters.

The facsimile unit 116 is connected to the public switched telephone network (PSTN) and transmits facsimile data to or receives facsimile data from the PSTN. The facsimile unit 116 stores the received facsimile data in the HDD 115 or outputs the received facsimile data to the image forming unit 140. The image forming unit 140 prints the facsimile data received from the facsimile unit 116 on a sheet of paper. Further, the facsimile unit 116 converts the data stored in the HDD 115 into facsimile data, and transmits the facsimile data to a facsimile machine connected to the PSTN.

The external storage device 117 is mounted with the CD-ROM 118. The CPU 111 can access the CD-ROM 118 via the external storage device 117. The CPU 111 loads a program, recorded in the CD-ROM 118 which is mounted on the external storage device 117, into the RAM 114 for execution. It is noted that the medium for storing the program executed by the CPU 111 is not limited to the CD-ROM 118. It may be an optical disc (MO (Magnetic Optical Disc)/MD (Mini Disc)/DVD (Digital Versatile Disc)), an IC card, an optical card, and a semiconductor memory such as a mask ROM, an EPROM (Erasable Programmable ROM) and an EEPROM (Electrically EPROM).

Further, the program executed by the CPU 111 is not limited to the program recorded in the CD-ROM 118, and CPU 111 may load a program, stored in the HDD 115, into RAM 114 for execution. In this case, another computer connected to the network may rewrite the program stored in the HDD 115 of the MFP 100, or may additionally write a new program therein. Further, the MFP 100 may download a program from another computer connected to the network, and store the program in the HDD 115. The program referred to here includes not only a program directly executable by the CPU 111 but also a source program, a compressed program, an encrypted program or the like.

The basic hardware configuration and functions of the smartphones 200A, 200B, 200C are the same. Therefore, the smartphone 200A is described here as an example.

Figure 3:
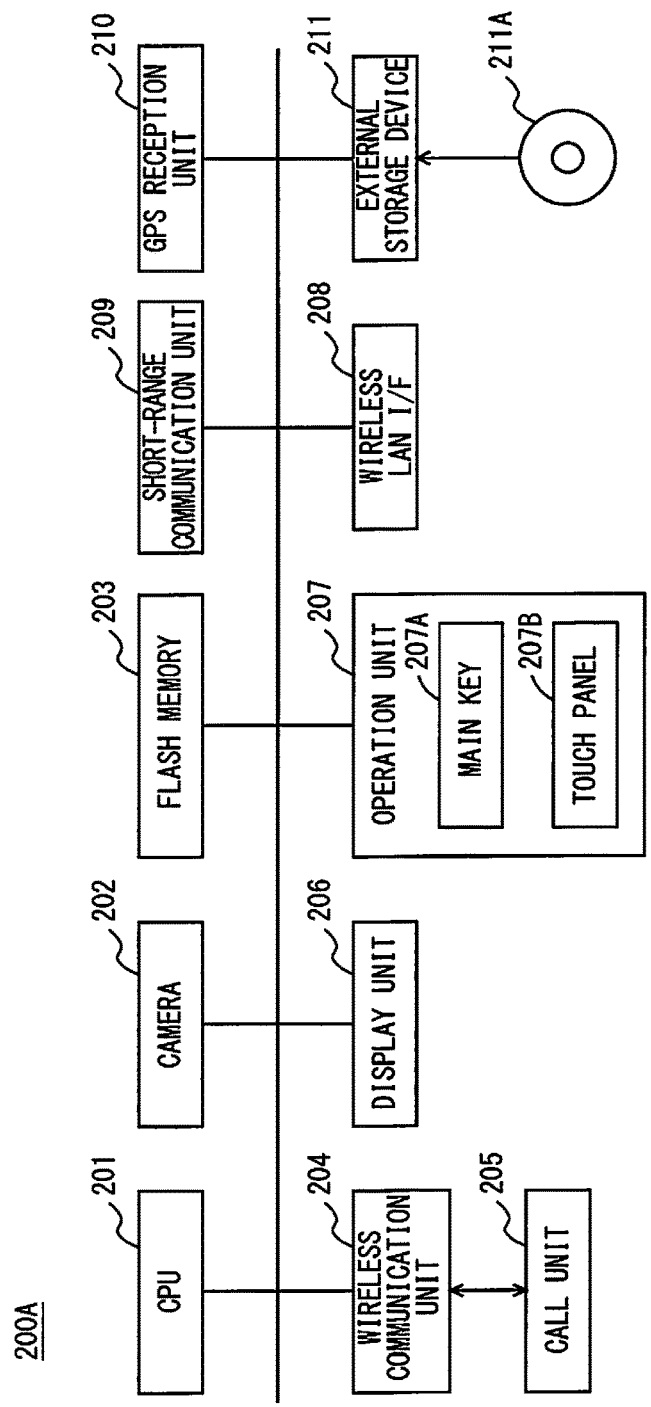
FIG. 3 is a block diagram showing an outline of a hardware configuration of a smartphone in the first embodiment.

FIG. 3 is a block diagram showing an outline of the hardware configuration of the smartphone in the first embodiment. Referring to FIG. 3, the smartphone 200A in the present embodiment includes a CPU 201 for controlling the entire smartphone 200A, a camera 202, a flash memory 203 for storing data in a non-volatile manner, a radio communication unit 204 connected to a call unit 205, a display unit 206 for displaying information, an operation unit 207 for accepting an operation by the user, a wireless LAN I/F 208, a short-range communication unit 209, a GPS reception unit 210 and an external storage device 211.

The display unit 206 is a display device such as a Liquid Crystal Display (LCD) and an organic ELD, and displays instruction menus to users, information about the acquired image data, and other information. The operation unit 207 includes a main key 207A and a touch panel 207B. Further, in the case where the user designates a position in the display surface of the display unit 206, the operation unit 207 outputs a position on the display surface detected by the touch panel 207B to the CPU 201. The CPU 201 detects the position, designated by the user, in a screen displayed in the display unit 206 based on the position detected by the touch panel 207B. The CPU 201 accepts input of a variety of instructions and data such as characters and numerals through the operation by the user based on the screen displayed in the display unit 206 and the positions detected by the touch panel 207B. For example, in the case where a screen including an image of ten keys is displayed in the display unit 206, the CPU 201 accepts a numeral corresponding to a key displayed at a position detected by the touch panel 207B.

The camera 202 includes a lens and a photoelectric transducer, light collected by the lens is imaged on the photoelectric transducer, and the photoelectric transducer photoelectrically converts the received light into image data for output to the CPU 201. The photoelectric transducer may be a CMOS (Complementary Metal Oxide Semiconductor) sensor, a CCD (Charge Coupled Device) and the like.

The radio communication unit 204 communicates by radio with the mobile phone base station connected to a telephone communication network. The radio communication unit 204 connects the smartphone 200A to the telephone communication network to enable a call using the call unit 205. The radio communication unit 204 decodes a voice signal obtained by demodulating a radio signal received from the mobile phone base station and outputs the decoded signal to the call unit 205. Further, the radio communication unit 204 encodes voice input from the call unit 205 and transmits the encoded signal to the mobile phone base station. The call unit 205 includes a microphone and a speaker. The voice input from the radio communication unit 204 is output from the speaker, and the voice input from the microphone is output to the radio communication unit 204. Further, the radio communication unit 204 is controlled by the CPU 201 and connects the smartphone 200A to an email server to transmit and receive emails.

The wireless LAN I/F 208 is an interface for communicating with the radio station connected to the network and connecting the smartphone 200A to the network. An IP (Internet Protocol) address of the MFP 100 is registered in the smartphone 200A, so that the smartphone 200A can communicate with the MFP 100 and transmit and receive data.

The short-range communication unit 209 wirelessly communicates with another device, for example, the MFP 100, on the basis of a GAP of the Bluetooth (registered trademark) standard and the like. When a distance from the MFP 100 is equal to or less than a communicable distance, for example, the short-range communication unit 209 communicates with the MFP 100. The communicable distance for the short-range communication unit 209 is several meters. Further, the short-range communication unit 209 may communicate using a short-range wireless communication system called NFC. In this case, the communicable distance for the short-range communication unit 209 is several tens of centimeters.

The GPS reception unit 210 receives a signal transmitted from a GPS (Global Positioning System) satellite and detects a current position based on the received signal. The current position is indicated by latitude and longitude, for example. The GPS reception unit 210 outputs the detected current position to the CPU 201.

The flash memory 203 stores a program executed by the CPU 201, or data required for execution of the program. The CPU 201 loads a program recorded in the flash memory 203 into the RAM included in the CPU 201 for execution.

The external storage device 211 is attachable to and detachable from the smartphone 200A, and can be mounted with a CD-ROM 211A that stores a remote operation program. The CPU 201 can access the CD-ROM 211A via the external storage device 211. The CPU 201 can load the remote operation program recorded in the CD-ROM 211A mounted on the external storage device 211 into the RAM included in the CPU 201 for execution.

While the program recorded in the flash memory 203 or the CD-ROM 211A is described as the program executed by the CPU 201, another computer connected to the network may rewrite the program stored in the flash memory 203, or may additionally write a new program therein. Further, the smartphone 200A may download a program from another computer connected to the network. The program referred to here includes not only a program directly executable by the CPU 201 but also a source program, a compressed program, an encrypted program or the like.

The program executed by CPU 201 can be stored not only in CD-ROM 211A but also in other medium such as an optical disk (MO/MD/DVD), an IC card, an optical card, and a semiconductor memory such as a mask ROM, an EPROM and an EEPROM.

Figure 4:
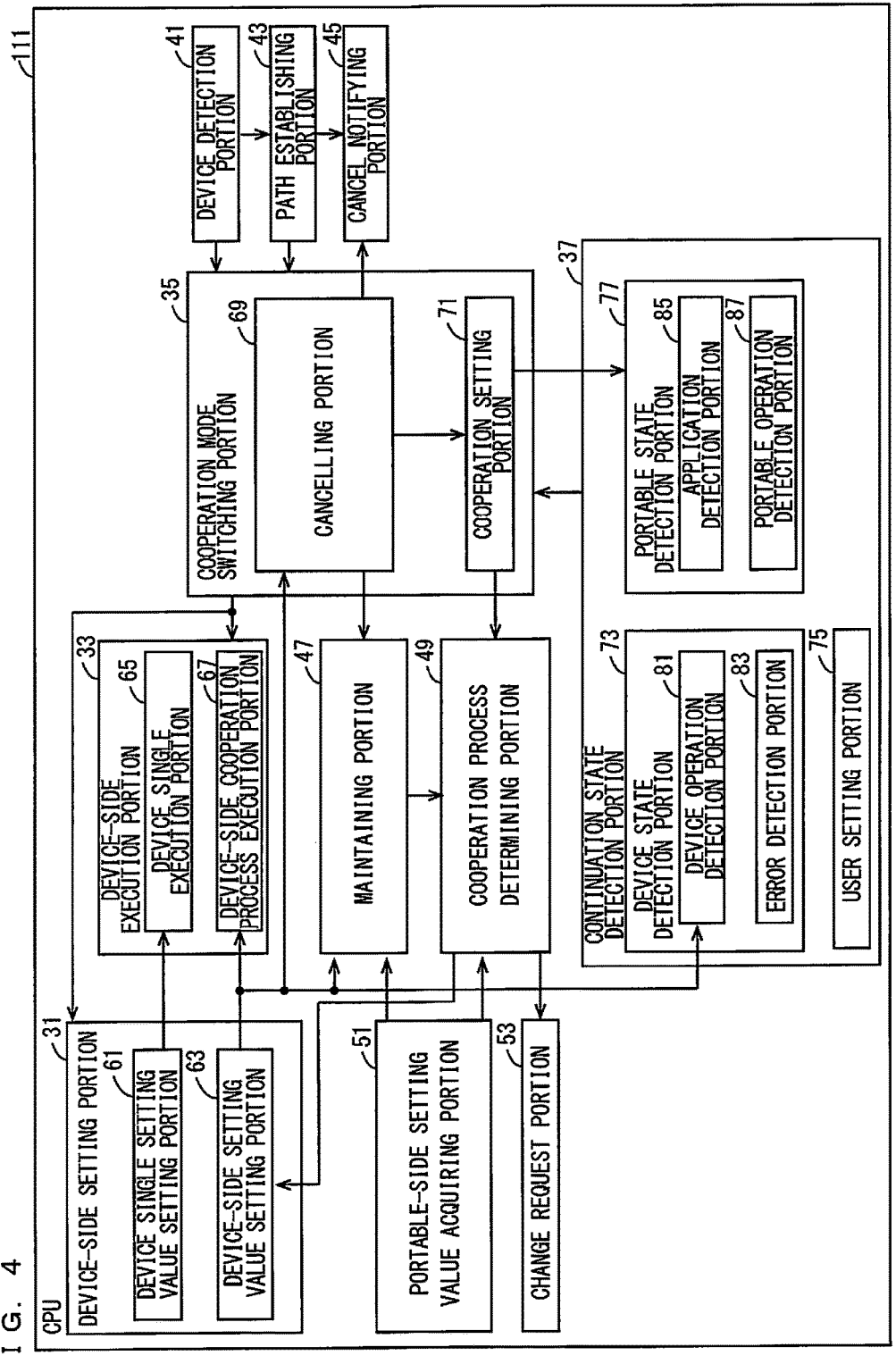
FIG. 4 is a block diagram showing one example of functions of a CPU included in the MFP in the first embodiment.

FIG. 4 is a block diagram showing one example of functions of the CPU included in the MFP in the first embodiment. The functions shown in FIG. 4 are formed in the CPU 111 in the case where the CPU 111 included in the MFP 100 executes a cooperation program stored in the ROM 113, the HDD 115 or the CD-ROM 118.

Referring to FIG. 4, the CPU 111 included in the MFP 100 includes a device-side setting portion 31, a device-side execution portion 33, a cooperation mode switching portion 35, a continuation state detection portion 37, a device detection portion 41, a path establishing portion 43, a cancel notifying portion 45, a maintaining portion 47, a cooperation process determining portion 49, a portable-side setting value acquiring portion 51 and a change request portion 53.

The device detection portion 41 controls the touch panel 165 and the short-range communication unit 119. In the case where any one of the smartphones 200A, 200B, 200C is placed on the display surface of the display unit 161, the device detection portion 41 detects the device. For example, in the case where any one of the smartphones 200A, 200B, 200C, for example, the smartphone 200A, is placed on the display surface of the display unit 161, the touch panel 165 detects a position at which the smartphone 200A is placed in the display surface of the display unit 161. Because an area, with which the smartphone 200A comes into contact in the display surface of the display unit 161, is larger than an area of a finger of the user, an upper limit of the area of the finger of the user is defined in advance as a threshold value. Then, in the case where an area of a press detected by the touch panel 165 is equal to or larger than the threshold value, the device detection portion 41 determines that the smartphone 200A is placed. In the case where an area of the press detected by the touch panel 165 is smaller than the threshold value, the device detection portion 41 detects the designation made by the user with his or her finger.

In response to detection by the touch panel 165 of a position at which the smartphone 200A is placed, the device detection portion 41 controls the short-range communication unit 119 and allows the short-range communication unit 119 to transmit a search command for searching a device present nearby. In the case where receiving the search command, each of the smartphones 200A, 200B, 200C returns a response command including device identification information for identifying itself. A network address assigned in the network can be used as the device identification information. The network address includes an IP address (Internet Protocol) address and an MAC (Media Access Control) address, for example. In the case where being placed on the display surface of the display unit 161, the smartphone 200A receives a search command, thereby returning a response command. The device detection portion 41 receives the response command returned by the smartphone 200A, thereby detecting that the device placed at the position detected by the touch panel 165 earlier is the smartphone 200A. In the case where detecting the smartphone 200A, the device detection portion 41 registers the smartphone 200A as a cooperation device. Specifically, the device detection portion 41 stores cooperation device information, including a set of the device identification information of the smartphone 200A and the position information indicating the position at which the smartphone 200A is placed, in the RAM 114, and outputs a cooperation instruction to the cooperation mode switching portion 35 and the path establishing portion 43. The cooperation instruction includes the device identification information included in the cooperation device information stored in the RAM 114.

In the case where the position, specified by the position information that makes a set with the device identification information of the smartphone 200A, is no longer detected by the touch panel 165, the device detection portion 41 determines that the smartphone 200A has been detached from the display surface of the display unit 161 and deletes the smartphone 200A from a set of cooperation devices. Specifically, the device detection portion 41 deletes the set of the device identification information of the smartphone 200A and the position information stored in the RAM 114, and outputs a detachment signal including the device identification information of the smartphone 200A to the cooperation mode switching portion 35.

In the case where controlling the short-range communication unit 119 and allowing the short-range communication unit 119 to transmit a search command in response to the detection by the touch panel 165 of the position at which the smartphone 200A is placed, the device detection portion 41 sometimes receives response commands from the smartphones 200B, 200C in addition to the response command received from the smartphone 200A. In this case, the device detection portion 41 excludes a response command, including device identification information included in below-mentioned exclusion device information, among the plurality of response commands from a set of target commands. Further, the device detection portion 41 determines a response command, including the device identification information that is not any of the device identification information stored in the RAM 114, among target response commands, as a target command. In the case where one response command is determined as a target command, the device detection portion 41 determines that the device specified by the device identification information included in the response command is placed at the position detected by the touch panel 165.

A plurality of response commands are sometimes determined as target commands by the device detection portion 41. For example, it includes the case where the other user B is present near the MFP 100 while carrying the smartphone 200B without placing the smartphone 200B on the display surface of the display unit 161. In this case, the device detection portion 41 controls the display unit 161, and allows the display unit 161 to display an inquiry screen, in which a plurality of pieces of device identification information respectively included in the plurality of response commands can be selected, in the vicinity of the position detected by the touch panel 165. If the user who carries the smartphone 200A selects the device identification information of the smartphone 200A in accordance with the inquiry screen, the device detection portion 41 determines that the device placed at the position detected earlier by the touch panel 165 is the smartphone 200A, stores the cooperation device information, including a set of the device identification information of the smartphone 200A and the position information indicating the position at which the smartphone 200A is placed, in the RAM 114, and stores the device identification information that has not been selected in the RAM 114 as the exclusion device information.

The device detection portion 41 may perform authentication of the user before storing the cooperation device information in the RAM 114. For example, the user identification information of the user who is authorized to use the MFP 100, and the authentication information associated with the device identification information of the device assigned to the user are stored in the HDD 115 in advance. Then, in the case where the authentication information including the device identification information included in the cooperation device information is stored in the HDD 115, the device detection portion 41 stores the cooperation device information in the RAM 114. Further, in the case where the authentication information including the device identification information included in the cooperation device information is not stored in the HDD 115, the device detection portion 41 does not store the cooperation device information in the RAM 114, and stores the device identification information included in the cooperation device information in the RAM 114 as the exclusion device information. Thus, only the users who are registered in the MFP 100 in advance can use the MFP 100.

The path establishing portion 43 controls the short-range communication unit 119, negotiates with the device specified by the device identification information included in the cooperation instruction, and establishes a communication path. For example, in the case where the smartphone 200A is placed on the display surface of the display unit 161 by the user A, the smartphone 200A is detected by the device detection portion 41. Thus, the path establishing portion 43 establishes a communication path with the smartphone 200A. When the communication path to the smartphone 200A is established, the path establishing portion 43 outputs a set of the device identification information of the smartphone 200A and path identification information for identifying the communication path to the cooperation mode switching portion 35 and the cancel notifying portion 45. In the case where the established communication path is disconnected, the path establishing portion 43 outputs a disconnection signal including the path identification information of the disconnected communication path to the cooperation mode switching portion 35. The communication path is disconnected in the case where the smartphone 200A is moved to the outside of a communicable range of the short-range communication unit 119, and the case where the smartphone 200A disconnects the communication path, for example. The path establishing portion 43 may control the communication I/F unit 112 and establish a communication path with the smartphone 200A.

In the case where the short-range communication unit 119 communicates using a communication system of NFC, the user A may place the smartphone 200A on the display surface of the display unit 161 after bringing the smartphone 200A close to an antenna of the short-range communication unit 119. In this case, the device detection portion 41 controls the short-range communication unit 119 and the touch panel 165, and the short-range communication unit 119 detects the smartphone 200A, and the communication path is established. Thereafter, the device detection portion 41 detects a position at which the smartphone 200A is placed by the touch panel 165 in a predetermined time period.

The cooperation mode switching portion 35 switches an operation mode to any one of a single mode and a cooperation mode. The cooperation mode switching portion 35 switches operation modes for each of the smartphones 200A, 200B, 200C. In the first embodiment, because a plurality of users operate the MFP 100 simultaneously, the operation modes are switched for each user. The operation mode of the MFP 100 sometimes differs depending on the user. Therefore, the cooperation mode switching portion 35 determines the operation mode corresponding to the device identification information. For example, the cooperation mode switching portion 35 switches the operation mode of the smartphone 200A to one of the cooperation mode and the single mode, the cooperation mode being a mode in which the MFP 100 operates in cooperation with the smartphone 200A, and the single mode being a mode in which the MFP 100 operates alone without being in cooperation with the smartphone 200A. The cooperation mode switching portion 35 outputs the device identification information, and an operation mode signal indicating the operation mode, that is, one of the single mode and the cooperation mode, to the device-side setting portion 31, the device-side execution portion 33 and the continuation state detection portion 37.

The cooperation mode switching portion 35 includes a cooperation setting portion 71 and a canceling portion 69. The cooperation setting portion 71 switches the operation mode from the single mode to the cooperation mode, and the canceling portion 69 switches the operation mode from the cooperation mode to the single mode. In response to reception of a cooperation instruction from the device detection portion 41, and reception of a set of the device identification information that is the same as the device identification information included in the cooperation instruction and the path identification information from the path establishing portion 43, the cooperation setting portion 71 switches the operation mode corresponding to the device identification information from the single mode to the cooperation mode.

In the case where receiving a detachment signal, if not receiving a continuation signal indicating the continuation state from the continuation state detection portion 37, described below, the canceling portion 69 switches the operation mode from the cooperation mode to the single mode. The continuation signal includes the device identification information of any one of the smartphones 200A, 200B, 200C. In the case where receiving the detachment signal, if not receiving the continuation signal including the device identification information that is the same as the device identification information included in the detachment signal, the canceling portion 69 switches the operation mode corresponding to the device identification information included in the detachment signal from the cooperation mode to the single mode. In the case where receiving the detachment signal from the device detection portion 41, if receiving the continuation signal including the device identification information that is the same as the device identification information included in the detachment signal, the canceling portion 69 does not switch the operation mode corresponding to the device identification information included in the detachment signal from the cooperation mode to the single mode, and maintains the cooperation mode.

In the case where the canceling portion 69 receives a detachment signal from the device detection portion 41 and maintains the cooperation mode, when the short-range communication unit 119 can no longer communicate with the smartphone 200A, the canceling portion 69 switches the operation mode from the cooperation mode to the single mode, and outputs a maintaining instruction to the maintaining portion 47 and the cooperation setting portion 71. Specifically, in the case where receiving the detachment signal from the device detection portion 41 and maintaining the cooperation mode, and then receiving a disconnection signal including the device identification information that is the same as the device identification information included in the detachment signal from the path establishing portion 43, the canceling portion 69 switches the operation mode corresponding to the device identification information included in the disconnection signal from the cooperation mode to the signal mode, and outputs a maintaining instruction to the maintaining portion 47 and the cooperation setting portion 71. The maintaining instruction includes the device identification information included in the disconnection signal.

The canceling portion 69 sometimes receives a cooperation end instruction from a device-side setting value setting portion 63, described below. While details of the cooperation end instruction will be described below, the cooperation end instruction is output by the device-side setting value setting portion 63 in the case where the user A gives an instruction to end the cooperation process, and includes the device identification information of the smartphone 200A carried by the user A. In the case where receiving the cooperation end instruction from the device-side setting value setting portion 63, the canceling portion 69 switches the operation mode corresponding to the device identification information included in the cooperation end instruction from the cooperation mode to the single mode, and outputs an end notifying instruction to the cancel notifying portion 45. The end notifying instruction includes the device identification information included in the cooperation end instruction.

In response to reception of the end notifying instruction, the cancel notifying portion 45 specifies the path identification information that makes a set with the device identification information included in the end notifying instruction with reference to a set of the device identification information and the path identification information received from the path establishing portion 43, and notifies the smartphone 200A of the end of the cooperation process through the specified communication path identified by the path identification information. Thus, the user A can operate the MFP 100 and end the cooperation between the MFP 100 and the smartphone 200A, and confirm the end of the cooperation by using the smartphone 200A.

In the case where receiving a maintaining instruction from the canceling portion 69, and then receiving a cooperation instruction including the device identification information that is the same as the device identification information included in the maintaining instruction from the device detection portion 41, the cooperation setting portion 71 determines that the connection path between the MFP 100 and the smartphone 200A is to be reconnected. In the case where determining that the connection path between the MFP 100 and the smartphone 200A is to be reconnected, in response to reception of a set of the device identification information that is the same as the device identification information included in the cooperation instruction, and the path identification information from the path establishing portion 43, the cooperation setting portion 71 switches the operation mode corresponding to the device identification information from the single mode to the cooperation mode, and outputs a restoring instruction to the cooperation process determining portion 49. The restoring instruction includes the device identification information included in the maintaining instruction.

The device-side execution portion 33 can execute a plurality of types of processes. The plurality of types of processes executable by the device-side execution portion 33 include a document scanning process, an image forming process, a data transmission reception process, a facsimile transmission reception process and a data management process. The process executable by the device-side execution portion 33 includes a combination of at least two of the document scanning process, the image forming process, the data transmission reception process, the facsimile transmission reception process and the data management process. The processes executable by the device-side execution portion 33 are not limited to these, and may include a smaller number of types of processes or may include a larger number of types of processes.

The document scanning process is a process of storing image data, which is acquired when the document scanning unit 130 scans a document, in the RAM 114. Setting values used for execution of the document scanning process include whether one side or both sides of the document are to be scanned, whether the document is in color or monochrome, resolution for scanning, image quality, darkness, presence or absence of marks or page numbers, whether a frame that is present around the scanned image is to be deleted, whether an image process such as sharpening is to be executed, the format and the name of a file of image data stored in the RAM 114, a size of the document, the number of documents and a type of the document. The type of the document includes a book-type document indicating presence or absence of documents in different sizes and indicating that the plurality of pages are formed.

The image forming process is a process of allowing the image forming unit 140 to form an image of data on a sheet of paper that is supplied from the paper feed unit 150. Setting values used for execution of the image forming process include whether an image is printed in color or monochrome, a size of paper, a type of paper, the number of copies, designation of a paper feed tray, whether a post-process is to be executed, a side of the sheet on which an image is formed (whether an image is formed on one side or both sides) and orientation of a document, for example. The post-processes include sorting, stapling, punching and the like.

The data transmission reception process is a process of receiving data from a computer connected to a network via the communication I/F unit 112, or a process of transmitting the data stored in the HDD 115 or the external storage device 117 to a computer connected to the network via the communication I/F unit 112. Setting values used for execution of the data transmission reception process include resolution of data, whether the data is in color or monochrome and a file format, for example.

The facsimile transmission reception process is a process of allowing the facsimile unit 116 to transmit an image of facsimile data, or a process of externally receiving an image of facsimile data. Setting values used for execution of the facsimile transmission reception process include setting of a facsimile line, a setting value that designates a time point at which the facsimile data is transmitted, a password and an F code, for example.

The data management process is a process of storing data in the HDD 115 or the external storage device 117, a process of changing or deleting the data stored in the HDD 115 or the external storage device 117, and a process of selecting one or more pieces of data from among pieces of data stored in the HDD 115 or the external storage device 117 as data to be processed. The process of changing data includes a process of editing the data and a process of changing a format. Setting values used for execution of the data management process are a name of a folder for creation of the folder in the HDD 115, a password set for the folder, a character string for searching data, a type of the folder and a time point at which the document is to be deleted, for example.

The device-side execution portion 33 includes a device single execution portion 65 that executes a process in the single mode, and a device-side cooperation process execution portion 67 that executes a process in the cooperation mode. The device single execution portion 65 and the device-side cooperation process execution portion 67 can execute a plurality of types of processes executable by the device-side execution portion 33. Hereinafter, a process executed by the device single execution portion 65 is referred to as a device single process, and a process executed by the device-side cooperation process execution portion 67 is referred to as a device-side process.

The device-side setting portion 31 sets one or more processes of a plurality of types of processes executable by the device-side execution portion 33, and setting values used for execution of the one or more processes based on an operation of inputting in the touch panel 165 by the user. For example, the user A is positioned near the position at which the smartphone 200A is placed in the display surface of the display unit 161. Therefore, in the case where the touch panel 165 detects an operation by the user within a predetermined range from the position at which the smartphone 200A is placed in the display surface of the display unit 161, the device-side setting portion 31 determines the detected operation as the operation by the user A. Further, the device-side setting portion 31 displays an operation screen within a predetermined range from the position at which the smartphone 200A is placed in the display surface of the display unit 161, and determines the operation by the user A based on a position detected by the touch panel 165 in the operation screen. The operation screen includes a screen for selecting any one of a plurality of types of processes executable by the device-side execution portion 33, and a screen for setting values used for the execution of the selected process. The case where the user A inputs in the touch panel 165 is described as an example.

The device-side setting portion 31 includes a device single setting value setting portion 61 and a device-side setting value setting portion 63. The device single setting value setting portion 61 sets a device single process executed by the device single execution portion 65, and a device single setting value for execution of the device single process by the device single execution portion 65 in the single mode. The device single setting value setting portion 61 outputs process identification information for identifying the set device single process, the device single setting value, the device identification information of the smartphone 200A to the device single execution portion 65. When detecting an operation of giving an instruction to execute the device single process by the user A, the device single execution portion 65 executes the device single process set by the device single setting value setting portion 61 in accordance with the device single setting value.

The device-side setting value setting portion 63 sets the device-side process executed by the device-side cooperation process execution portion 67, and the device-side setting value for execution of the device-side process by the device-side cooperation process execution portion 67 in the cooperation mode. The device-side setting value setting portion 63 outputs a set of the process identification information for identifying the set device-side process, the device-side setting value and the device identification information of the smartphone 200A to the device-side cooperation process execution portion 67, the maintaining portion 47 and the continuation state detection portion 37. For example, when detecting an operation of giving an instruction to execute the cooperation process by the user A, the device-side cooperation process execution portion 67 executes the device-side process set by the device-side setting value setting portion 63 in cooperation with the smartphone 200A in accordance with the device-side setting value. Specifically, the device-side cooperation process execution portion 67 executes the device-side process in synchronization with the portable-side process executed in the smartphone 200A. For example, the device-side cooperation process execution portion 67 acquires an execution state of a portable-side process executed in the smartphone 200A from the smartphone 200A, and executes the device-side process. In the case where the device-side process is executed earlier than the execution of the portable-side process, it is confirmed that the portable-side process can be executed in the smartphone 200A, and then the device-side process is executed.

In the case where the device-side process is executed later than the execution of the portable-side process, it is confirmed that the portable-side process has ended in the smartphone 200A, and then the device-side process is executed.

When the device-side process is executed by the device-side cooperation process execution portion 67, the device-side setting value setting portion 63 deletes the device-side setting value, and outputs a cooperation end instruction to the canceling portion 69. Further, when detecting an operation of giving an instruction to end the setting of the cooperation process by the user A, for example, the device-side setting value setting portion 63 outputs the cooperation end instruction to the canceling portion 69. The cooperation end instruction includes the device identification information of the smartphone 200A carried by the user A.

Figure 5:
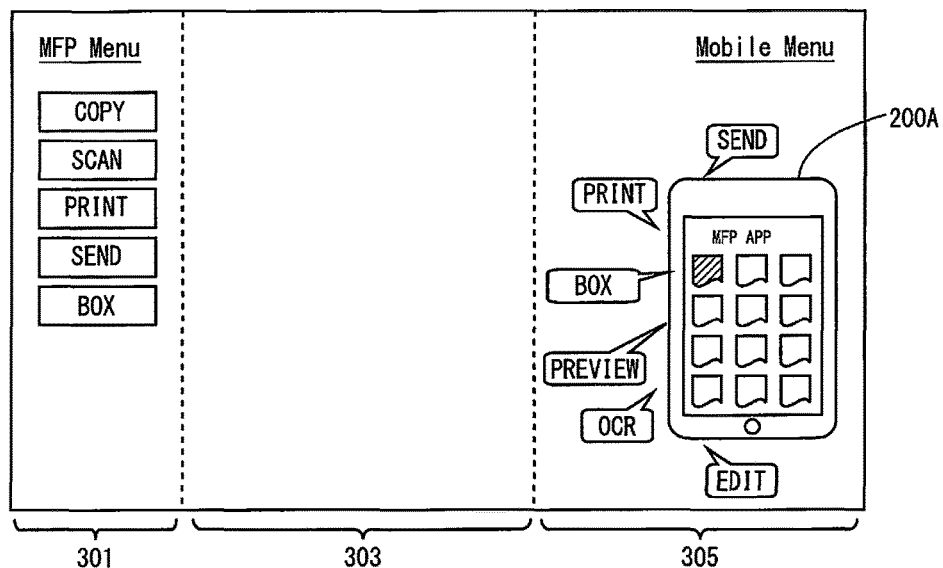
FIG. 5 is a diagram showing one example of an operation screen.

FIG. 5 is a diagram showing one example of an operation screen. Referring to FIG. 5, the operation screen 300 is displayed in a partial region including the position at which the smartphone 200A is placed in the display surface of the display unit 161. The operation screen 300 includes a single region 301 that is enabled in the single mode, a setting value region 303 in which a setting screen for setting values is displayed, and a cooperation region 305 that is enabled in the cooperation mode. A dotted line in the diagram is added to distinguish the single region 301, the setting value region 303 and the cooperation region 305 from one another, and do not actually exist. A boundary line may be added to the operation screen 300, or different background colors may be applied to the single region 301, the setting value region 303 and the cooperation region 305, in order to differentiate the single region 301, the setting value region 303 and the cooperation region 305 from one another.

In the case where the operation mode is the single mode, an operation by the user can be accepted in the single region 301. The single region 301 includes a plurality of buttons for selection of the device single processes. The plurality of buttons include a button in which letters "COPY" are displayed and which is for selection of the document scanning process and the image forming process, a button in which letters "SCAN" are displayed and which is for selection of the document scanning process, a button in which letters "PRINT" are displayed and which is for selection of the data management process and the image forming process, a button in which letters "TRANSMISSION" are displayed and which is for selection of the data transmission reception process, and a button in which letters "BOX" are displayed and which is for selection of the data management process.

In the case where the operation mode is the cooperation mode, an operation by the user can be accepted in the cooperation region 305. The cooperation region 305 includes a position at which the smartphone 200A is placed, and a plurality of buttons for selection of the portable-side processes around a region in which the smartphone 200A is placed. Here, the plurality of buttons include a button in which letters "TRANSMISSION" are displayed and which is for selection of the data transmission reception process, a button in which letters "PRINT" are displayed and which is for selection of the image forming process, and four buttons in which letters "BOX", "PREVIEW", "OCR" and "EDIT" are respectively displayed and for selection of the data management processes.

In the case of the single mode, a setting screen for setting the device single setting value used for execution of the device single process selected in the single region 301 is displayed in the setting value region 303. In the case of the cooperation mode, a setting screen for setting the device-side setting value used for execution of the device-side process selected in the cooperation region 305 is displayed in the setting value region 303.

In the case of the single mode, the user can select the device single process and set the device single setting value by inputting in the single region 301 and the setting value region 303. Further, in the case of the cooperation mode, the user can select the device-side process and set the device-side setting value by inputting in the cooperation region 305 and the setting value region 303, and can operate the smartphone 200A and select the portable-side process and set the portable-side setting value.

Returning to FIG. 4, the portable-side setting value acquiring portion 51 controls the short-range communication unit 119 and receives portable-side information from the smartphone 200A through a communication path established with the smartphone 200A by the path establishing portion 43. While details of the portable-side information will be described below, the portable-side information includes the process identification information for identifying a portable-side process to be executed by the smartphone 200A and the portable-side setting value used for execution of the portable-side process. In response to reception of the portable-side information, the portable-side setting value acquiring portion 51 outputs the device identification information and the portable-side information of the smartphone 200A to the maintaining portion 47 and the cooperation process determining portion 49. After detachment of the smartphone 200A from the display surface of the display unit 161 is detected by the device detection portion 41, and the cooperation mode is maintained by the canceling portion 69, the portable-side setting value acquiring portion 51 may receive the portable-side process information from the smartphone 200A. In this case, an amount of communication with the smartphone 200A can be reduced as much as possible.

The maintaining portion 47 receives a set of the process identification information, the device-side setting value and the device identification information from the device-side setting value setting portion 63, and receives the device identification information and the portable-side information from the portable-side setting value acquiring portion 51. In response to reception of the maintaining instruction from the canceling portion 69, the maintaining portion 47 stores the process identification information and the device-side setting value that make a set with the device identification information included in the maintaining instruction, the portable-side information that makes a set with the device identification information and is last received from the portable-side setting value acquiring portion 51 in the RAM 114 in association with the device identification information.

In response to reception of a restoring instruction from the cooperation setting portion 71, the cooperation process determining portion 49 reads out a set of the device identification information that is the same as the device identification information included in the restoring instruction, the process identification information and the device-side setting value, and the portable-side information from the RAM 114, and determines the read portable-side information as pre-disconnection information. After receiving the restoring instruction from the cooperation setting portion 71, the cooperation process determining portion 49 determines the portable-side information, which makes a set with the device identification information included in the restoring instruction, among sets of device identification information and portable-side information received from the portable-side setting value acquiring portion 51, as post-connection information.

In response to reception of the pre-disconnection information, the post-connection information and the restoring instruction, the cooperation process determining portion 49 determines a cooperation process to be executed based on the process identification information and the device-side setting value read from the RAM 114. Specifically, in the case where the pre-disconnection information and the post-connection information are the same, the cooperation process determining portion 49 determines a cooperation process including a portable-side process defined by them and a device-side process defined by the process identification information and the device-side setting value. The cooperation process determining portion 49 outputs a set of the device identification information, the process identification information and the device-side setting value to the device-side setting value setting portion 63.

In the case where the pre-disconnection information and the post-connection information are different from each other, the cooperation process determining portion 49 determines a first cooperation process including a first portable-side process defined by the pre-disconnection information and a device-side process defined by the process identification information and the device-side setting value, and a second cooperation process including a second portable-side process defined by the post-connection information and a device-side process defined by the process identification information and the device-side setting value. The cooperation process determining portion 49 displays a selection screen, in which any one of the first cooperation process and the second cooperation process can be selected, in the display unit 161, and determines the one selected by the user A. In the case where determining on the first cooperation process, the cooperation process determining portion 49 outputs the device identification information and the pre-disconnection information to the change request portion 53, and outputs a set of the device identification information, the process identification information and the device-side setting value to the device-side setting value setting portion 63. In the case where determining on the second cooperation process, the cooperation process determining portion 49 outputs a set of the device identification information, the process identification information and the device-side setting value to the device-side setting value setting portion 63.

In the case where receiving a set of the device identification information, the process identification information and the device-side setting value from the cooperation process determining portion 49, the device-side setting value setting portion 63 sets the process identification information and the device-side setting value for the device-side process corresponding to the device identification information in order to maintain the setting of the cooperation process. Thus, the user A can continuously set the device-side setting value with the device-side setting value remaining unchanged since last set before the disconnection of the communication line due to detachment of the smartphone 200A from the MFP 100.

In the case where receiving a set of the device identification information and the pre-disconnection information from the cooperation process determining portion 49, the change request portion 53 transmits a setting change request including the pre-disconnection information to the smartphone 200A through a communication path, specified by the path identification information that makes a set with the device identification information, of communication paths established by the path establishing portion 43. Thus, the user A can operate the smartphone 200A and can continuously set a portable-side setting value with the portable-side setting value remaining unchanged since last set before the disconnection of the communication line due to the detachment of the smartphone 200A from the MFP 100. In the case where the second cooperation process is selected by the cooperation process determining portion 49, the change request portion 53 does not transmit a setting change request. Therefore, the user A can operate the smartphone 200A, and continuously set a portable-side setting value with the portable-side setting value remaining unchanged since last set after the disconnection of the communication line due to the detachment of the smartphone 200A from the MFP 100.

The continuation state detection portion 37 receives device identification information and an operation mode signal from the cooperation mode switching portion 35. The operation mode signal indicates any one of the cooperation mode and the single mode. The continuation state detection portion 37 includes a device state detection portion 73, a portable state detection portion 77 and a user setting portion 75. If the operation mode signal indicating the cooperation mode is included in the operation mode signal received from the cooperation mode switching portion 35, the device state detection portion 73 detects the continuation state based on a state of the MFP 100. In the case where the state of the MFP 100 is the continuation state, the device state detection portion 73 outputs a continuation signal including the device identification information of the MFP 100 to the cooperation mode switching portion 35.

The device state detection portion 73 includes a device operation detection portion 81 and an error detection portion 83. Each time a device setting value is set by the device-side setting value setting portion 63, the device operation detection portion 81 receives a set of the device identification information of any one of the smartphones 200A, 200B, 200C, the process identification information and the device-side setting value from the device-side setting value setting portion 63. The device operation detection portion 81 specifies the device identification information that makes a set with the operation mode signal indicating the cooperation mode based on a set of the device identification information and the operation mode signal received from the cooperation mode switching portion 35. In the case where a time period longer than a predetermined time period has not elapsed since the process identification information that makes a set with the specified device identification information and the device setting value are last received, the device operation detection portion 81 outputs a continuation signal including the specified device identification information to the cooperation mode switching portion 35. In other words, during a period in which the user A who operates the smartphone 200A and the MFP 100 is setting a device-side setting value in the MFP 100 for the cooperation process, for example, the device operation detection portion 81 outputs a continuation signal.

During a period in which there is an error in a hardware resource included in the MFP 100, the error detection portion 83 outputs a continuation signal including the device identification information of the MFP 100 to the cooperation mode switching portion 35. The hardware resources include the image forming unit 140 and the paper feed unit 150. For example, in the case where an error has occurred in the image forming unit 140 and the paper feed unit 150 when the user A who operates the smartphone 200A and the MFP 100 is performing setting for the cooperation process, during a period in which the user A is performing a restoration operation of the error, the error detection portion 83 outputs a continuation signal including the device identification information of the smartphone 200A to the cooperation mode switching portion 35. The image forming unit 140 and the paper feed unit 150 include consumables and recover from the error if the consumables are replaced or refilled. The consumables in the image forming unit 140 include a toner, a photosensitive drum, a developing roller and a fixing roller. The consumables in the paper feed unit 150 include sheets of paper. Further, in the case where an error, in which a sheet of paper gets stuck in a transport path of paper, occurs, the error detection portion 83 can output a continuation signal including the device identification information of the MFP 100 to the cooperation mode switching portion 35 until the sticking paper is removed. In the case where the users A, B and C are operating the MFP 100, the error detection portion 83 outputs continuation signals respectively including the pieces of the device identification information of the smartphones 200A, 200B, 200C.

In the case where it is set that the continuation state is to be maintained at all times, the user setting portion 75 outputs a continuation signal including the device identification information of the MFP 100 to the cooperation mode switching portion 35. Thus, even in the case where the smartphone 200A is detached from the display surface of the display unit 161 of the MFP 100 during a period in which the smartphone 200A is in cooperation with the MFP 100, for example, the cooperation mode can be maintained. In the case where the users A, B and C are operating the MFP 100, the user setting portion 75 outputs continuation signals respectively including pieces of the device identification information of the smartphones 200A, 200B, 200C.

The portable state detection portion 77 specifies the device identification information that includes the operation mode signal indicating the cooperation mode. The case where the device identification information of the smartphone 200A is specified is explained here as an example. The portable state detection portion 77 detects the continuation state based on the state of the smartphone 200A specified by the specified device identification information. In the case where the state of the smartphone 200A is the continuation state, the portable state detection portion 77 outputs a continuation signal including the device identification information of the smartphone 200A to the cooperation mode switching portion 35.

The portable state detection portion 77 includes an application detection portion 85 and a portable operation detection portion 87. The application detection portion 85 inquires the smartphone 200A of an application program that is under execution in a current state through a communication path specified by the path identification information that makes a set with the device identification information of the smartphone 200A. The current state is a state where data can be output to the user, or the input by the user can be accepted. For example, when the user A who operates the smartphone 200A and the MFP 100 is performing setting for the cooperation process, the smartphone 200A sometimes executes a predetermined application program, different from an application program for being in cooperation with the MFP 100, in the current state. Although not being limited, the predetermined application program includes an application program for calls and an application program for receiving emails, for example. This is because the user A sometimes preferably selects a call in the case where the smartphone 200A receives an incoming call, or because the user A preferably views emails in the case where the smartphone 200A receives emails. During a period in which the smartphone 200A is executing the predetermined application program in the current state, the portable state detection portion 77 outputs a continuation signal including the device identification information of the smartphone 200A to the cooperation mode switching portion 35. Thus, in the case where the user A picks up the smartphone 200A and detaches the smartphone 200A from the display surface of the display unit 161 of the MFP 100, the cooperation mode can be maintained.

The portable operation detection portion 87 inquires the smartphone 200A of an operation state through a communication path specified by the path identification information that makes a set with the device identification information of the smartphone 200A. An application program for being in cooperation with the MFP 100 is executed in the smartphone 200A, and a continuation signal including the device identification information of the smartphone 200A is output to the cooperation mode switching portion 35 until a predetermined time period elapses since the user A inputs the portable-side setting value. For example, the user A sometimes picks up the smartphone 200A and detaches the smartphone 200A from the display surface of the display unit 161 of the MFP 100 to check data in order to determine the portable-side setting value. Even in such a case, the cooperation mode can be maintained.

A continuation condition may be set by the user. A continuation condition setting screen for setting of the continuation condition is displayed in the display unit 161, and the user sets the continuation condition in accordance with the continuation condition setting screen. The continuation condition enables at least one of the device operation detection portion 81, the error detection portion 83, the application detection portion 85, the portable operation detection portion 87 and the user setting portion 75.

Figure 6:
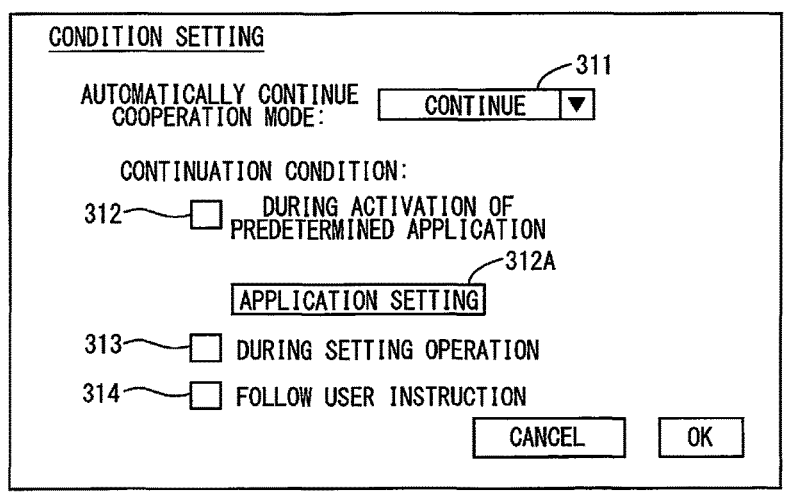
FIG. 6 is a diagram showing one example of a continuation condition setting screen.

FIG. 6 is a diagram showing one example of the continuation condition setting screen. Referring to FIG. 6, the continuation condition setting screen 310 includes a region 311 for setting of whether the continuation condition is to be set, and regions 312 to 315 for settings of the continuation condition. An item including the letters "AUTOMATICALLY CONTINUE COOPERATION MODE" is arranged at the left of the region 311, and any one of "CONTINUE" and "DISCONTINUE" is set in the region 311. In the case where "CONTINUE" is set in the region 311, setting of the continuation condition is enabled, and the settings are enabled in the regions 312 to 315.

The region 312 is a region for setting a condition that a predetermined application program is under execution in the cooperation device, that is, the smartphone 200A in this case, as the continuous condition. In the case where designation is made in the region 312 by the user, and a mark is added to the region 312, the application programs can be designated in the region 312A. In the region 312A, one or more application programs can be designated. In the smartphone 200A, during a period in which the application program designated in the region 312A is under execution in the current state, the continuation condition is satisfied.

The region 313 is a region for setting a condition, that the device-side setting value or the portable-side setting value is set, as the continuation condition. In the case where designation is made in the region 313 by the user, and a mark is added to the region 313, the continuation condition is satisfied in the case where a predetermined period has not elapsed since the device-side setting value is set in the MFP 100. Further, the continuation condition is satisfied in the case where a predetermined time period has not elapsed since the portable-side setting value is set in the smartphone 200A.

In the region 314, a condition that an instruction given by the user is to be followed is set as the continuation condition. In the case where designation is made by the user, and a mark is added to the region 314, the MFP 100 displays an inquiry screen for inquiring whether the cooperation mode is to be maintained in the display unit 161. In the case where the user gives an instruction to maintain the cooperation mode, the continuation condition is satisfied.

The user can select one or more regions of the regions 312 to 314 and add marks to them. In other words, in the case where one or more continuation conditions are set, if at least one of the one or more continuation conditions are satisfied, the continuation condition is satisfied.

Figure 7:
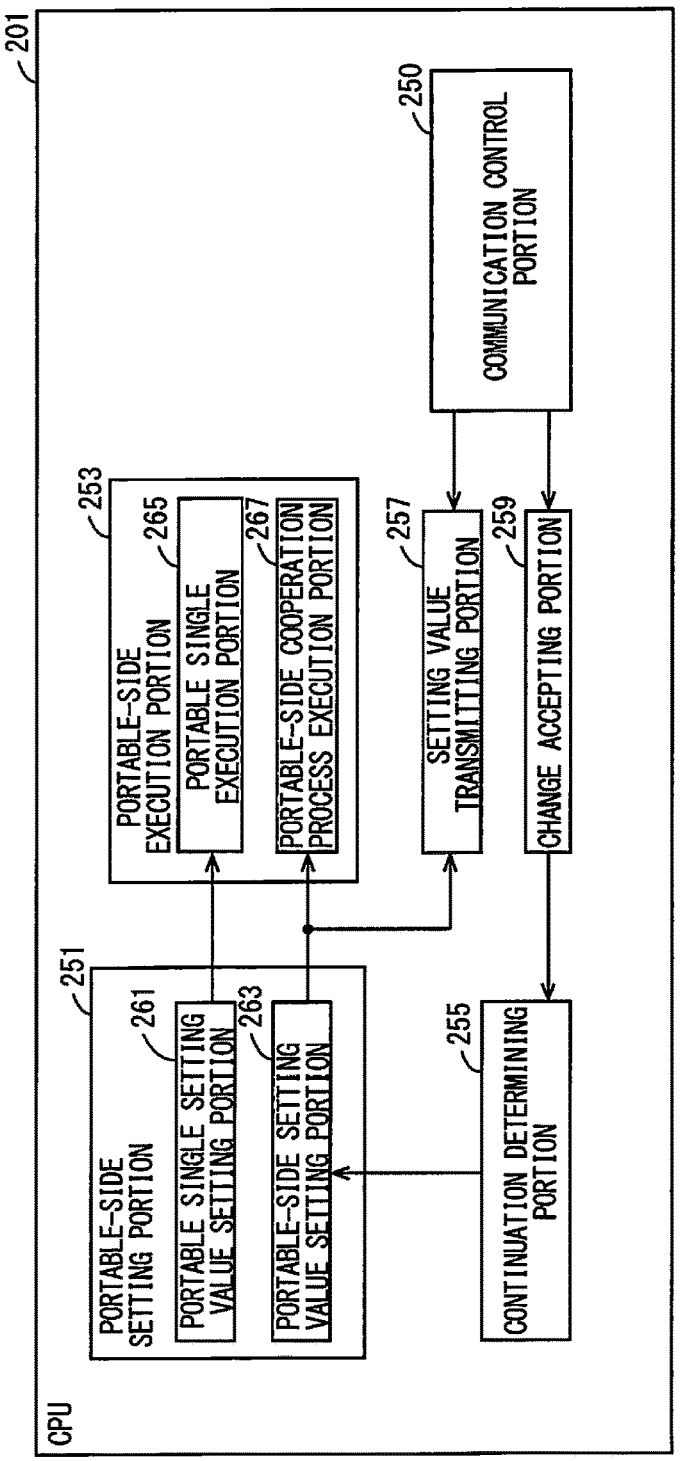
FIG. 7 is a diagram showing one example of functions of a CPU included in the smartphone in the first embodiment.

FIG. 7 is a diagram showing one example of functions of a CPU included in the smartphone in the first embodiment. The functions shown in FIG. 7 are functions formed in the CPU 201 in the case where the CPU 201 included in the smartphone 200A executes a portable-side cooperation program stored in the flash memory 203 or the CD-ROM 211A. The portable-side cooperation program is part of the cooperation program. Hereinafter, a task of executing the portable-side cooperation program by the CPU 201 is referred to as a cooperation task.

Referring to FIG. 7, the CPU 201 includes a communication control portion 250, a portable-side setting portion 251, a portable-side execution portion 253, a continuation determining portion 255, a setting value transmitting portion 257 and a change accepting portion 259.

The CPU 201 executes a plurality of types of application programs. The case where at least the portable-side cooperation program, an application program for enabling calls, an application program for receiving and transmitting emails and a browsing program for browsing a web page on the internet are installed in the smartphone 200A is described here as an example. The application programs installed in the smartphone 200A are not limited to these. Hereinafter, a task of executing the portable-side cooperation program by the CPU 201 is referred to as a cooperation task, and a task of executing an application program other than the portable-side cooperation program by the CPU 201 is referred to as an application task. Here, the application programs other than the portable-side cooperation program include the application program for enabling calls, the application program for transmitting and receiving emails and the browsing program.

The portable-side execution portion 253 can execute a plurality of types of processes. The plurality of types of processes executable by the portable-side execution portion 253 are determined by the application program installed in the smartphone 200A. The portable-side execution portion 253 includes a portable single execution portion 265 and a portable-side cooperation process execution portion 267.

The portable-side setting portion 251 sets one or more processes of the plurality of types of processes executable by the portable-side execution portion 253 and a setting value used for execution of the one or more processes based on an operation of inputting in the operation unit 207 by the user. The portable-side setting portion 251 includes a portable single setting value setting portion 261 and a portable-side setting value setting portion 263. The portable single setting value setting portion 261 and the portable single execution portion 265 are application tasks. The portable-side setting value setting portion 263, the portable-side cooperation process execution portion 267, the continuation determining portion 255, the setting value transmitting portion 257, the change accepting portion 259 and the communication control portion 250 are cooperation tasks.

The communication control portion 250 controls the short-range communication unit 209, and returns a response command including the device identification information of itself in response to reception of a search command from the MFP 100. Further, the communication control portion 250 controls the short-range communication unit 209, and negotiates with the MFP 100 in response to reception of a connection request from the MFP 100 and establishes a communication path. The communication control portion 250 outputs the device identification information of the MFP 100 and the path identification information for identifying the communication path established between the MFP 100 and the smartphone 200A to the setting value transmitting portion 257 and the change accepting portion 259. In the present embodiment, when the user A places the smartphone 200A on the display surface of the display unit 161 of the MFP 100, the MFP 100 transmits a connection request to establish a communication path. Therefore, when the user A places the smartphone 200A on the display surface of the display unit 161 of the MFP 100, the communication control portion 250 establishes the communication path. When the short-range communication unit 209 can no longer communicate through the communication path established with the MFP 100, the communication control portion 250 disconnects the communication path, and notifies the setting value transmitting portion 257 and the change accepting portion 259 of the disconnection of the communication path. The communication control portion 250 may control the wireless LAN I/F 208 and establish the communication path with the MFP 100 in response to reception of the connection request from the MFP 100.

The portable single setting value setting portion 261 sets a portable single process executed by the portable single execution portion 265 and a portable single setting value for execution of the portable single process by the portable single execution portion 265 with the application task in the current state. The current state is a state where an operation of inputting in the operation unit 207 by the user can be accepted, and the non-current state is a state where an operation of inputting in the operation unit 207 by the user cannot be accepted. The portable single setting value setting portion 261 outputs process identification information for identifying the set portable single process and the portable single setting value to the portable single execution portion 265. When the operation unit 207 detects an operation of giving an instruction to execute the portable single process with the application task in the current state, the portable single execution portion 265 executes the portable single process set by the portable single setting value setting portion 261 in accordance with the portable single setting value.

The portable-side setting value setting portion 263 sets a portable-side process executed by the portable-side cooperation process execution portion 267 and a portable-side setting value for execution of the portable-side process by the portable-side cooperation process execution portion 267 with the cooperation task in the current state. The portable-side setting value setting portion 263 outputs a set of the process identification information for identifying the set portable-side process and the portable-side setting value to the portable-side cooperation process execution portion 267 and the setting value transmitting portion 257. When the execution of the cooperation process is instructed by the MFP 100, the portable-side cooperation process execution portion 267 executes the portable-side process set by the portable-side setting value setting portion 263 in cooperation with the MFP 100 in accordance with the portable-side setting value. Specifically, the portable-side cooperation process execution portion 267 executes the portable-side process in synchronization with the MFP 100. For example, the portable-side cooperation process execution portion 267 acquires an execution state of the device-side process executed in the MFP 100 from the MFP 100, and executes the portable-side process. In the case where the portable-side process is executed earlier than the device-side process, the portable-side process is executed after it is confirmed that the device-side process can be executed in the MFP 100. In the case where the portable-side process is executed later than the device-side process, the portable-side process is executed after it is confirmed that the device-side process has finished in the MFP 100.

In the case where the portable-side process is executed by the portable-side cooperation process execution portion 267, or the case where an operation of giving an instruction to end the setting of the cooperation process by the user A is detected, the portable-side setting value setting portion 263 deletes the portable-side setting value.

In response to reception of a set of the process identification information and the portable-side setting value from the portable-side setting value setting portion 263, the setting value transmitting portion 257 transmits the set to the MFP 100. Specifically, the setting value transmitting portion 257 specifies a communication path specified by the path identification information received from the communication control portion 250, controls the short-range communication unit 209 and transmits the set of the process identification information and the portable-side setting value to the MFP 100. In the case where the setting value transmitting portion 257 is notified of the disconnection of the communication path by the communication control portion 250, even if the set of the process identification information and the portable-side setting value is received from the portable-side setting value setting portion 263, the setting value transmitting portion 257 do not transmit the set.

In the case where the path identification information is received from the communication control portion 250, and then the short-range communication unit 209 receives a setting change request from the MFP 100, the change accepting portion 259 accepts the setting change request. The setting change request includes pre-disconnection information. The change accepting portion 259 outputs a setting change request to the continuation determining portion 255.

In response to reception of the setting change request from the change accepting portion 259, the continuation determining portion 255 outputs a setting change instruction to the portable-side setting value setting portion 263. The setting change instruction includes the pre-disconnection information included in the setting change request. The pre-disconnection information includes process identification information and a portable-side setting value set by the device-side setting value setting portion 63 before the communication path is disconnected by the short-range communication unit 119.

In the case where receiving a setting change instruction from the continuation determining portion 255, the portable-side setting value setting portion 263 updates the process identification information and the portable-side setting value that have been set by then with the process identification information and the portable-side setting value included in the setting change instruction. Thus, the portable-side setting value can be continuously set with the process identification information and the portable-side setting value remaining unchanged since last set before the communication path is disconnected by the short-range communication unit 119.

<First Modified Example>

The portable-side setting value setting portion 263 may reset a portable-side setting value in a stage where a communication path, which the communication control portion 250 has established with the MFP 100, is disconnected. The resetting of the portable-side setting value includes deletion of the portable-side setting value or the update of the portable-side setting value with the default value.

In this case, in the MFP 100, in response to reception of a restoring instruction from the cooperation setting portion 71, the cooperation process determining portion 49 reads out a set of the device identification information that is the same as the device identification information included in the restoring instruction, the process identification information and the device-side setting value, and the portable-side information from the RAM 114 and sets the read portable-side information as the pre-disconnection information. After receiving the restoring instruction from the cooperation setting portion 71, the cooperation process determining portion 49 determines the portable-side information that makes a set with the device identification information included in the restoring instruction among the set of the device identification information and the portable-side information received from the portable-side setting value acquiring portion 51 as the post-connection information. Then, in the case where determining the first cooperation process, the cooperation process determining portion 49 outputs the device identification information and the pre-disconnection information to the change request portion 53. In the case where determining the second cooperation process, the cooperation process determining portion 49 outputs the device identification information and the post-connection information to the change request portion 53.

The change request portion 53 receives any one of a set of the device identification information and the pre-disconnection information, and a set of the device identification information and the post-connection information, from the cooperation process determining portion 49. In the case where receiving a set of the device identification information and the pre-disconnection information from the cooperation process determining portion 49, the change request portion 53 transmits a setting change request including the pre-disconnection information to the smartphone 200A. In the case where receiving a set of the device identification information and the post-connection information, the change request portion 53 transmits a setting change request including the post-connection information to the smartphone 200A. Thus, the user A operates the smartphone 200A, and continuously set a portable-side setting value with the portable-side setting value remaining unchanged since last set before the disconnection of a communication line due to detachment of the smartphone 200A from the MFP 100.

Figure 8:
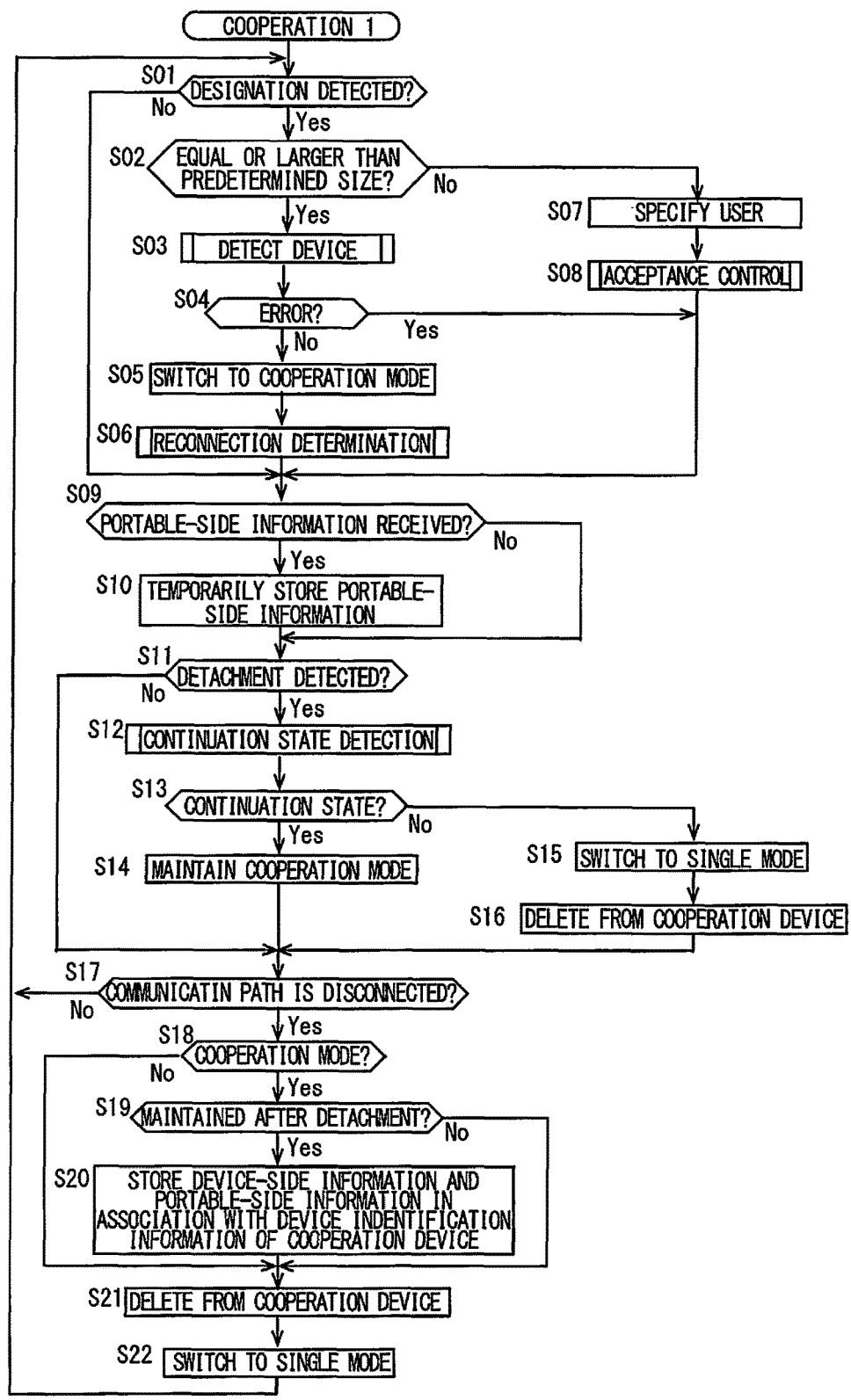
FIG. 8 is a flow chart showing one example of a flow of a cooperation process in the first embodiment.

FIG. 8 is a flow chart showing one example of a flow of the cooperation process in the first embodiment. The cooperation process is a process executed by the CPU 111 in the case where the CPU 111 included in the MFP 100 executes the cooperation program stored in the ROM 113, the HDD 115 or the CD-ROM 118. Referring to FIG. 8, the CPU 111 determines whether designation has been made in the display surface of the display unit 161 (step S01). Specifically, the CPU 111 controls the touch panel 165, and detects the designation in the display surface of the display unit 161 when the touch panel 165 detects a position with which an object has been in contact. If a position in the display surface of the display unit 161 has been designated, the process proceeds to the step S02. If not, the process proceeds to the step S09.

In the next step S02, the CPU 111 determines whether an area in which the designation is made in the display surface of the display unit 161 is equal to or larger than a predetermined size. The predetermined size is preferably an upper limit of an area of a finger of the user. This is for distinguishing between the designation made by a finger of a person and the designation made by placement of the smartphone 200A. If the area in which the designation is made in the display surface of the display unit 161 is equal to or larger than the predetermined size, the process proceeds to the step S03. If not, the process proceeds to the step S07.

In the step S03, the CPU 111 executes a device detection process, and the process proceeds to the step S04. While details of the device detection process will be described below, the device detection process is a process of detecting a device placed on the display surface of the display unit 161. In the case where detecting the device, the CPU 111 registers the detected device as a cooperation device in association with the position detected by the touch panel 165. In the case where not detecting the device, the CPU 111 determines that an error has occurred. Further, the device detection process is a process of establishing a communication path between the MFP 100 and the detected device. The CPU 111 temporarily stores the device identification information of the cooperation device and the position identification information indicating the position detected by the touch panel 165 in the RAM 114.

The case where the user A places the smartphone 200A on the display surface of the display unit 161 is explained here as an example. In this case, the smartphone 200A is registered as the cooperation device, and the device identification information of the smartphone 200A and the position identification information indicating a position at which the smartphone 200A is placed in the display surface of the display unit 161 are temporarily stored in the RAM 114.

In the step S04, the CPU 111 determines whether it is determined that an error has occurred as a result of execution of the device detection process. In the case where it is not determined that an error has occurred, the process proceeds to the step S05. In the case where it is determined that an error has occurred, the process proceeds to the step S09. In the step S05, the operation mode is switched to the cooperation mode, and the process proceeds to the step S06.

In the step S06, the CPU 111 executes a reconnection determination process, and the process proceeds to the step S09. While details of the reconnection determination process will be described below, the reconnection determination process is a process of, in the case where it is determined that the connection path between the MFP 100 and the device that is registered as the cooperation device in the step S03, that is, the smartphone 200A in this case, is to be reconnected, restoring the setting for the cooperation process to the setting that is set before the disconnection of the communication path.

In the case where the user has made designation on the touch panel 165 by his or her finger, the process proceeds to the step S07. In the step S07, the user who has made designation on the touch panel 165 is specified.

In the case where the cooperation device is detected in the step S03, the CPU 111 specifies the user by using the device identification information of the cooperation device and the position information. For example, in the case where the smartphone 200A is registered as the cooperation device, a predetermined range from the position at which the smartphone 200A is placed in the display surface of the display unit 161 is determined as an operation region of the user A who carries the smartphone 200A. If the position detected in the touch panel 165 is within the operation region of the user A, the CPU 111 specifies the user who has made designation on the touch panel 165 as the user A.

In the next step S08, the CPU 111 executes an acceptance control process, and the process proceeds to the step S09. While details of the acceptance control process will be described below, the acceptance control process is a process of determining an operation by the user A based on the position detected in the step S01, and executing a process defined by the determined operation.

In the step S09, the CPU 111 determines whether portable-side information has been received. It is determined whether the portable-side information has been received from the cooperation device that is detected when the device detection process is executed in the step S03. The portable-side information includes the process identification information of a portable-side process set in a cooperation device and a portable-side setting value for execution of the portable-side process. If the portable-side information has been received, the process proceeds to the step S10. If not, the process proceeds to the step S11. In the step S11, the CPU 111 temporarily stores the portable-side information in the RAM 114 in association with the device identification information of the cooperation device, that is, the smartphone 200A in this case, and the process proceeds to the step S11.

In the step S11, the CPU 111 detects whether the cooperation device has been detached from the display surface of the display unit 161. In the case where the smartphone 200A is registered as the cooperation device in the step S03, the device identification information of the smartphone 200A is associated with the position information indicating the position in the display surface of the display unit 161. In the case where the touch panel 165 no longer detects the designation made at the position specified by the position information associated with the smartphone 200A, it is determined that the smartphone 200A has been detached from the display surface of the display unit 161. In the case where it is detected that the smartphone 200A, which is the cooperation device, has been detached from the display surface of the display unit 161, the process proceeds to the step S12. If not, the process proceeds to the step S17.

In the step S12, the CPU 111 executes a continuation state detection process, and the process proceeds to the step S13. While details of the continuation state detection process will be described below, the continuation state detection process is a process of detecting a continuation state in which the cooperation mode is to be maintained. In the step S13, it is determined whether the continuation state is detected. If the continuation state has been detected, the process proceeds to the step S14. If not, the process proceeds to the step S15. In the step S14, the cooperation mode is maintained, and the process proceeds to the step S17.

In the step S15, the operation mode is switched to the single mode, and the process proceeds to the step S16. In the step S16, the CPU 111 deletes the smartphone 200A from a set of the cooperation devices since it is detected in the step S11 that the smartphone 200A has been detached from the display surface of the display unit 161, and the process proceeds to the step S17. The CPU 111 deletes the smartphone 200A from a set of the cooperation devices by deleting the device identification information of the smartphone 200A from the RAM 114 because it is detected that the smartphone 200A has been detached from the display surface of the display unit 161.

In the step S17, the CPU 111 determines whether the communication path established between the MFP 100 and the smartphone 200A, which is the cooperation device, has been disconnected. If the communication path has been disconnected, the process proceeds to the step S18. If not, the process returns to the step S01. In the step S18, the CPU 111 determines whether the operation mode is the cooperation mode. If the operation mode is the cooperation mode, the process proceeds to the step S19. If not, the process proceeds to the step S21. In the step S19, the CPU 111 determines whether the cooperation mode is maintained after detachment is detected in the step S11. For example, with the continuation state between the MFP 100 and the smartphone 200A detected, in the case where the CPU 111 can no longer communicate with the smartphone 200A after the smartphone 200A is detached from the display surface of the display unit 161, it is determined that the cooperation mode is maintained after the detection of the detachment of the smartphone 200A from the display surface of the display unit 161. If the cooperation mode has been maintained since the detection of the detachment, the process proceeds to the step S20. If not, the process proceeds to the step S21.

In the step S20, the CPU 111 stores device-side information and the portable-side information of the cooperation device in the RAM 114 in association with the device identification information of the cooperation device, and the process proceeds to the step S21. In the step S21, the CPU 111 deletes the smartphone 200A from a set of the cooperation devices because it is detected in the step S17 that the connection path between the MFP 100 and the smartphone 200A has been disconnected, and the process proceeds to the step S22. Then, the operation mode is switched to the single mode (step S22), and the process returns to the step S01.

Figure 9:
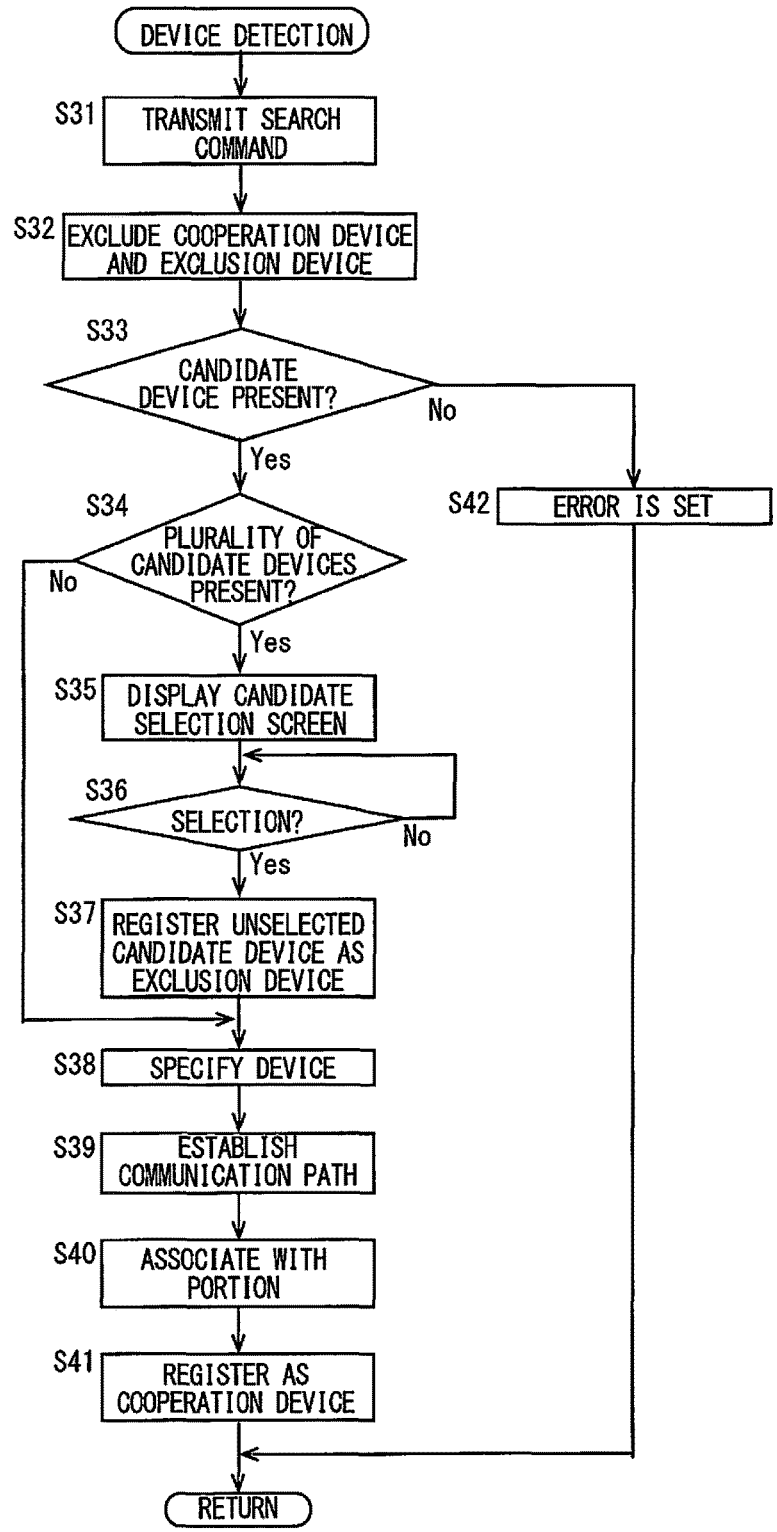
FIG. 9 is a flow chart showing one example of a flow of a device detection process.

FIG. 9 is a flow chart showing one example of a flow of the device detection process. The device detection process is a process executed in the step S03 of FIG. 8. Referring to FIG. 9, the CPU 111 controls the short-range communication unit 119 and transmits a search command (step S31). In response to reception of a search command, each of the one or more smartphones 200A, 200B, 200C, that are present within a communicable range from the short-range communication unit 119, returns a response command including the device identification information of itself. In addition to a device, which is one of the smartphones 200A, 200B, 200C, is placed on the display surface of the display unit 161, and not registered as the cooperation device, a device that is not placed on the display surface of the display unit 161, and a device that is placed on the display surface of the display unit 161 but is already registered as the cooperation device, sometimes return response commands. Hereinafter, a device that returns a response command is referred to as a candidate device. Therefore, in the next step S32, a cooperation device and an exclusion device are excluded from a set of the candidate devices. The exclusion device is a device that is registered as the exclusion device in the step S38. The cooperation device is a device registered as the cooperation device in the step S41, described below. In the next step S33, it is determined whether the candidate device is present. If the candidate device is present, the process proceeds to the step S34. If not, the process proceeds to the step S42. In the step S42, it is set that an error has occurred, and the process returns to the cooperation process.

In the next step S34, the CPU 111 determines whether a plurality of candidate devices are present. If the plurality of candidate devices are present, the process proceeds to the step S35. If not, the process proceeds to the step S38. In the step S38, in the case where the process proceeds from the step S34, the CPU 111 specifies one candidate device, and the process proceeds to the step S39.

A plurality of candidate devices are present in the case where the process proceeds to the step S35. In the step S35, a candidate selection screen for selection of one device from among the plurality of candidate devices is displayed in the display unit 161, and the process proceeds to the step S36. The candidate selection screen is displayed in the vicinity of the position detected by the touch panel 165 in the step S01 of FIG. 8. In the step S36, the process waits until one of the plurality of candidate devices is selected (NO in the step S36). If one device is selected (YES in the step S36), the process proceeds to the step S37. In the step S37, the CPU 111 registers all of the one or more candidate devices, which have not been selected from among the plurality of candidate devices, as the exclusion devices, and the process proceeds to the step S38.

In the step S38, in the case where the process proceeds from the step S37, the candidate device selected in the step S36 is specified, and the process proceeds to the step S39. In the step S38, the CPU 111 controls the short-range communication unit 119 and establishes a communication path with the candidate device specified in the step S38, and the process proceeds to the step S40.

In the step S40, the CPU 111 associates the candidate device specified in the step S38 with the position detected by the touch panel 165 in the step S01 of FIG. 8, and the process proceeds to the step S41. In the step S41, the CPU 111 registers the candidate device as the cooperation device, and the process returns to the cooperation process. Specifically, the CPU 111 stores the device identification information of the candidate device and the position information indicating a position associated with the candidate device in the step S40 in the RAM 114.

Figure 10:
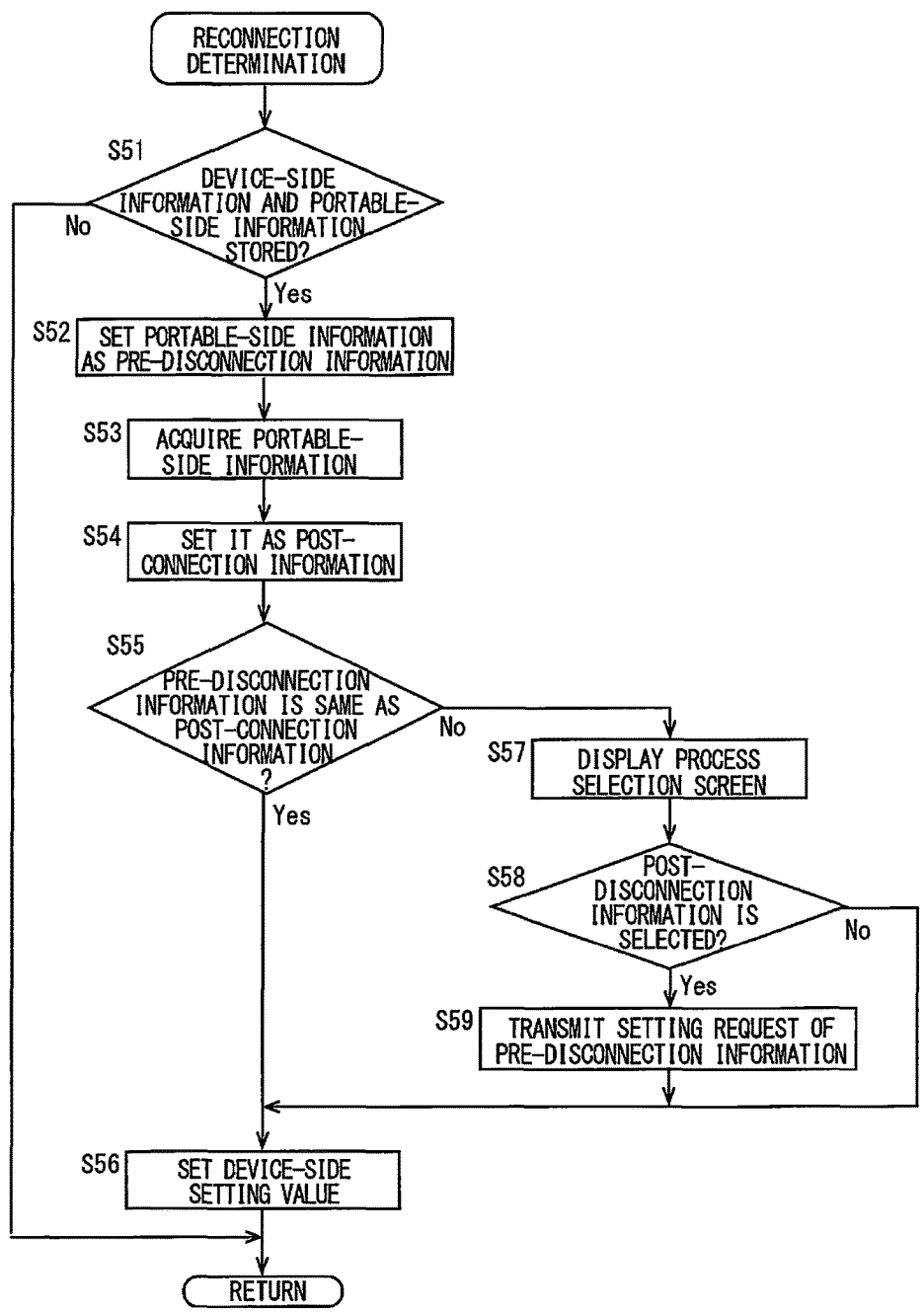
FIG. 10 is a flow chart showing one example of a flow of a reconnection determination process.

FIG. 10 is a flow chart showing one example of a flow of the reconnection determination process. The reconnection determination process is a process executed in the step S06 of FIG. 8. In the step S03, which precedes the execution of the reconnection determination process, the smartphone 200A is detected as a device that is placed on the display surface of the display unit 161, and the CPU 111 establishes a communication path with the smartphone 200A. Referring to FIG. 10, the CPU 111 determines whether the device-side information and the portable-side information associated with the device identification information of the smartphone 200A that is placed on the display surface of the display unit 161 are stored in the RAM 114 (step S51). In the case where the step S20 of FIG. 8 is performed, the device-side information and the portable-side information are stored in the RAM 114 in association with the device identification information of the cooperation device of which the communication path to the CPU 111 has been disconnected. If the device-side information and the portable-side information associated with the device identification information of the device that is placed on the display surface of the display unit 161 are stored in the RAM 114, the process proceeds to the step S52. If not, the process returns to the cooperation process.

In the step S52, the portable-side information associated with the device identification information of the device placed on the display surface of the display unit 161 is set as the pre-disconnection information, and the process proceeds to the step S53. In the step S53, the CPU 111 acquires the portable-side information from the smartphone 200A placed on the display surface of the display unit 161. Then, the portable-side information acquired in the step S53 is set as the post-connection information (step S54), and the process proceeds to the step S55.

In the step S55, the CPU 111 determines whether the pre-disconnection information and the post-connection information are the same. If the pre-disconnection information and the post-connection information are the same, the process proceeds to the step S56. If not, the process proceeds to the step S57. In the step S56, the CPU 111 sets a device-side setting value associated with the device identification information of the smartphone 200A placed on the display surface of the display unit 161, and the process returns to the cooperation process.

In the step S57, a process selection screen for selection of any one of the pre-disconnection information and the post-disconnection information in the display unit 161, and the process proceeds to the step S58. The process selection screen is displayed in the vicinity of the position detected by the touch panel 165 in the step S01 of FIG. 8. In the step S58, the process waits until any one of the pre-disconnection information and the post-disconnection information is selected. If the pre-disconnection information is selected (YES in the step S58), the process proceeds to the step S59. If the post-disconnection information is selected (NO in the step S58), the process proceeds to the step S56. In the step S59, the CPU 111 transmits a setting request including a command for setting the pre-disconnection information to the smartphone 200A placed on the display surface of the display unit 161, and the process proceeds to the step S56. In the step S56, the CPU 111 sets the device-side setting value associated with the device identification information of the smartphone 200A placed on the display surface of the display unit 161, and the process returns to the cooperation process.

Figure 11:
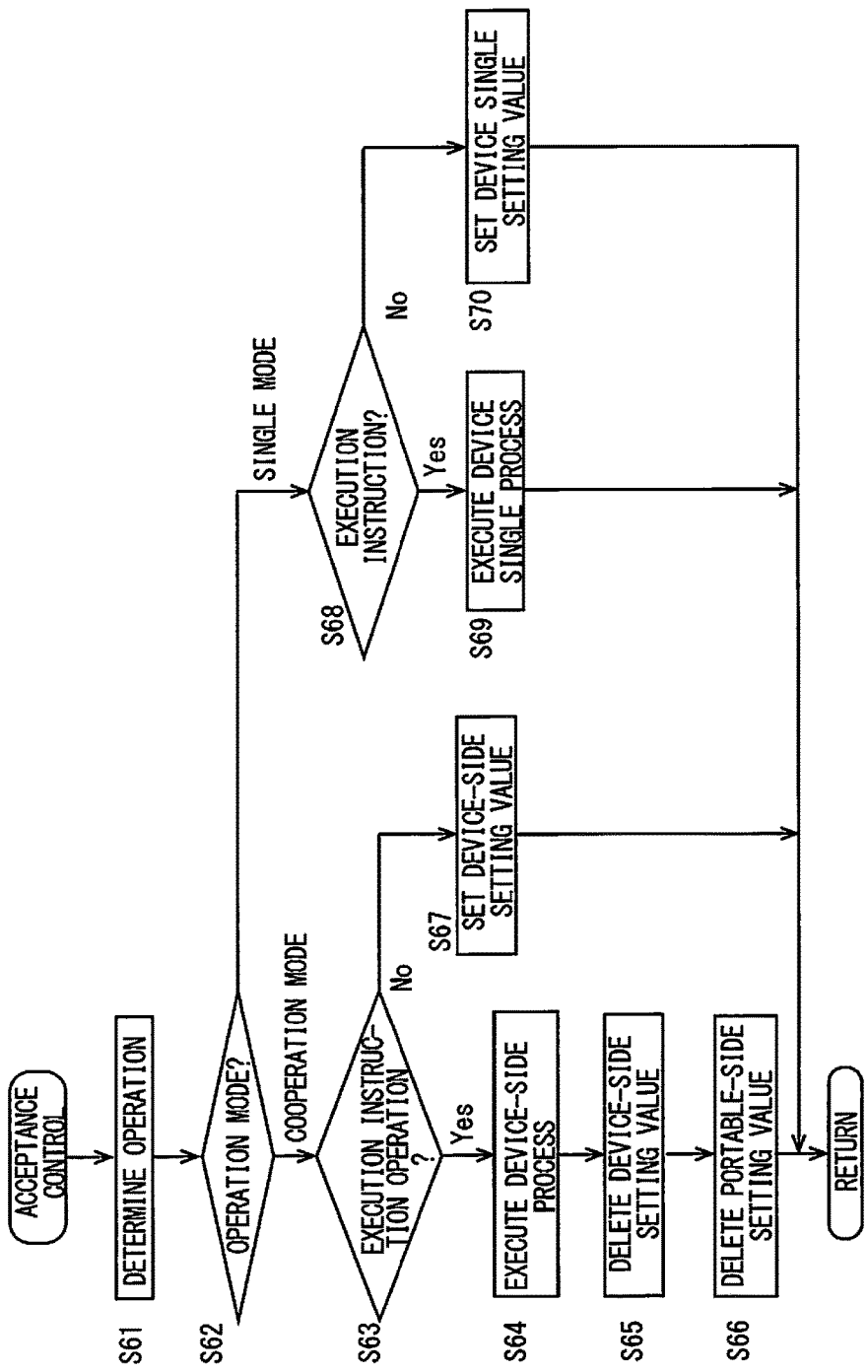
FIG. 11 is a flow chart showing one example of a flow of an acceptance control process.

FIG. 11 is a flow chart showing one example of a flow of an acceptance control process. The acceptance control process is a process executed in the step S08 of FIG. 8. In a stage that precedes the execution of the acceptance control process, a position designated by the user A is detected by the touch panel 165. Referring to FIG. 11, the CPU 111 determines an operation based on the position detected by the touch panel 165 (step S61). The CPU 111 specifies a position in the operation screen based on the position detected by the touch panel 165 with the operation screen displayed in the display unit 161, and determines an operation. In the case where a button to which an operation is assigned is included in the operation screen, and a position within the button is specified, the CPU 111 determines the operation assigned to the button as the operation specified by the user. For example, in the case where the operation screen is a keyboard, and a position within a key is specified, the CPU 111 determines an operation of inputting an alphanumeric character assigned to the key as the operation specified by the user. Further, in the case where the operation screen includes an execution key to which an execution instruction operation of giving an instruction to execute a process is assigned, and a position within the execution key is specified, the CPU 111 determines the execution instruction operation as the operation specified by the user.

In the next step S62, the process branches depending on the operation mode. In the case where the operation mode is the cooperation mode, the process proceeds to the step S63. If the operation mode is the single mode, the process proceeds to the step S68.

In the step S63, the CPU 111 determines whether the operation determined in the step S61 is the execution instruction operation. If it is the execution instruction operation, the process proceeds to the step S64.

If not, the process proceeds to the step S67. In the step S67, the CPU 111 sets a device-side setting value in accordance with the determined operation, and the process returns to the cooperation process. In the step S64, the CPU 111 executes a device-side process in accordance with the device-side setting value in cooperation with the smartphone 200A, which is the cooperation device, and the process proceeds to the step S65. In the step S65, the CPU 111 deletes the device-side setting value, and the process proceeds to the step S66. In the step S66, the CPU 111 deletes the portable-side setting value, and the process returns to the cooperation process.

In the step S68, the CPU 111 determines whether the operation determined in the step S61 is the execution instruction operation. If it is the execution instruction operation, the process proceeds to the step S69. If not, the process proceeds to the step S70. In the step S70, the CPU 111 sets a device single setting value in accordance with the determined operation, and the process returns to the cooperation process. In the step S69, the CPU 111 executes a device single process in accordance with the device single setting value, and the process returns to the cooperation process.

Figure 12:
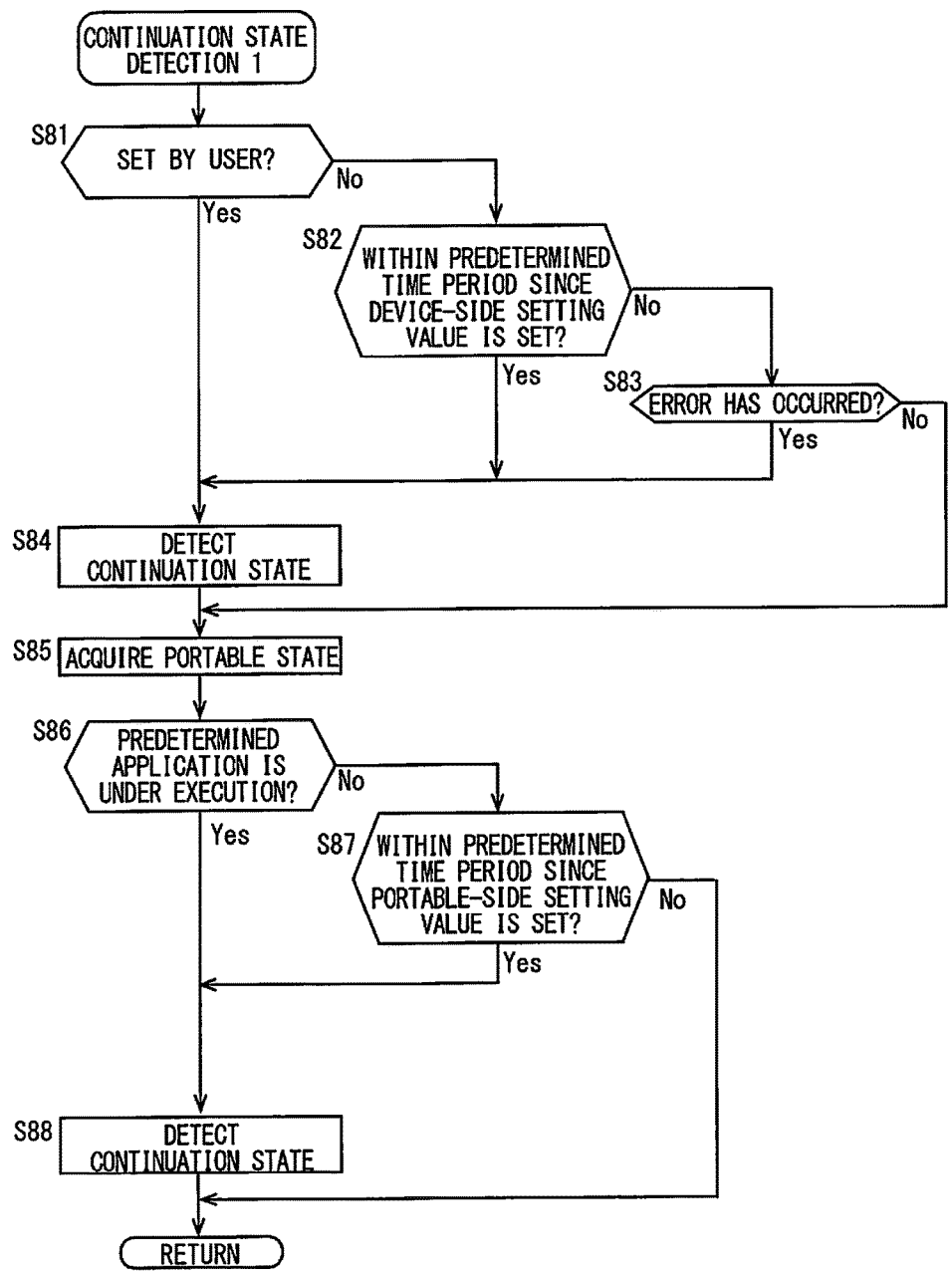
FIG. 12 is a flow chart showing one example of a flow of a continuation state detection process.

FIG. 12 is a flow chart showing one example of a flow of the continuation state detection process. The continuation state detection process is a process executed in the step S12 of FIG. 8. Referring to FIG. 12, the CPU 111 determines whether the continuation state is set by the user (step S81). If the continuation state is set by the user, the process proceeds to the step S84. If not, the process proceeds to the step S82. In the step S82, the CPU 111 determines whether a time period longer than a predetermined time period has elapsed since the device-side setting value is set. If a time period longer than the predetermined time period has not elapsed since the device-side setting value is set, the process proceeds to the step S84. If it has, the process proceeds to the step S83. The CPU 111 may determine whether a time period longer than a predetermined time period has elapsed since an operation for a task of executing a cooperation program is input. In addition to the operation of setting the device-side setting value, the operation for the task of executing the cooperation program includes an operation of scrolling a screen and an operation of making transition of screens, for example.

In the step S83, the CPU 111 determines whether an error has occurred in the hardware resource. If an error has occurred in the hardware resource, the process proceeds to the step S84. If not, the process proceeds to the step S85. In the step S84, the continuation state in the MFP 100 is detected, and the process proceeds to the step S85.

In the step S85, the CPU 111 acquires a portable state indicating the state of the smartphone 200A from the smartphone 200A, which is the cooperation device. Then, the CPU 111 determines whether the smartphone 200A, which is the cooperation device, is executing a predetermined application program based on the portable state (step S86). If the predetermined application program is under execution, the process proceeds to the step S88. If not, the process proceeds to the step S87. The predetermined application program is a predetermined application program different from the portable-side cooperation program for being in cooperation with the MFP 100 of the smartphone 200A, and includes an application program for calls and an application program for receiving emails, for example. This is because, in the middle of the setting of the cooperation process with the MFP 100A, the user A sometimes preferably takes a call when the smartphone 200A receives an incoming call or the user A preferably views emails in the case where the smartphone 200A receives emails.

In the step S87, the CPU 111 determines whether a time period longer than a predetermined time period has elapsed since a portable-side setting value is set. If a time period longer than the predetermined time period has not elapsed since the portable-side setting value is set, the process proceeds to the step S88. If it has, the process returns to the cooperation process. The CPU 111 may determine whether a time period longer than the predetermined time period has elapsed since an operation for a task of executing a portable-side cooperation program is input. In addition to the operation of setting the portable-side setting value, the operation for the task of executing the portable-side cooperation program includes an operation of scrolling the screen and an operation of making transition of the screens, for example. In the step S88, the continuation state in the cooperation device is detected, and the process returns to the cooperation process.

Figure 13:
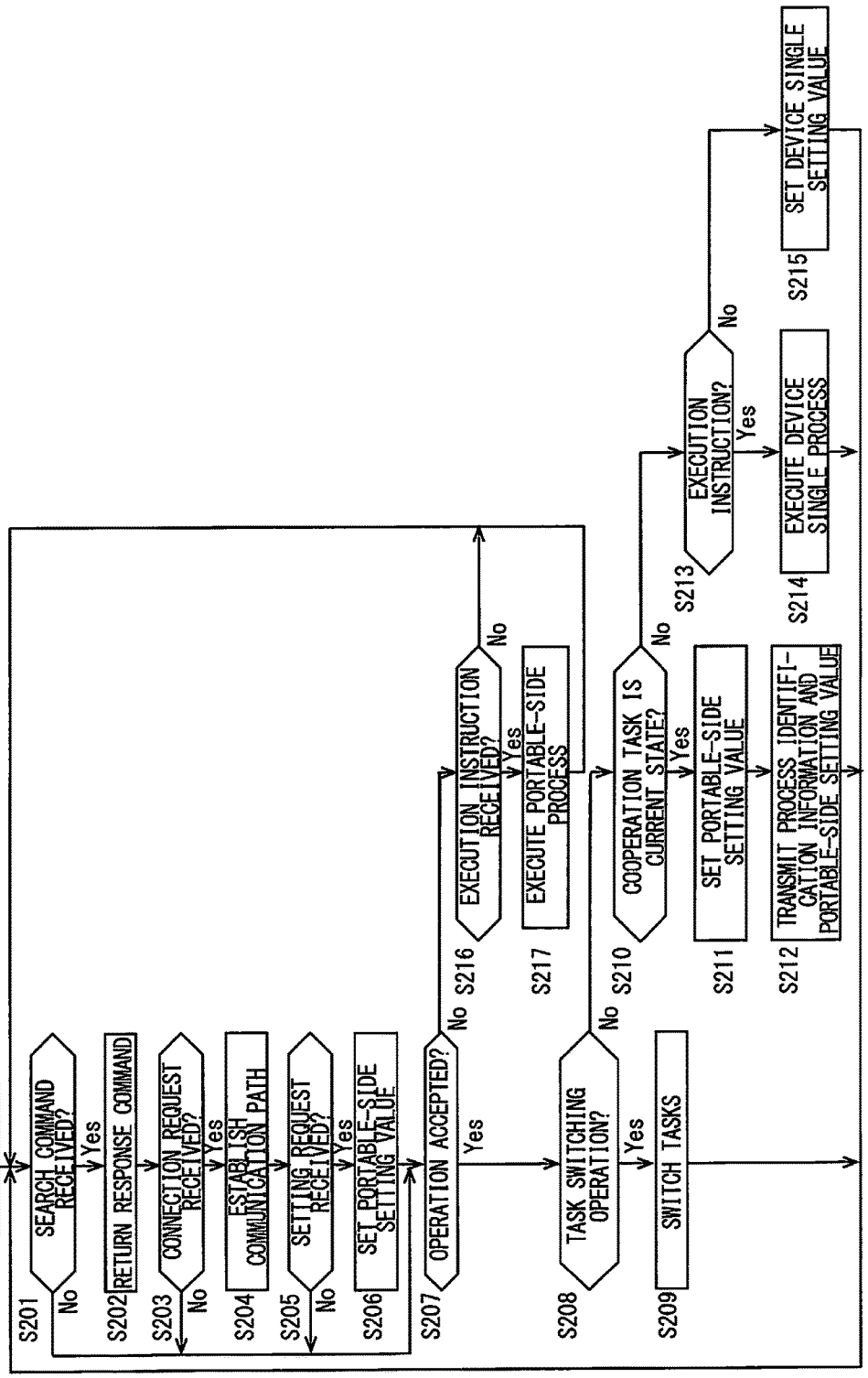
FIG. 13 is a flow chart showing one example of a flow of a portable-side cooperation process in the first embodiment.

FIG. 13 is a flow chart showing one example of a flow of the portable-side cooperation process in the first embodiment. The portable-side cooperation process is a process executed by the CPU 201 in the case where the CPU 201 included in the smartphone 200A executes the portable-side cooperation program stored in the flash memory 203 or the CD-ROM 211A. Referring to FIG. 13, the CPU 201 determines whether the short-range communication unit 209 has received a search command. If the search command has been received, the process proceeds to the step S202. If not, the process proceeds to the step S207. The case where the search command transmitted by the MFP 100 is received is described here as an example.

In the step S202, the CPU 201 controls the short-range communication unit 209, and returns a response command. Then, the CPU 201 determines whether the short-range communication unit 119 has received a connection request from the MFP 100 that has transmitted the search command that is received in the step S201 (step S203). If the connection request has been received, the process proceeds to the step S204. If not, the process proceeds to the step S207. In the step S204, the CPU 201 establishes a communication path with the MFP 100 that has transmitted the connection request, and the process proceeds to the step S205.

In the step S205, the CPU 201 determines whether the CPU 201 has received a setting request from the MFP 100. If the setting request has been received, the process proceeds to the step S206. If not, the step S206 is skipped, and the process proceeds to the step S207. In the step S206, the CPU 201 sets a portable-side setting value included in the setting request, and the process proceeds to the step S207.

In the step S207, it is determined whether an operation has been accepted. A position in the operation screen is specified based on a position detected by the touch panel 207B with an operation screen displayed in the display unit 206, and the operation is determined. In the case where the operation is determined, it is determined that the operation has been accepted. If the operation has been accepted, the process proceeds to the step S208. If not, the process proceeds to the step S216. In the case where a button to which an operation is assigned is included in the operation screen, and a position within the button is specified, the CPU 201 determines the operation assigned to the button as the operation specified by the user. For example, in the case where the operation screen is a keyboard, and a position within the key is specified, the CPU 201 determines an operation of inputting an alphanumeric character assigned to the key as the operation specified by the user. Further, in the case where an execution key, to which an execution instruction operation of giving an instruction to execute a process is assigned, is included in the operation screen, and a position within the execution key is specified, the CPU 201 determines the execution instruction operation as the operation specified by the user. Further, in the case where a switching key for switching tasks is included in the operation screen, and a position within the switching key is specified, the CPU 201 determines a task switching operation as the operation specified by the user.

In the step S208, if the operation accepted in the step S207 is the task switching operation, the process proceeds to the step S209. If not, the process proceeds to the step S210. In the step S209, the CPU 201 switches tasks, and the process returns to the step S201.

In the step S210, the CPU 201 determines whether a cooperation task is in the current state. If the cooperation task is in the current state, the process proceeds to the step S211. If not, the process proceeds to the step S212. In the step S211, the CPU 201 sets a portable-side setting value in accordance with the operation accepted in the step S207, and the process proceeds to the step S212. In the step S212, the CPU 201 transmits process identification information and a portable-side setting value of a portable-side process to the MFP 100 through the communication path established in the step S204, and the process returns to the step S201.

In the step 213, it is determined whether the operation accepted in the step S207 is the execution instruction operation. If the accepted operation is the execution instruction operation, the process proceeds to the step S214. If not, the process proceeds to the step S215. In the step S214, a device single process specified by the execution instruction operation is executed in accordance with a device single setting value, and the process returns to the step S201. In the step S215, the device single setting value is set in accordance with the operation accepted in the step S207, and the process returns to the step S201.

As described above, in the cooperation system 1 in the first embodiment, the MFP 100 detects the continuation state based on the state of the smartphone 200A, which is the cooperation device, or the state of the MFP 100. In the case where the smartphone 200A is no longer in contact with the display surface of the display unit 161, if the continuation state is detected, the cooperation mode is maintained. If the continuation state is not detected, the operation mode is switched to the single mode. Therefore, in the case where the smartphone 200A is no longer in contact with the display surface of the display unit 161, the operation mode can differ depending on presence or absence of detection of the continuation state. Further, because the continuation state is detected based on the state of the portable device or the state of the information processing apparatus, the MFP 100 can easily determine whether the cooperation mode is to be maintained. Further, in the case where the smartphone 200A is no longer in contact with the display surface of the display unit 161, if the continuation state is detected, the MFP 100 maintains the cooperation mode. Thus, the user A can continuously set a device-side setting value with the device-side setting value remaining unchanged since last set before the smartphone 200A is detached from the display surface of the display unit 161. Further, in the case where the smartphone 200A is no longer in contact with the display surface of the display unit 161, if the continuation state is not detected, the operation mode is switched to the single mode. Therefore, the user A can switch the operation modes of the MFP 100 with a simple operation of detaching the smartphone 200A from the display surface of the display unit 161. Therefore, in the case where the smartphone 200A is no longer in contact with the display surface of the display unit 161, the MFP 100 and the smartphone 200A can be appropriately switched between being in cooperation with each other and not being in cooperation with each other.

Further, in the case where the communication path established between the MFP 100 and the smartphone 200A is disconnected in the cooperation mode after the smartphone 200A is no longer in contact with the display surface of the display unit 161, the MFP 100 stores the device-side setting value in association with the smartphone 200A. Thereafter, in the case where the operation mode is switched from the single mode to the cooperation mode, if the device-side setting value associated with the smartphone 200A is stored, the MFP 100 restarts the setting of the device-side setting value. Thus, the user A can continuously set the device-side setting value with the device-side setting value remaining unchanged since last set before the communication path is disconnected during the cooperation mode after the smartphone 200A is no longer in contact with the display surface of the display unit 161.

Further, the MFP 100 detects the continuation state in the case where the smartphone 200A is executing a predetermined application program. Thus, the predetermined application program can be executed in the smartphone 200A during the cooperation mode. In particular, the predetermined application program is different from the portable-side cooperation program for being in cooperation with the MFP 100.

Further, the MFP 100 detects the continuation state in the case where a predetermined time period has not elapsed since a portable-side setting value used for execution of a portable-side process is accepted in the smartphone 200A. Therefore, the user A can detach the smartphone 200A from the display surface of the display unit 161, and continuously set the portable-side setting value.

Further, because the MFP 100 detects the continuation state in the case where a predetermined time period has not elapsed since a device-side setting value is accepted, the user A can detach the smartphone 200A from the display surface of the display unit 161 and continuously set the device-side setting value.

Further, MFP 100 detects the continuation state in the case where a defect has occurred in the hardware resource. Therefore, after the defect is resolved, the user A can continuously set the portable-side setting value in the smartphone 200A and the device-side setting value in the MFP 100.

<Second Embodiment>

As for the cooperation system 1 in the second embodiment, differences from the cooperation system 1 in the first embodiment will be mainly explained.

Figure 14:
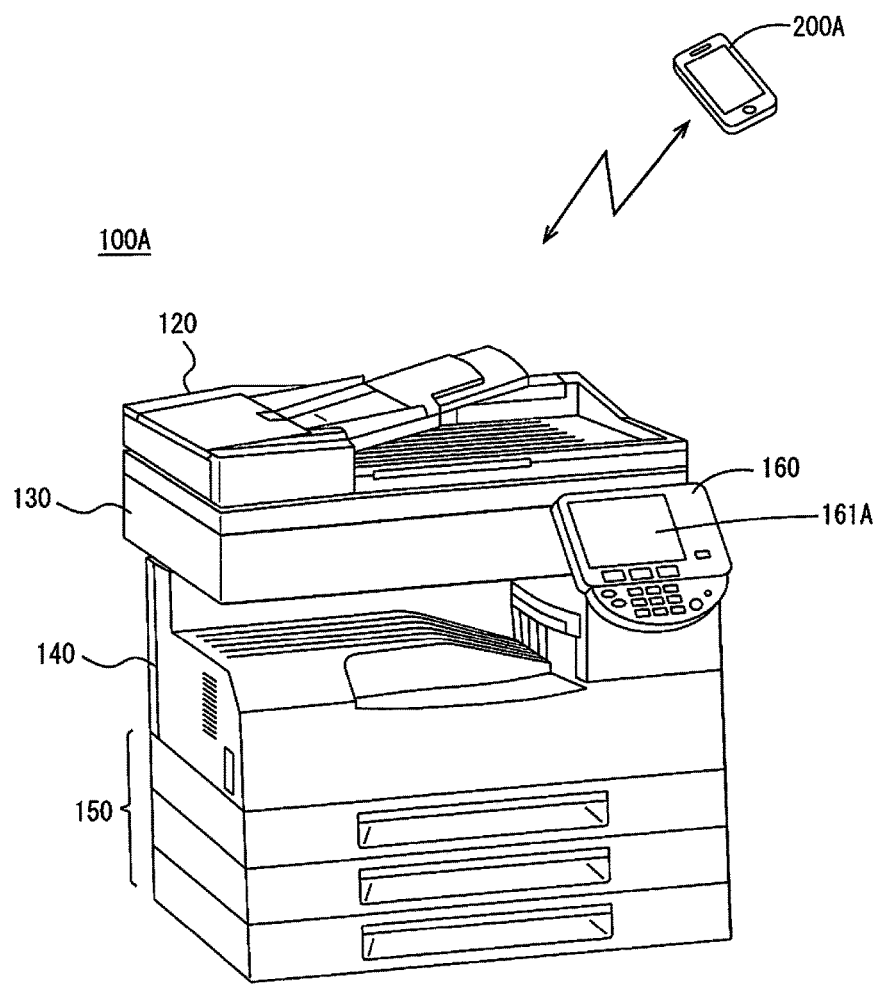
FIG. 14 is a diagram showing one example of an overview of a cooperation system in a second embodiment.

FIG. 14 is a diagram showing one example of an overview of the cooperation system in the second embodiment. Referring to FIG. 1, the cooperation system 1A in the second embodiment includes an MFP 100A and the smartphone 200A. The MFP 100 in the first embodiment can be simultaneously used by a plurality of users. However, the MFP 100A in the second embodiment cannot be simultaneously used by a plurality of users, and can be used by one user. The case where the user A who carries the smartphone 200A operates the MFP 100A will be described here as an example. In the cooperation system 1A in the second embodiment, the smartphone 200A and the MFP 100A can execute a cooperation process in cooperation with each other. The smartphone 200A and the MFP 100A communicate using a short-range communication function or a wireless LAN function, and executes the cooperation process in cooperation with each other. The MFP 100A in the second embodiment switches the operation mode to the cooperation mode in which the MFP 100A operates in cooperation with the smartphone 200A carried by the user A when triggered by satisfaction of a predetermined cooperation start condition.

Figure 15:
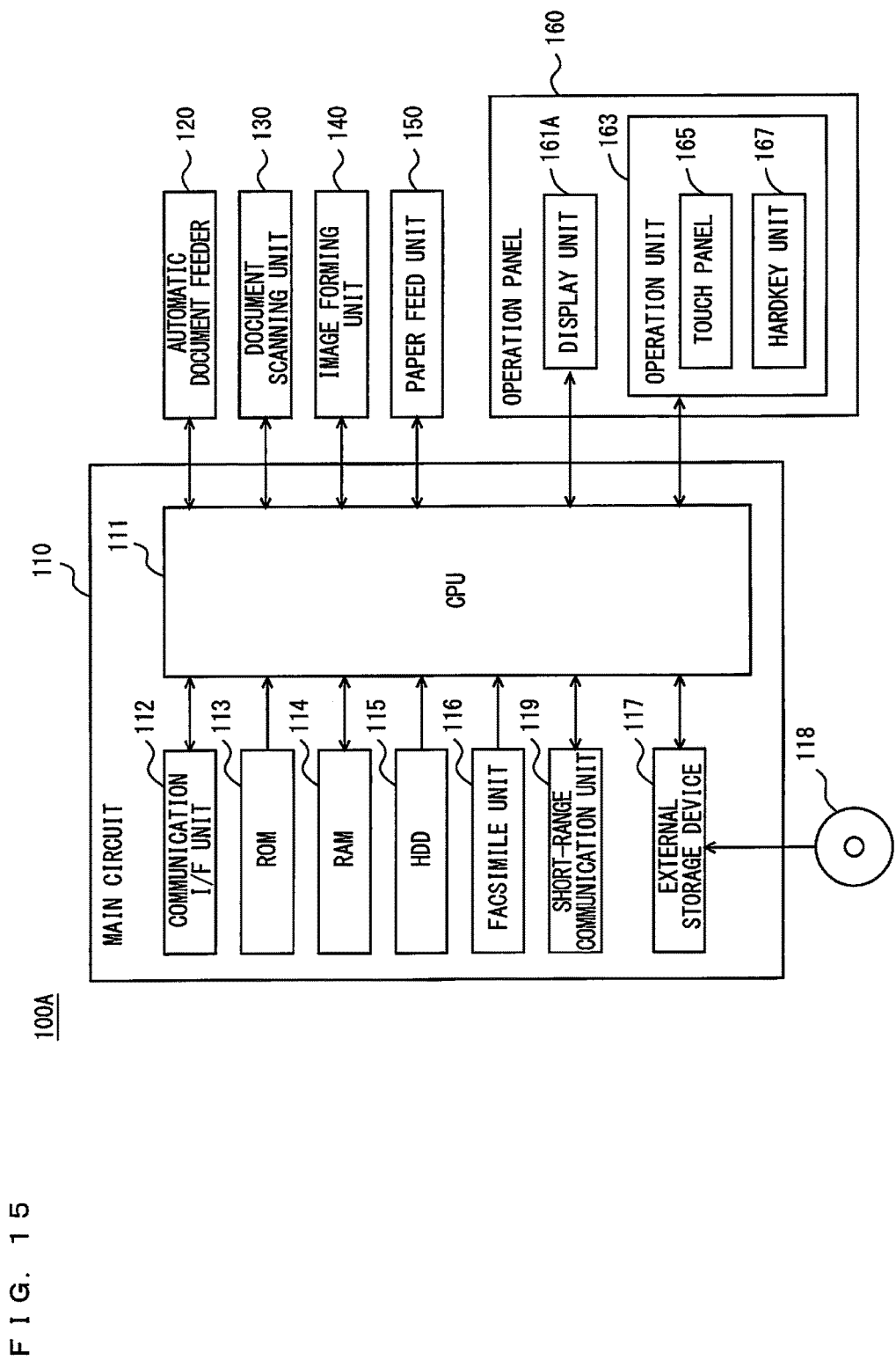
FIG. 15 is a block diagram showing one example of a hardware configuration of an MFP in the second embodiment.

FIG. 15 is a block diagram showing one example of hardware configurations of the MFP in the second embodiment. Referring to FIGS. 14 and 15, the MFP 100A in the second embodiment is different from the MFP 100 in the first embodiment in that an automatic document feeder 120 is added, and that an operation panel 160 is added. The other configurations of the MFP 100A are the same as the MFP 100 in the first embodiment. A description therefore will not be repeated.

The automatic document feeder 120 sorts one or more documents placed on a document tray by the user, and transports them to the document scanning unit 130 one by one. Further, in the case where images are formed on both sides of the document, the automatic document feeder 120 has a function of reversing the document from the front to the back, and transports the document with a surface of the document facing in a direction, so that the front surface can be scanned by the document scanning unit 130. Thereafter, the automatic document feeder 120 reverses the document, and transports a document with the back surface of the document facing in a direction, so that the back surface can be scanned by the document scanning unit 130.

The operation panel 160 includes a display unit 161A and an operation unit 163. The display unit 161A is a display device such as an LCD or an organic ELD, and has a size smaller than that of the display unit 161 in the first embodiment. The operation unit 163 includes a hard key unit 167 including a plurality of keys, and accepts input of a variety of instructions and data such as characters and numerals through an operation corresponding to the key by the user. The touch panel 165 is provided on an upper surface or a lower surface of the display unit 161A in a superimposed manner, and detects a position designated by the user in the display surface of the display unit 161A.

Figure 16:
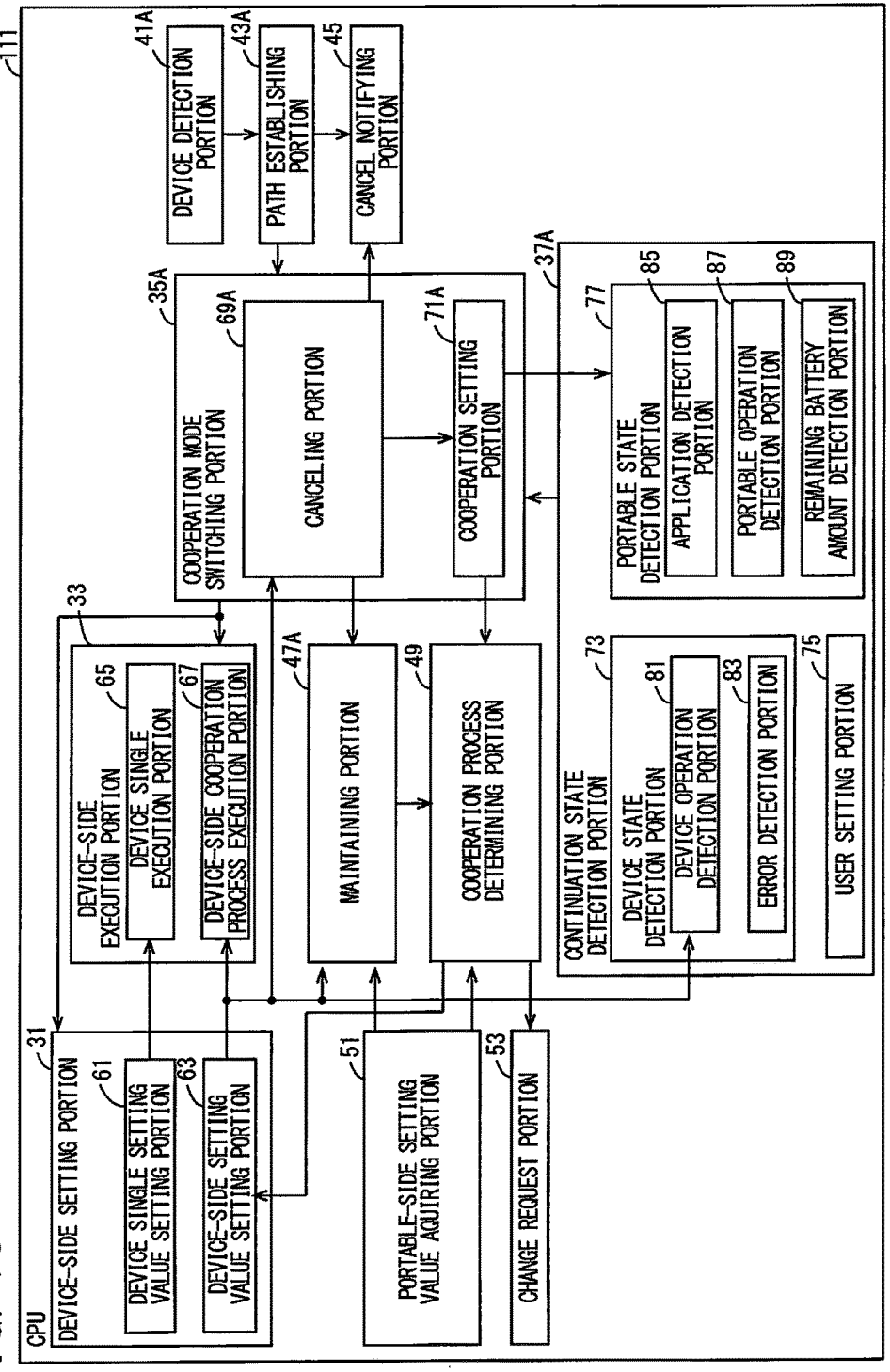
FIG. 16 is a block diagram showing one example of functions of a CPU included in the MFP in the second embodiment.

FIG. 16 is a block diagram showing one example of functions of the CPU included in the MFP in the second embodiment. The functions shown in FIG. 16 are functions formed in a CPU 111 in the case where the CPU 111 included in the MFP 100 executes a cooperation program stored in a ROM 113, an HDD 115 or a CD-ROM 118.

Referring to FIG. 16, differences from the functions shown in FIG. 4 are that the cooperation mode switching portion 35, the device detection portion 41, the path establishing portion 43, the maintaining portion 47, the continuation state detection portion 37 are changed to a cooperation mode switching portion 35A, a device detection portion 41A, a path establishing portion 43A, a maintaining portion 47A and a continuation state detection portion 37A, respectively. The continuation state detection portion 37A is different from the continuation state detection portion 37 shown in FIG. 4 in that the portable state detection portion 77 includes a remaining battery amount detection portion 89. The other functions are the same as the functions shown in FIG. 4. A description therefore will not be repeated.

The device detection portion 41A controls the short-range communication unit 119, and detects the smartphone 200A. In the case where the short-range communication unit 119 communicates using a communication system of NFC, if the user A brings the smartphone 200A close to an antenna of the short-range communication unit 119, the device detection portion 41A detects the smartphone 200A. The device detection portion 41A outputs an establishing instruction to the path establishing portion 43A. The establishing instruction includes device identification information of the smartphone 200A.

In response to reception of the establishing instruction from the device detection portion 41A, the path establishing portion 43A specifies a device to which the MFP 100 is to be connected based on the device identification information included in the establishing instruction, controls the communication I/F unit 112, establishes the communication path with the specified device, and outputs a cooperation instruction to the cooperation mode switching portion 35. The establishing instruction includes the device identification information of the smartphone 200A, so that the path establishing portion 43A establishes the communication path with the smartphone 200A and outputs the cooperation instruction to the cooperation mode switching portion 35. The cooperation instruction includes the device identification information of the device with which the path establishing portion 43A has established the communication path, that is, the smartphone 200A in this case, and path identification information for identifying the communication path.

In the case where the established communication path is disconnected, the path establishing portion 43A outputs a disconnection signal including the path identification information of the disconnected communication path to the cooperation mode switching portion 35. The communication path is disconnected in the case where the smartphone 200A is moved to the outside of a range in which the communication I/F unit 112 can communicate with the smartphone 200A, and the case where the smartphone 200A disconnects the communication path, for example.

In the case where the short-range communication unit 119 can communicate with a distance to the smartphone 200A being larger than a communicable distance defined by the communication system of NFC, the device detection portion 41A allows the short-range communication unit 119 to transmit search commands at predetermined time intervals, and detects a device with which the short-range communication unit 119 has become communicable. The path establishing portion 43A may control the short-range communication unit 119 or the communication I/F unit 112, and establish a communication path with the device detected by the device detection portion 41A.

The device detection portion 41A may perform user authentication before outputting an establishing instruction to the path establishing portion 43A. For example, authentication information, which associates the user identification information of the user who is authenticated to use the MFP 100 with device identification information of the device assigned to the user, is stored in the HDD 115 in advance. In the case where the authentication information, including the device identification information of the detected device, is stored in the HDD 115, the device detection portion 41A outputs the establishing instruction to the path establishing portion 43A. However, if such authentication information is not stored in the HDD 115, the device detection portion 41A does not output the establishing instruction to the path establishing portion 43A. Only the user who has been registered in the MFP 100 in advance can be allowed to use the MFP 100.

The cooperation mode switching portion 35A switches the operation mode to either the single mode or the cooperation mode. The cooperation mode switching portion 35A outputs an operation mode signal indicating either the single mode or the cooperation mode to the device-side setting portion 31, the device-side execution portion 33 and the continuation state detection portion 37A.

The cooperation mode switching portion 35A includes a cooperation setting portion 71A and a canceling portion 69A. In response to satisfaction of a cooperation start condition, the cooperation setting portion 71A switches the operation mode from the single mode to the cooperation mode. Here, the cooperation start condition is that the communication I/F unit 112 establishes a communication path after the short-range communication unit 119 has become communicable with the smartphone 200A. In response to reception of a cooperation instruction from the path establishing portion 43A, the cooperation setting portion 71A switches the operation mode corresponding to the device identification information included in the cooperation instruction from the single mode to the cooperation mode.

In the case where a cooperation end condition is satisfied, the canceling portion 69A switches the operation mode from the cooperation mode to the single mode. The cooperation end condition is that an operation of ending the cooperation is input by the user, or that the communication path is disconnected. Further, in the case where the operation mode is switched from the cooperation mode to the single mode, if a continuation signal, indicating that the MFP100 is in the continuation state, is received from the continuation state detection portion 37A, the canceling portion 69A outputs a maintaining signal to the maintaining portion 47A. The continuation signal includes the device identification information of the smartphone 200A. In the case where a disconnection signal is received, when a continuation signal including the device identification information that is the same as the device identification information included in the disconnection signal is received, the canceling portion 69A switches the operation mode corresponding to the device identification information included in the disconnection signal from the cooperation mode to the single mode, and outputs a maintaining instruction to the maintaining portion 47A and the cooperation setting portion 71A. The maintaining instruction includes the device identification information included in the disconnection signal.

The canceling portion 69A sometimes receives a cooperation end instruction from a device-side setting value setting portion 63, described below. While the details of the cooperation end instruction will be described below, the cooperation end instruction is output by the device-side setting value setting portion 63 in the case where the user A gives an instruction to end the cooperation process, and includes the device identification information of the smartphone 200A carried by the user A. In the case where receiving a cooperation end instruction from the device-side setting value setting portion 63, the canceling portion 69A determines that the cooperation end condition is satisfied, switches an operation mode corresponding to the device identification information included in the cooperation end instruction from the cooperation mode to the single mode, and outputs an end notifying instruction to the cancel notifying portion 45. The end notifying instruction includes the device identification information included in the cooperation end instruction.

In the case where receiving a maintaining instruction from the canceling portion 69A and then receiving a cooperation instruction including the device identification information that is the same as the device identification information included in the maintaining instruction from the path establishing portion 43A, the cooperation setting portion 71A determines that the connection path between the MFP 100 and the smartphone 200A is to be reconnected. In the case where determining that the connection path between the MFP 100 and the smartphone 200A is to be reconnected, the cooperation setting portion 71A switches the operation mode corresponding to the device identification information included in the cooperation instruction from the single mode to the cooperation mode, and outputs a restoring instruction to the cooperation process determining portion 49. The restoring instruction includes the device identification information included in the maintaining instruction.

The maintaining portion 47A receives a set of process identification information, a device-side setting value and device identification information from the device-side setting value setting portion 63, and receives device identification information and portable-side information from the portable-side setting value acquiring portion 51. In response to reception of the maintaining instruction from the canceling portion 69A, the maintaining portion 47A stores the process identification information and the device-side setting value that make a set with the device identification information included in the maintaining instruction, and the portable-side information that makes a set with the device identification information and is last received from the portable-side setting value acquiring portion 51 in RAM 114 in association with the device identification information.

The remaining battery amount detection portion 89 inquires the smartphone 200A of a remaining amount of battery through the communication path specified by the path identification information that makes a set with the device identification information of the smartphone 200A. In the case where the remaining amount of battery of the smartphone 200A is equal to or less than a predetermined threshold value T, the remaining battery amount detection portion 89 outputs a continuation signal including the device identification information of the smartphone 200A to the cooperation mode switching portion 35. In the case where the remaining amount of battery of the smartphone 200A is equal to or less than the threshold value T, a time period during which the smartphone 200A is operable thereafter is limited. Therefore, in the case where the remaining amount of battery of the smartphone 200A decreases, and the smartphone 200A can no longer communicate with the MFP 100A, the communication path is disconnected. However, in the MFP 100A, the continuation state is detected in the case where the remaining amount of battery of the smartphone 200A is equal to or less than the threshold value T. Therefore, a device-side setting value set by the device-side setting value setting portion 63 and a portable-side setting value set in the smartphone 200A are stored in the MFP 100A. Thereafter, in the case where the battery of the smartphone 200A is charged, and then the smartphone 200A is allowed to be in cooperation with the MFP 100A again, the device-side setting value and the portable-side setting value that have been set earlier can be restored, and the user can continue with the setting for execution of the cooperation process.

Figure 17:
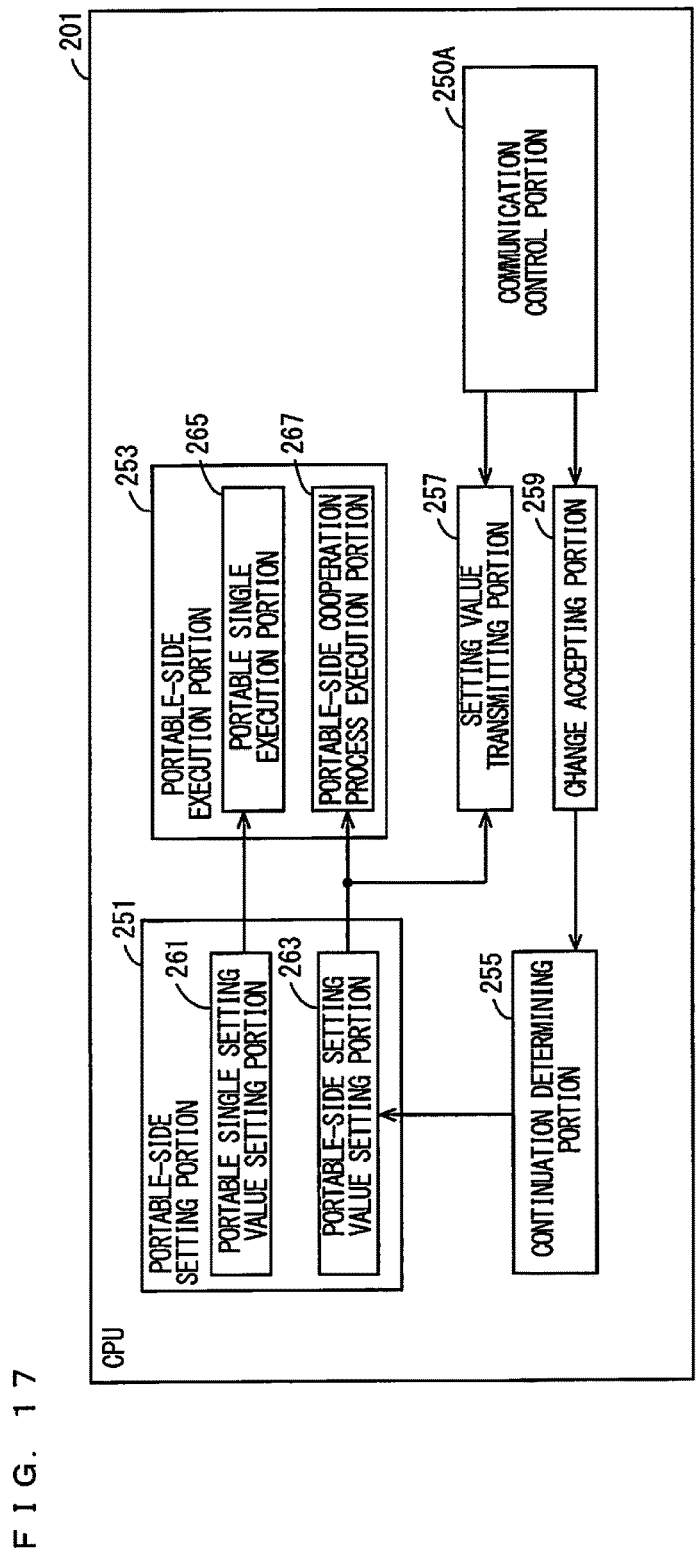
FIG. 17 is a diagram showing one example of functions of the CPU included in a smartphone in the second embodiment.

FIG. 17 is a diagram showing one example of functions of the CPU included in the smartphone in the second embodiment. Referring to FIG. 17, a difference from the functions shown in FIG. 7 is that the communication control portion 250 is changed to a communication control portion 250A. The other functions are the same as the functions shown in FIG. 7. A description therefore will not be repeated.

The communication control portion 250A controls the short-range communication unit 209 and detects the MFP 100. In the case where the user A brings the smartphone 200A close to an antenna of the short-range communication unit 119 included in the MFP 100A, the short-range communication unit 209 detects the MFP 100. The short-range communication unit 209 detects the MFP 100, and then the communication control portion 250A controls the wireless LAN I/F 208. Then, in response to reception of a connection request from the MFP 100A, the communication control portion 250A establishes a communication path with the MFP 100A, and outputs the device identification information of the MFP 100A and the path identification information of the communication path to the setting value transmitting portion 257 and the change accepting portion 259.

Figure 18:
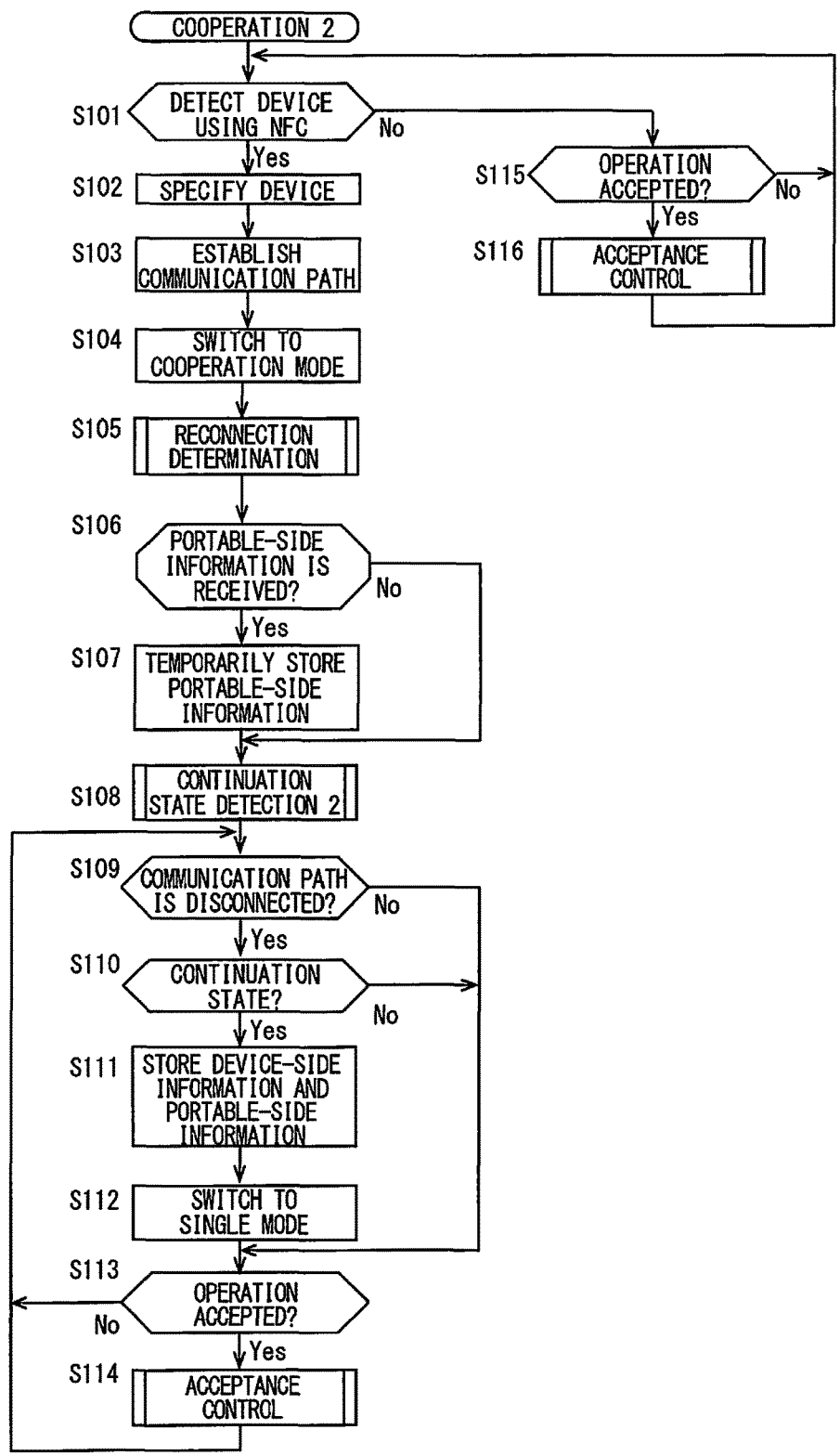
FIG. 18 is a flow chart showing one example of a flow of a cooperation process in the second embodiment.

FIG. 18 is a flow chart showing one example of a flow of a cooperation process in the second embodiment. The cooperation process in the second embodiment is executed by the CPU 111 in the case where the CPU 111 included in the MFP 100A executes a cooperation program, in the second embodiment, that is stored in the ROM 113, the HDD 115 or the CD-ROM 118. Referring to FIG. 18, the CPU 111 determines whether the short-range communication unit 119 that communicates using an NFC standard has detected a device (step S101).

If the short-range communication unit 110 has detected a device, the process proceeds to the step S102. If not, the process proceeds to the step S115. In the next step S116, the CPU 111 executes an acceptance control process shown in FIG. 11, and the process returns to the step S101.

In the step S115, the CPU 111 determines whether an operation has been accepted. In the case where the touch panel 165 detects a position designated by the user, the CPU 111 detects the operation. If the CPU 111 detects the operation, the process proceeds to the step S116. If not, the process returns to the step S101.

In the step S102, the CPU 111 detects a device detected by the short-range communication unit 119, and the process proceeds to the step S103. The CPU 111 receives the device identification information from the device, thereby specifying the device. The case where the smartphone 200A is detected is described here as an example. In the case where the device is specified in the step S102, and the user who carries the device is registered in advance, the CPU 111 may accept an operation. In this case, the step S102 is performed, and then the step S103 or the step S115 is performed.

In the step S103, the CPU 111 controls the communication I/F unit 112, and establishes a communication path with the device, which is specified in the step S102, that is, the smartphone 200A in this case, and the process proceeds to the step S104. In the step S104, the operation mode is switched to the cooperation mode, and the process proceeds to the step S105. In the step S105, the CPU 111 executes the reconnection determination process shown in FIG. 10, and the process proceeds to the step S106.

In the step S106, whether the portable-side information has been received is determined. Whether the portable-side information has been received from the device, which is detected in the step S102, that is, the smartphone 200A in this case, is determined. The portable-side information includes the process identification information of the portable-side process set in the smartphone 200A, which is the cooperation device, and a portable-side setting value for execution of the portable-side process. If the portable-side information has been received, the process proceeds to the step S107. If not, the process proceeds to the step S108. In the step S107, the CPU 111 temporarily stores the portable-side information in the RAM 114 in association with the device identification information of the smartphone 200A, which is the cooperation device, and the process proceeds to the step S108.

In the step S108, the CPU 111 executes a continuation state detection process, and the process proceeds to the step S109. While details of the continuation state detection process will be described below, the continuation state detection process is a process of detecting a continuation state in which the cooperation mode is to be maintained. In the step S109, the CPU 111 determines whether a communication path established with the smartphone 200A, which is a cooperation device, has been disconnected. If the communication path has been disconnected, the process proceeds to the step S110. If not, the process proceeds to the step S113.

In the step S110, the CPU 111 determines whether a continuation state has been detected in the continuation state detection process executed in the step S108. If the continuation state has been detected, the process proceeds to the step S111. If not, the process proceeds to the step S113.

In the step S111, the CPU 111 stores the device-side information and the portable-side information of the cooperation device in the RAM 114 in association with the device identification information of the smartphone 200A, which is the cooperation device, and the process proceeds to the step S112. In the step S112, the operation mode is switched from the cooperation mode to the single mode, and the process proceeds to the step S113.

In the step S113, similarly to the step S115, the CPU 111 determines whether an operation has been accepted. If the operation has been accepted, the process proceeds to the step S114. If not, the process returns to the step S109. In the step S114, the CPU 111 executes the acceptance control process shown in FIG. 11, and the process returns to the step S109.

Figure 19:
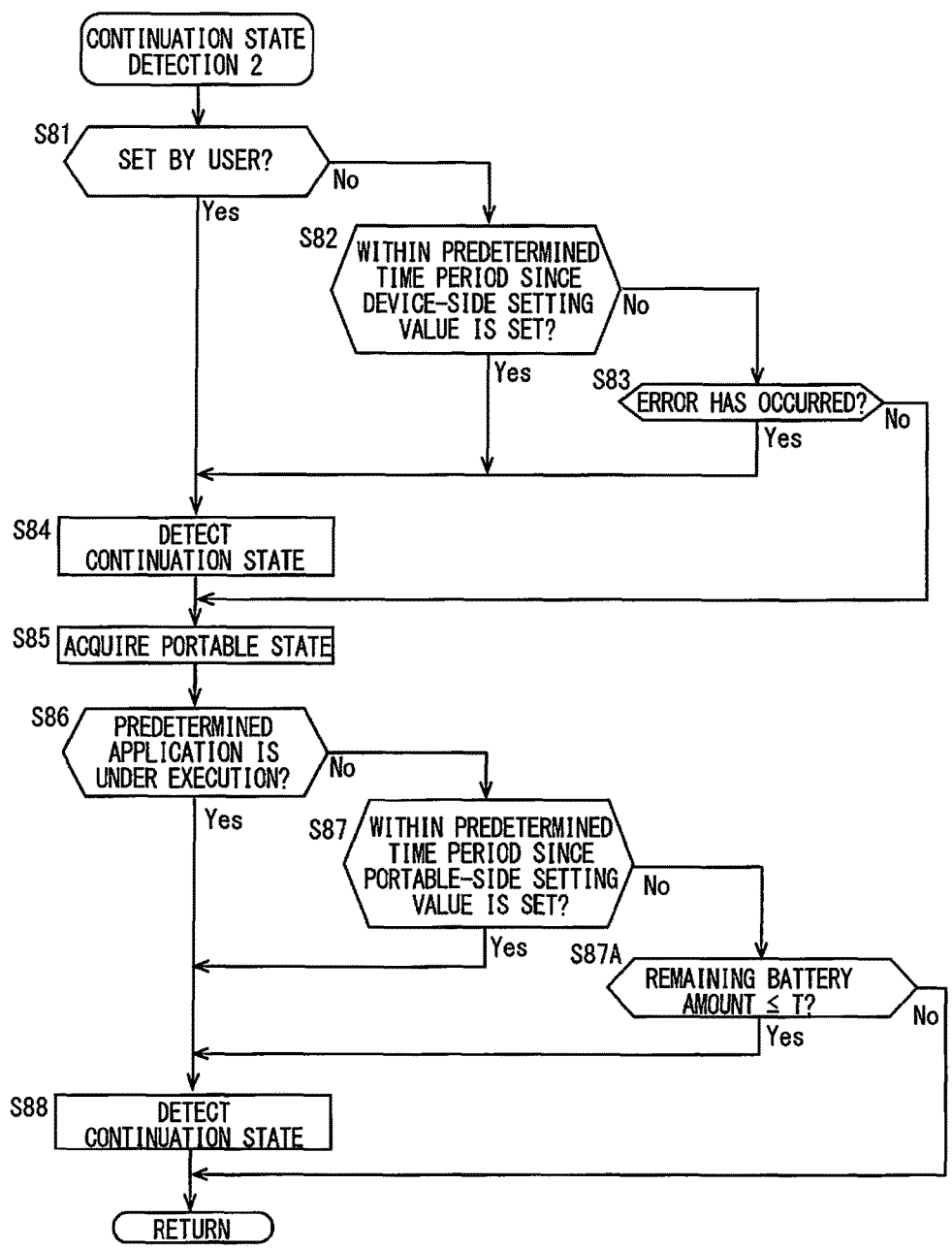
FIG. 19 is a diagram showing one example of a flow of a continuation state detection process in the second embodiment.

FIG. 19 is a diagram showing one example of a flow of the continuation state detection process in the second embodiment. Referring to FIG. 19, a difference from the continuation state detection process in the first embodiment that is shown in FIG. 12 is that the step S87A is added. The rest of the process is the same as the process shown in FIG. 12. A description therefore will not be repeated.

In the step S87, in the case where it is determined that a time period equal to or longer than a predetermined time period has elapsed since the portable-side setting value is set, the process proceeds to the step S87A. In the step S87A, the CPU 111 determines whether a remaining amount of battery incorporated in the smartphone 200A, which is the cooperation device, is equal to or less than a threshold value T. If the remaining amount of battery incorporated in the smartphone 200A, which is the cooperation device, is equal to or less than the threshold value T, the process proceeds to the step S88. If not, the process returns to the cooperation process.

Figure 20:
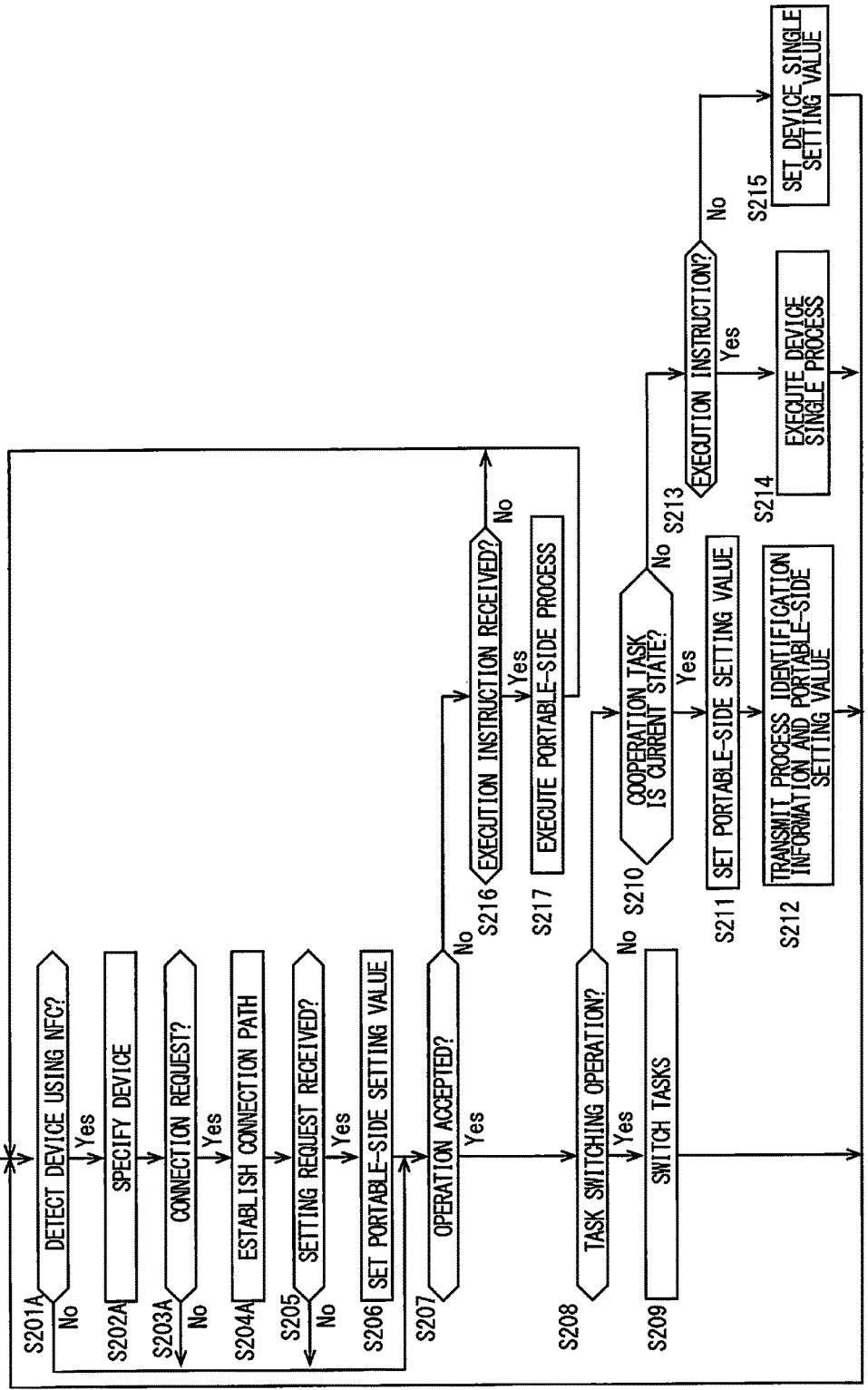
FIG. 20 is a flow chart showing one example of a flow of a portable-side cooperation process in the second embodiment.

FIG. 20 is a flow chart showing one example of a flow of the portable-side cooperation process in the second embodiment. Differences from the portable-side cooperation process in the first embodiment that is shown in FIG. 13 are that the steps S201 to S204 are changed to the steps S201A to 5204A, respectively. The rest of the process is the same as the process shown in FIG. 13. A description therefore will not be repeated.

Referring to FIG. 20, the CPU 201 determines in the step S201A whether the short-range communication unit 209 that communicates using the NFC standard has detected a device. If the device has been detected, the process proceeds to the step S202A. If not, the process proceeds to the step S207. The case where the MFP 100A is detected is described here as an example.

In the step S202A, the CPU 201 controls the short-range communication unit 209, and transmits a response command to the MFP 100A. Then, in the next step S203A, the CPU 201 controls the wireless LAN I/F 208, and determines whether a connection request has been received from the MFP 100A. If the connection request has been received, the process proceeds to the step S204A. If not, the process proceeds to the step S207. In the step S204A, the CPU 201 controls the wireless LAN I/F 208 and establishes a communication path with the MFP 100A, and the process proceeds to the step S205.

<Second Modified Example>

The device detection portion 41A allows the short-range communication unit 119, which can communicate using a communication system based on the NFC standard, to detect the smartphone 200A. In the second modified example, the smartphone 200A receives radio waves from a GPS satellite, so that a current position of the smartphone 200A is measured. The device detection portion 41A in the second modified example acquires the current position from the smartphone 200A, and determines a position of the smartphone 200A relative to the MFP 100A from the acquired current position of the smartphone 200A and the position at which the MFP 100A is arranged. Then, in the case where the smartphone 200A is present within a predetermined range from the MFP 100A, the device detection portion 41A detects the smartphone 200A.

<Third Modified Example>

The device detection portion 41A may detect the smartphone 200A by performing human body communication with a human body used as a medium. Specifically, when becoming communicable with an IC tag (an integrated circuit), which is owned by the user A and can perform the human body communication, the device detection portion 41A in the third modified example detects the smartphone 200A carried by the user A.

<Fourth Modified Example>

The CPU 111 may detect the smartphone 200A using a position of the user A that is controlled by a room access control system for controlling user access to the room. In this case, the MFP 100A is provided in a work room controlled by the room access control system, and each of a plurality of users carries a unique IC tag.

The room access control system has a memory in which the user identification information for identifying holders of IC tags, and a tag scanning unit for scanning the IC tags. When entering the work room, the user allows his or her IC tag to be close to or in contact with the tag scanning unit of the room access control system. The tag scanning unit detects the entry of the user and specifies the user identification information for identifying a holder of an IC tag by scanning the IC tag that has been close to or in contact with the tag scanning unit. Further, when exiting the work room, the user allows his or her IC tag to be close to or in contact with the tag scanning unit of the room access control system. The tag scanning unit detects the exit of the user from the room by scanning the IC tag that has been close to or in contact with the tag scanning unit.

The device detection portion 41A in the fourth modified example acquires a position of the work room and the user identification information of the user who has entered the work room from the room access control system. The device detection portion 41A in the fourth modified example acquires a position of the work room and the user identification information of the user who has exited the work room from the room access control system. In the case where specifying the user, who has entered the work room where the MFP 100A is arranged, based on a set of the position of the user and the user identification information acquired from the room access control system, the device detection portion 41A in the fourth modified example detects a smartphone carried by the specified user. In the case where the MFP 100A is arranged in a work room A, for example, the device detection portion 41A detects the smartphone 200A carried by the user A in response to acquisition of a position of the work room A and the user identification information of the user A from the room access control system. Because the user identification information for identifying the holder of the IC tag used in the room access control system is used, the user can be identified.

<Fifth Modified Example>

The MFP 100A may be provided with a function of performing image authentication of the user A who is present around the MFP 100A, and detect the smartphone 200A by using a result of authentication. The MFP 100A includes a camera that includes the surroundings of the MFP 100A in a field of view. At a time point at which the user A enters the field of view of the camera, the MFP 100A performs authentication of the user A based on an image output by the camera that has picked up an image of the user A who is a photographic subject. In the case where the authentication of the user A is successful, the device detection portion 41A in the fifth modified example detects the smartphone 200A carried by the user A.

<Sixth Modified Example>

The MFP 100A may detect a position of the user who is present around the MFP 100A, and may detect a device with which the short-range communication unit 119 has become communicable. The MFP 100A includes a human detection sensor, and detects a position of a user who is present around the MFP 100A. The human detection sensor is an infrared sensor or a pyroelectric sensor, for example. Further, the human detection sensor may detect a human by extracting an image of a person from images picked up by the camera.

After a human is detected by the human detection sensor, the device detection portion 41A detects a device with which the short-range communication unit 119 has become communicable. For example, when approaching the MFP 100A, the user A is detected by the human detection sensor. The human detection sensor detects the human, and then the device detection portion 41A detects the smartphone 200A with which the short-range communication unit 119 has become communicable.

As described above, in the cooperation system 1A in the second embodiment, the MFP 100A detects a continuation state based on a state of the smartphone 200A, which is the cooperation device, and a state of the MFP 100. In the case where the continuation state is detected in a stage where the cooperation mode is switched to the single mode in response to disconnection of the communication path established between the MFP 100A and the smartphone 200A, the MFP 100A stores a device-side setting value in association with the smartphone 200A. Then, in the case where the operation mode is switched to the cooperation mode, if the device-side setting value associated with the smartphone 200A is stored, the MFP 100A restarts the setting of the device-side setting value. Therefore, the user A can continuously set the device-side setting value, which has remained unchanged since last set before the disconnection of the communication path. Further, in the case where the operation mode is switched to the cooperation mode, if the device-side setting value associated with the smartphone 200A is not stored, setting of the device-side setting value is performed from its beginning Therefore, the user A can reset the device-side setting value, which is set before the disconnection of the communication path. Therefore, the device-side setting value, for the device-side process executed in the MFP 100A that is in cooperation with the smartphone 200A, can be set to an appropriate value.

Further, in the case where the smartphone 200A is executing a predetermined application program, the MFP 100A detects the continuation state. Therefore, in the case where the operation mode is switched to the cooperation mode after the execution of the predetermined application program in the smartphone 200A and the disconnection of the communication path, the user A can continuously set the device-side setting value with the device-side setting value remaining unchanged since last set before the disconnection of the communication path. In particular, the predetermined application program is different from the portable-side cooperation program for being in cooperation with the MFP 100A.

Further, in the case where a predetermined time period has not elapsed since the portable-side setting value used for execution of the portable-side process is accepted in the smartphone 200A, the MFP 100A detects the continuation state. Therefore, in the case where the communication path is disconnected when the user is setting the portable-side setting value in the smartphone 200A, and then the operation mode is switched to the cooperation mode, the user A can continuously set the device-side setting value with the device-side setting value remaining unchanged since last set before the disconnection of the communication path.

In the case where a predetermined time period has not elapsed since the device-side setting value used for execution of the device-side process is accepted, the MFP 100A detects the continuation state. Therefore, in the case where the communication path is disconnected when the user is setting the device-side setting value, and then the operation mode is switched to the cooperation mode, the user A can continuously set the device-side setting value with the device-side setting value remaining unchanged since last set before the disconnection of the communication path.

Further, in the case where a defect occurs in a hardware resource, the MFP 100A detects the continuation state. Therefore, in the case where the communication path is disconnected when a defect is present in a hardware resource, and then the operation mode is switched to the cooperation mode, the user A can continuously set the device-side setting value with the device-side setting value remaining unchanged since last set before the disconnection of the communication path.

Further, the MFP 100A detects the continuation state in the case where a remaining amount of battery that stores power for driving the smartphone 200A is equal to or less than a predetermined value. Therefore, in the case where the smartphone 200A is no longer driven, and then the communication path is disconnected, when the operation mode is switched to the cooperation mode after the battery is charged, the user A can continuously set the device-side setting value with the device-side setting value remaining unchanged since last set before the disconnection of the communication path.

<Third Embodiment>

In the second embodiment, the portable-side information is acquired from the smartphone 200A in the MFP 100A. The maintaining portion 47A stores the process identification information and the device-side setting value that are set by the device-side setting value setting portion 63, and the portable-side information last received by the portable-side setting value acquiring portion 51 from the smartphone 200A in the RAM 114 in association with the device identification information of the smartphone 200A. In the cooperation system 1A in the third embodiment, the MFP 100A does not acquire the portable-side information from the smartphone 200A. As for the cooperation system 1A in the third embodiment, differences from the cooperation system in the second embodiment will be mainly described below.

The overview of the cooperation system 1A in the third embodiment is the same as the overview of the cooperation system in the second embodiment shown in FIG. 14. The hardware configuration of the MFP 100A in the third embodiment is the same as the hardware configuration of the MFP 100A in the second embodiment shown in FIG. 15. The hardware configuration of the smartphone 200A in the third embodiment is the same as the hardware configuration of the smartphone 200A in the first embodiment shown in FIG. 3. A description therefore will not be repeated.

Figure 21:
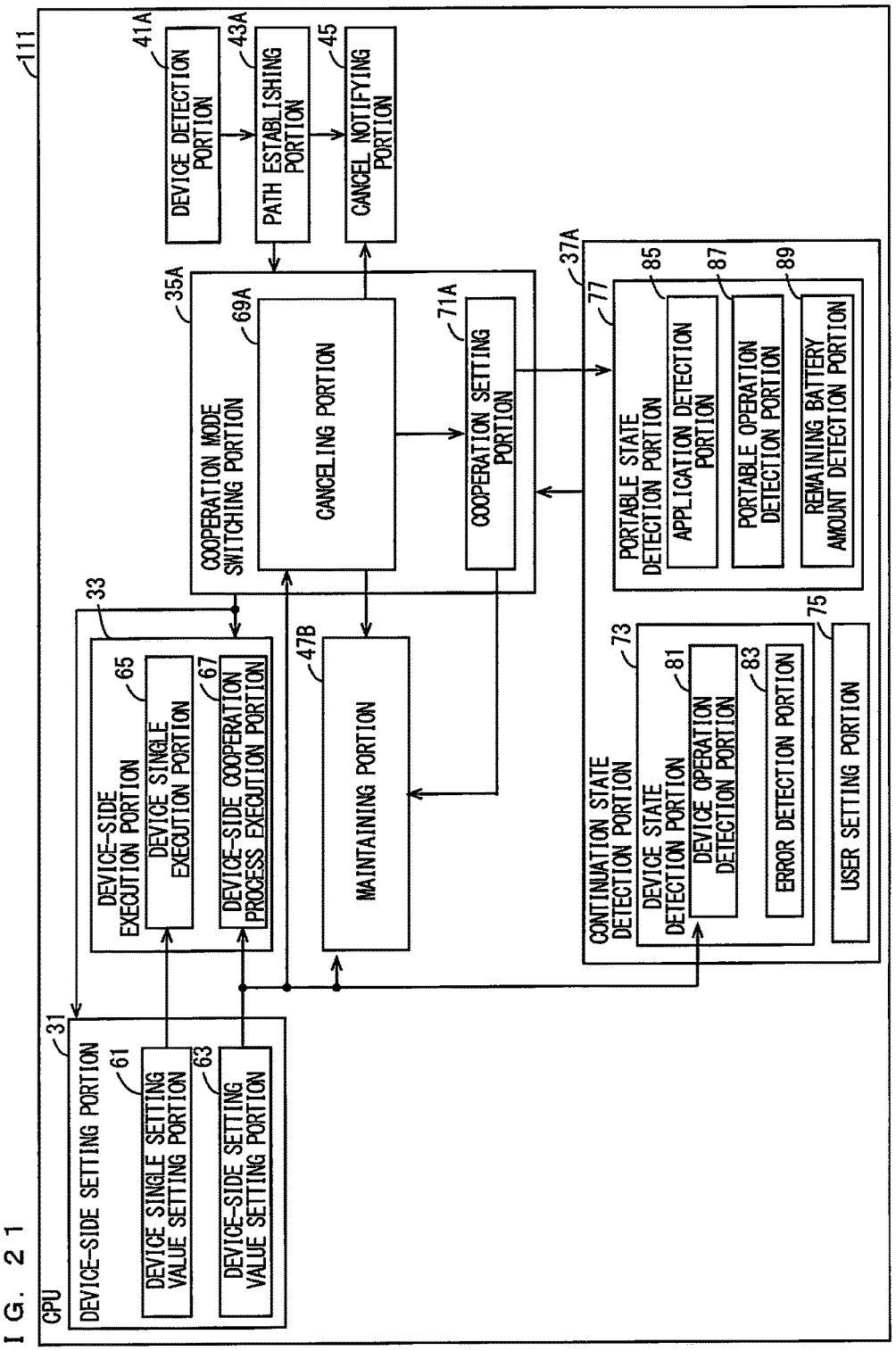
FIG. 21 is a block diagram showing one example of functions of a CPU included in an MFP in a third embodiment.

FIG. 21 is a block diagram showing one example of functions of the CPU included in the MFP in the third embodiment. Referring to FIG. 21, differences from the functions shown in FIG. 16 are that the cooperation process determining portion 49, the portable-side setting value acquiring portion 51 and the change request portion 53 are removed, and that the maintaining portion 47A is changed to a maintaining portion 47B. The other functions are the same as the functions shown in FIG. 16. A description therefore will not be repeated.

The maintaining portion 47B receives a set of the process identification information, the device-side setting value and the device identification information from the device-side setting value setting portion 63. In response to reception of a maintaining instruction from the canceling portion 69A, the maintaining portion 47B stores the process identification information and the device-side setting value that make a set with the device identification information included in the maintaining instruction in the RAM 114 in association with the device identification information.

In response to reception of a restoring instruction from the cooperation setting portion 71A, the maintaining portion 47B outputs a set of the device identification information that is the same as the device identification information included in the restoring instruction, the process identification information and the device-side setting value to the device-side setting value setting portion 63.

In the case where receiving a set of the device identification information, the process identification information and the device-side setting value from the maintaining portion 47B, the device-side setting value setting portion 63 sets the process identification information and the device-side setting value for the device-side process corresponding to the device identification information in order to maintain the setting for the cooperation process. Thus, the user A can continuously set the device-side setting value with the device-side setting value remaining unchanged since last set before the disconnection of the communication line due to detachment of the smartphone 200A from the MFP 100.

Figure 22:
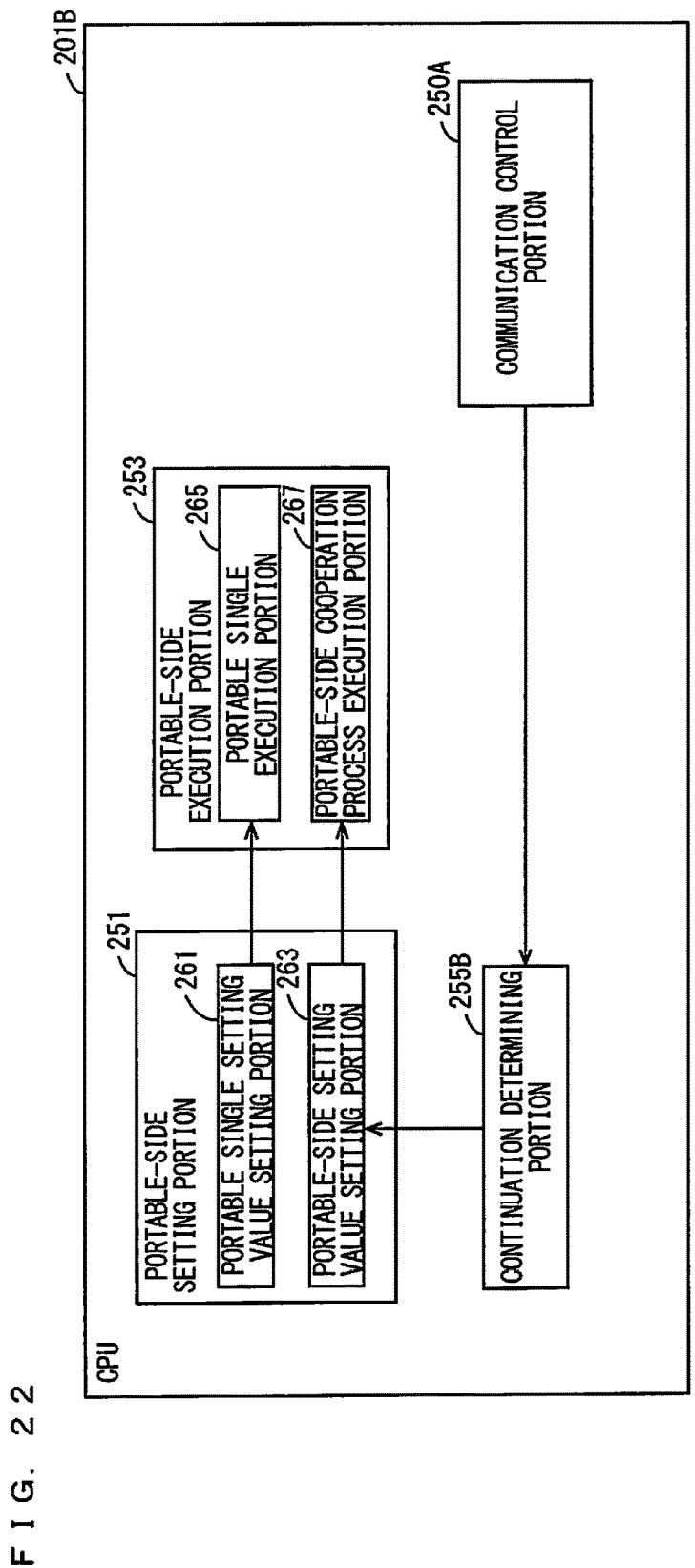
FIG. 22 is a diagram showing one example of functions of a CPU included in a smartphone in the third embodiment.

FIG. 22 is a diagram showing one example of functions of the CPU included in the smartphone in the third embodiment. Differences of the functions shown in FIG. 22 from the functions shown in FIG. 7 are that the setting value transmitting portion 257 and the change accepting portion 259 are removed, and that the continuation determining portion 255 is changed to a continuation determining portion 255B. The other functions are the same as the functions shown in FIG. 7. A description therefore will not be repeated.

When the communication control portion 250A establishes a communication path with the MFP 100A, the continuation determining portion 255B receives the device identification information and the path identification information from the communication control portion 250A. When the communication path is disconnected, the continuation determining portion 255B receives a disconnection signal including the path identification information. The continuation determining portion 255B specifies the device identification information corresponding to the path identification information included in the disconnection signal at a time point at which the disconnection signal is received. The case where the device identification information of the MFP 100A is specified is described here as an example. In the case where receiving the disconnection signal, and then receiving the device identification information of the specified MFP 100A and the path identification information from the communication control portion 250A, the continuation determining portion 255B determines that the communication path between the MFP 100A and the smartphone 200A is to be reconnected. The continuation determining portion 255B communicates with the MFP 100A, and determines whether the device-side setting value of the MFP 100A is a default value. In the case where the device-side setting value of the MFP 100A is not a default value, the continuation determining portion 255B allows the portable-side setting value setting portion 263 to continuously set the portable-side setting value. In the case where the device-side setting value of the MFP 100A is a default value, the continuation determining portion 255B allows the portable-side setting value setting portion 263 to reset the portable-side setting value. Thus, the smartphone 200A and the MFP 100A can be synchronized with each other.

Figure 23:
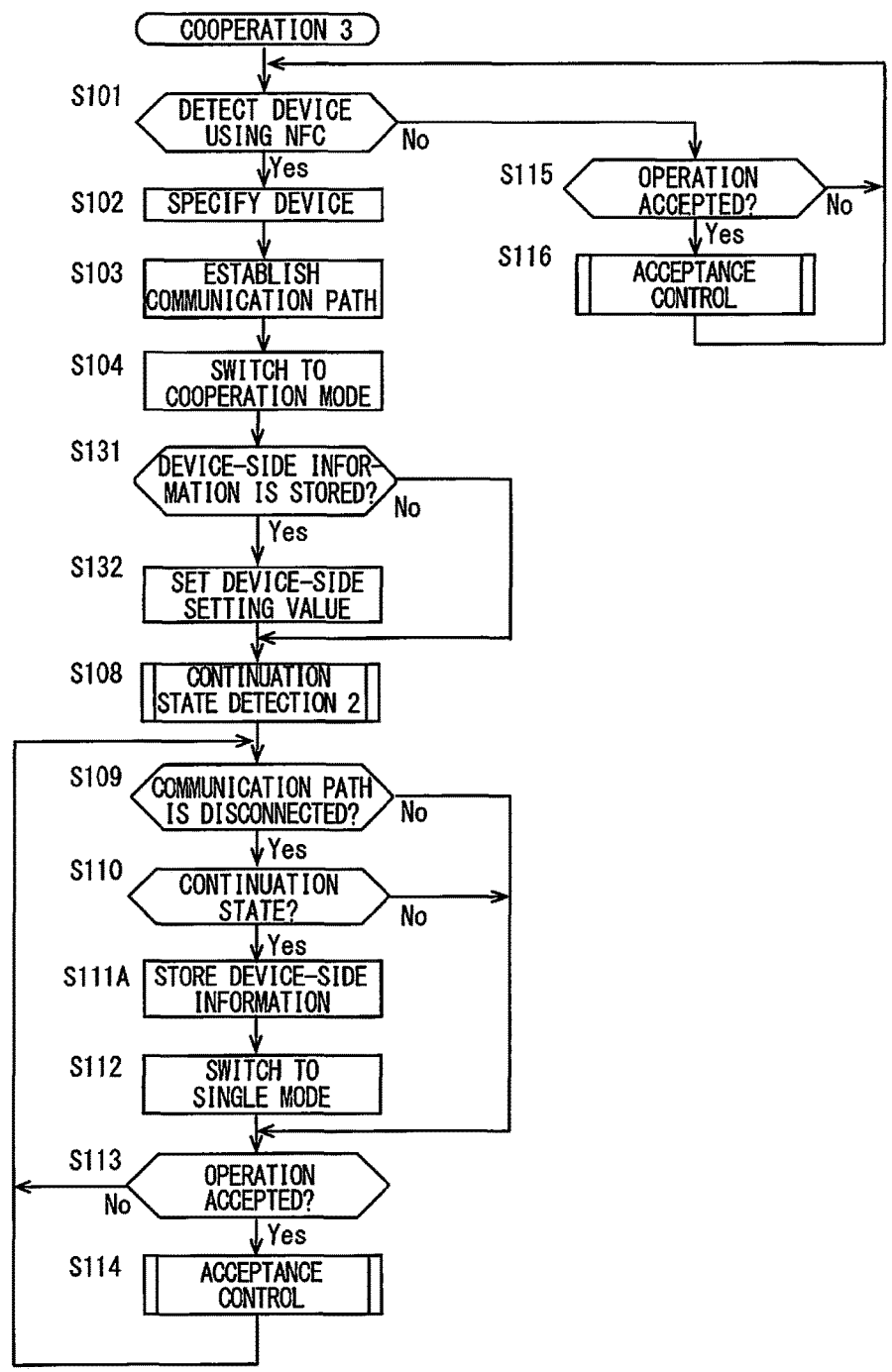
FIG. 23 is a flow chart showing one example of a flow of a cooperation process in the third embodiment.

FIG. 23 is a flow chart showing one example of a flow of a cooperation process in the third embodiment. Referring to FIG. 23, differences from the cooperation process in the second embodiment shown in FIG. 18 are that the steps S131 and S132 are performed instead of the steps S105 to S107, that the step S107 is removed, and that the step S111 is changed to the step S111A. The rest of the process is the same as the process shown in FIG. 18. A description therefore will not be repeated.

The operation mode is switched to the cooperation mode in the step S104, and then it is determined in the step S131 whether the device-side information associated with the device identification information of the device specified in the step S102 is stored in the RAM 114. The device-side information is stored in the RAM 114 in the step S111A, described below. The device-side information includes the process identification information for identifying the device-side process, and the device-side setting value used for execution of the device-side process. If the device-side information is stored, the process proceeds to the step S132. If not, the process proceeds to the step S108. The device-side information stored in the RAM 114 is set in the step S132, and the process proceeds to the step S108. In the step S111A, the device-side information set at that time point is stored in the RAM 114 in association with the device identification information of the cooperation device specified in the step S102, and the process proceeds to the step S112.

Thus, in the case where the communication path between the MFP 100A and the smartphone 200A, which is the cooperation device, is disconnected, if the continuation state is detected, the device-side information set at that time point is stored in the RAM 114 in association with the device identification information of the smartphone 200A (step S111A). Thereafter, when the communication path between the MFP 100A and the smartphone 200A is established, and a cooperation start condition is satisfied, it is determined that the connection path between the MFP 100A and the smartphone 200A is to be reconnected in the case where the cooperation mode is set. Therefore, the user can continue with an operation with the state of the MFP 100A remaining unchanged from the last state before the communication path between the MFP 100A and the smartphone 200A is disconnected. In other words, it is not necessary to repeat inputting operations that had been input until the communication path between the MFP 100A and the smartphone 200A is disconnected.

Figure 24:
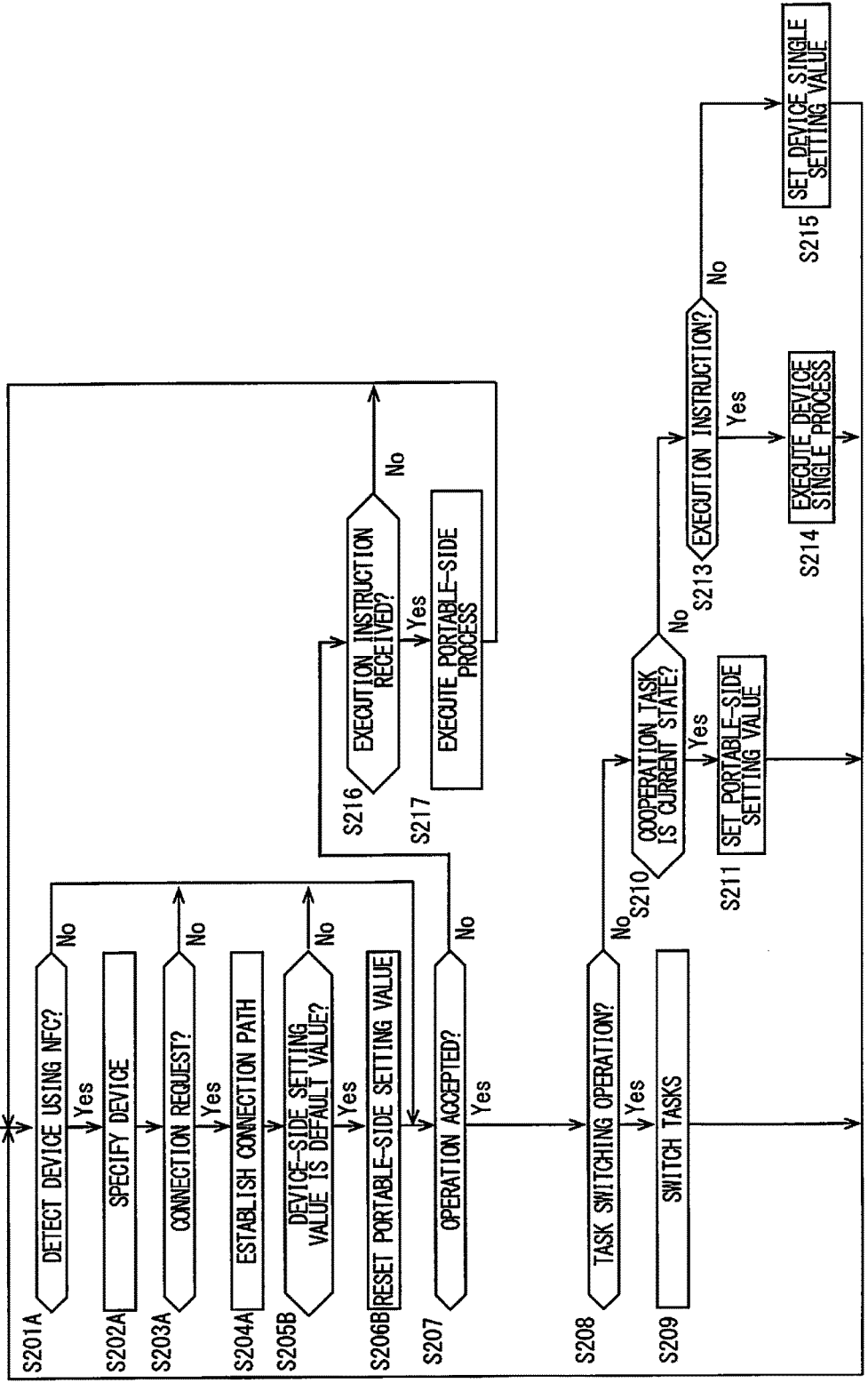
FIG. 24 is a flow chart showing one example of a flow of a portable-side cooperation process in the third embodiment.

FIG. 24 is a flow chart showing one example of a flow of a portable-side cooperation process in the third embodiment. Referring to FIG. 24, differences from the portable-side cooperation process in the second embodiment shown in FIG. 20 are that the step S205 and the step S206 are changed to the step S205B and the step S206B, respectively, and that the step S212 is removed. The rest of the process is the same as the process shown in FIG. 20. A description therefore will not be repeated.

If the communication path is established between the smartphone 200A and the MFP 100A in the step S204B, the CPU 201 determines in the next step S205B whether the device-side setting value set in the MFP 100A is a default value. The CPU 201 determines whether the device-side setting value is a default value by inquiring the MFP 100A of whether the device-side setting value is a default value. If the device-side setting value set in the MFP 100A is a default value, the process proceeds to the step S206B. If not, the process proceeds to the step S207. In the step S206B, the portable-side setting value is reset, and the process proceeds to the step S207. Specifically, the portable-side setting value is set to a default value.

In the case where the communication path between the MFP 100A and the smartphone 200A, which is the cooperation device, is disconnected, if the continuation state is detected, when the communication path between the MFP 100A and the smartphone 200A is thereafter established, and the cooperation start condition is satisfied, the device-side setting value that had been set before the disconnection of the communication path is set in the MFP 100A. In the case where the communication path between the MFP 100A and the smartphone 200A, which is the cooperation device, is disconnected, if the continuation state is not detected, when the communication path between the MFP 100A and the smartphone 200A is thereafter established, and the cooperation start condition is satisfied, the default device-side setting value is set in the MFP 100A. In contrast, the smartphone 200A can continue with the setting of the portable-side setting value after the communication path between the MFP 100A and the smartphone 200A is disconnected. However, if a default device-side setting value is set in the MFP 100A at a time point at which the communication path between the smartphone 200A and the MFP 100A is reconnected after being disconnected, the portable-side setting value is reset. If the device-side setting value that is not a default value is set in the MFP 100A at a time point at which the communication path between the smartphone 200A and the MFP 110A is reconnected after being disconnected, the portable-side setting value is not reset. Thus, the device-side setting value set in the MFP 100A and the portable-side setting value set in the smartphone 200A can be synchronized with each other.

<Fourth Embodiment>

In the cooperation system 1A in the fourth embodiment, similarly to the MFP 100A in the third embodiment, the MFP 100A does not acquire the portable-side information from the smartphone 200A, and the MFP 100A and the smartphone 200A are both in the continuation state. As for the cooperation system 1A in the fourth embodiment, differences from the cooperation system in the third embodiment will be mainly described below.

The entire configuration of the cooperation system 1A in the fourth embodiment is the same as the entire configuration of the cooperation system in the second embodiment shown in FIG. 14. The hardware configuration of the MFP 100A in the fourth embodiment is the same as the hardware configuration of the MFP 100A in the second embodiment shown in FIG. 15. The hardware configuration of the smartphone 200A in the fourth embodiment is the same as the hardware configuration of the smartphone 200A in the first embodiment shown in FIG. 3. A description therefore will not be repeated.

Figure 25:
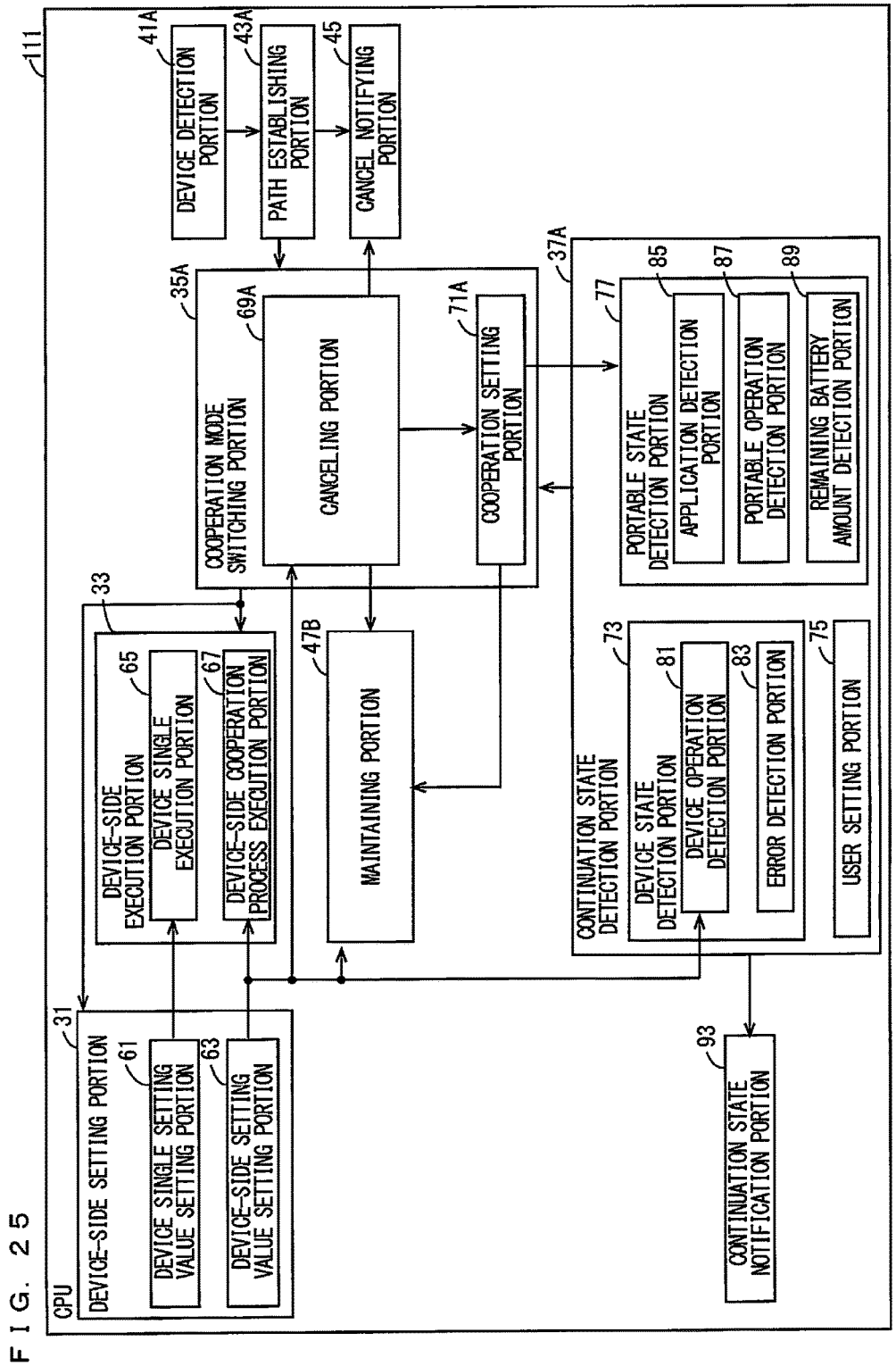
FIG. 25 is a block diagram showing one example of functions of a CPU included in an MFP in a fourth embodiment.

FIG. 25 is a block diagram showing one example of the functions of the CPU included in the MFP in the fourth embodiment. Referring to FIG. 25, a difference from the functions shown in FIG. 21 is that a continuation state notifying portion 93 is added. The other functions are the same as the functions shown in FIG. 21. A description therefore will not be repeated.

The continuation state notifying portion 93 transmits a continuation signal output by the continuation state detection portion 37A to the smartphone 200A through the communication path established by the path establishing portion 43A.

Figure 26:
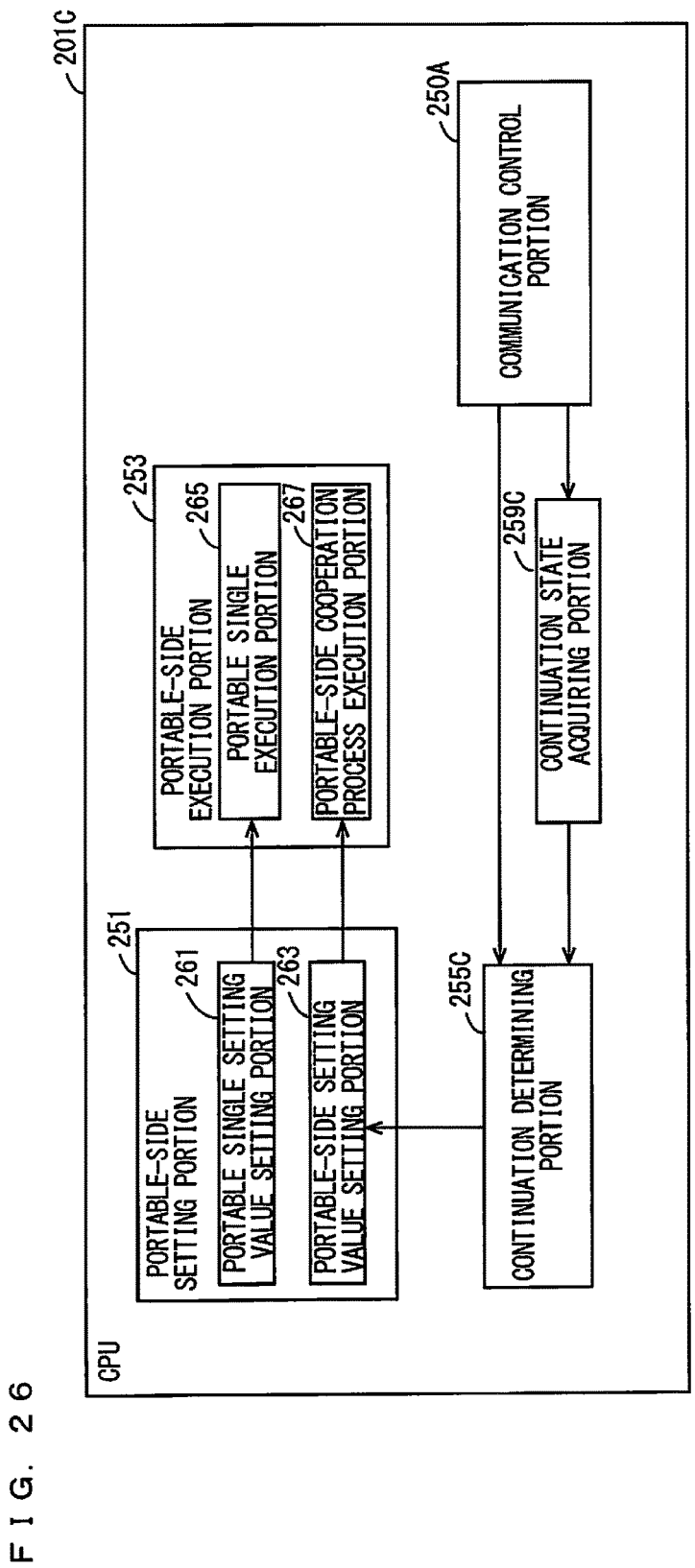
FIG. 26 is a diagram showing one example of functions of the CPU included in the smartphone in the fourth embodiment.

FIG. 26 is a diagram showing one example of the functions of the CPU included in the smartphone in the fourth embodiment. Differences of the functions shown in FIG. 26 are different from the functions shown in FIG. 22 in that a continuation state acquiring portion 259C is added, and that the continuation determining portion 255B is changed to a continuation determining portion 255C. The other functions are the same as the functions shown in FIG. 22. A description therefore will not be repeated.

When the communication control portion 250A establishes a communication path with the MFP 100A, the continuation state acquiring portion 259C receives the device identification information and the path identification information of the MFP 100A from the communication control portion 250A. When the communication path is disconnected, the continuation state acquiring portion 259C receives a disconnection signal including the path identification information. The continuation state acquiring portion 259C receives a continuation signal from the MFP 100 through a communication path specified by the path identification information from the time when the device identification information of the MFP 100 is received until the time when the disconnection signal including the path identification information that makes a set with the device identification information is received. The continuation state acquiring portion 259C outputs a continuation signal to the continuation determining portion 255C.

When the communication control portion 250 establishes a communication path with the MFP 100A, the continuation determining portion 255C receives the device identification information of the MFP 100A and the path identification information from the communication control portion 250. When the communication path is disconnected, the continuation determining portion 255C receives a disconnection signal including the path identification information. In the case where a continuation signal received from the continuation state acquiring portion 259C indicates the continuation state immediately before the disconnection signal is received after the device identification information of the MFP 100 is received, the continuation determining portion 255C allows the portable-side setting value setting portion 263 to continue setting the portable-side setting value. Further, in the case where a continuation signal indicating the continuation state is not received from the continuation state acquiring portion 259C immediately before the disconnection signal is received after the device identification information of the MFP 100 is received, the continuation determining portion 255C allows the portable-side setting value setting portion 263 to reset the portable-side setting value. Thus, the smartphone 200A and the MFP 100A can be synchronized with each other.

The smartphone 200A may have a function similar to that of the continuation state detection portion 37A, which is a function of the MFP 100A, instead of the continuation state acquiring portion 259C.

Figure 27:
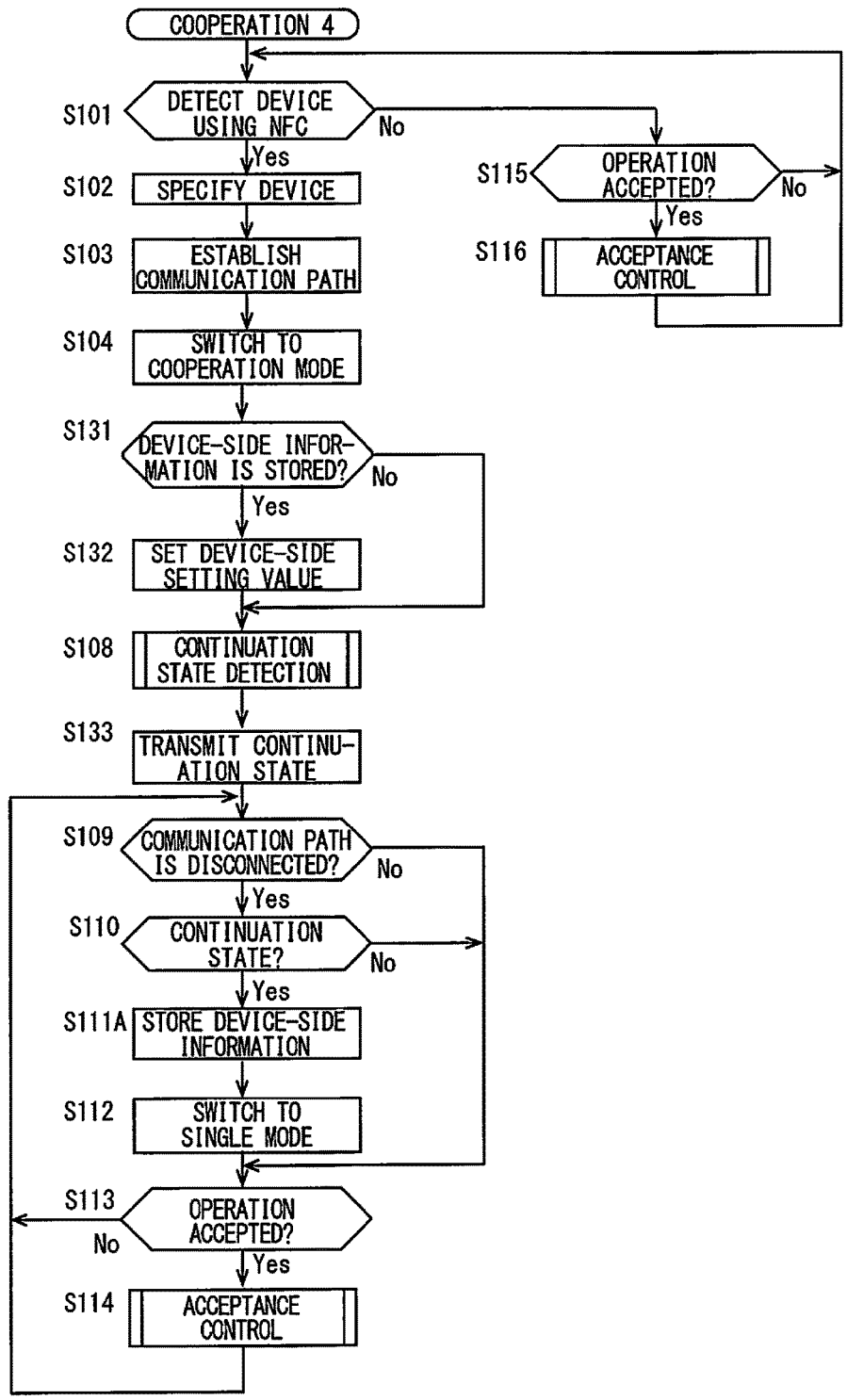
FIG. 27 is a flow chart showing one example of a flow of a cooperation process in the fourth embodiment.

FIG. 27 is a flow chart showing one example of a flow of a cooperation process in the fourth embodiment. Referring to FIG. 27, differences from the cooperation process in the third embodiment shown in FIG. 23 is that the step S133 is added between the step S108 and S109. The rest of the process is the same as the process shown in FIG. 23. A description therefore will not be repeated.

In the step S133, the continuation state detected by the continuation state detection process executed in the step S108 is transmitted to the smartphone 200A through the communication path established in the step S103.

Figure 28:
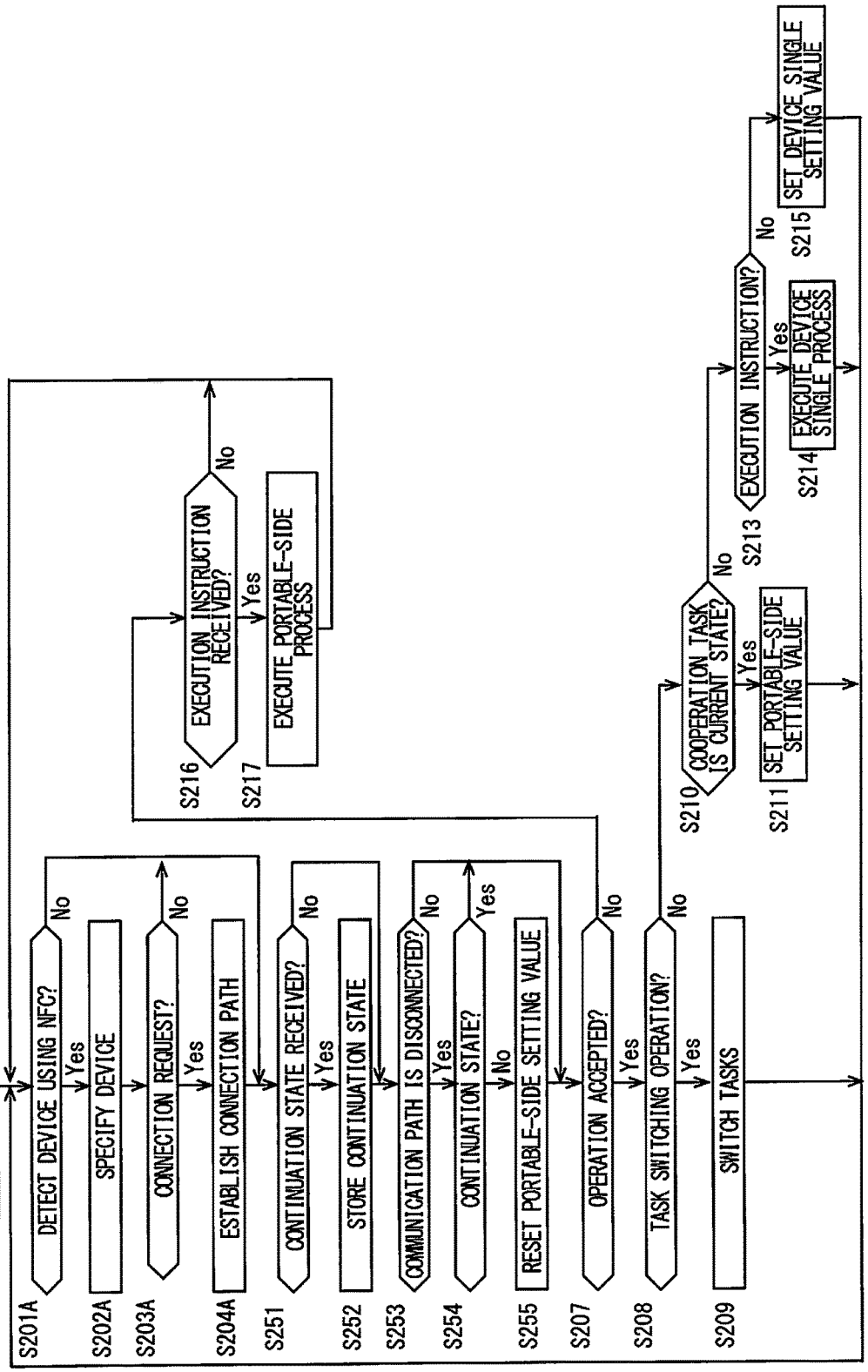
FIG. 28 is a flow chart showing one example of a flow of a portable-side cooperation process in the fourth embodiment.

FIG. 28 is a flow chart showing one example of a flow of a portable-side cooperation process in the fourth embodiment. Referring to FIG. 28, differences from the portable-side cooperation process in the second embodiment shown in FIG. 20 are that the steps S251 to S255 are performed instead of the steps S205 and the S206, and that the step S212 is removed. The rest of the process is the same as the process shown in FIG. 20. A description therefore will not be repeated.

In the case where the short-range communication unit 119 in the CPU 201 does not detect a device in the step S201A, the process proceeds to the step S251. In the case where the communication path is established between the smartphone and the MFP 100A in the step S204A, it is determined in the next step S251 whether the continuation state has been received from the MFP 100A. If the continuation state has been received, the process proceeds to the step S252. If not, the process proceeds to the step S253. In the step S252, the received continuation state is temporarily stored, and the process proceeds to the step S253.

In the step S253, it is determined whether the communication path established in the step S204A has been disconnected. If the communication path has been disconnected, the process proceeds to the step S254. If not, the process proceeds to the step S207. In the step S254, it is determined whether the continuation state is stored in the step S252. If the continuation state is stored, the process proceeds to the step S207. If not, the process proceeds to the step S255. In the step S255, the portable-side setting value is reset, and the process proceeds to the step S207.

In the MFP 100A, in the case where the communication path to the smartphone 200A, which is the cooperation device, is disconnected, if the continuation state is detected, the device-side information set at that time point is stored in the RAM 114 (the step S111A of FIG. 27). Thereafter, when the communication path between the MFP 100A and the smartphone 200A is established, and the cooperation start condition is satisfied, the operation mode is switched to the cooperation mode, and the device-side setting value stored in the RAM 114 is set (the step S132 of FIG. 27). Therefore, the user can continue with an operation with the MFP 100A in a state that has remained unchanged from the last state before the communication path to the smartphone 200A had been disconnected. In other words, it is not necessary to repeatedly input operations that had been input until the communication path between the MFP 100A and the smartphone 200A is disconnected.

On the other hand, in the MFP 100A, in the case where the communication path to the smartphone 200A, which is the cooperation device, is disconnected, if the continuation state is not detected, when the communication path between the MFP 100A and the smartphone 200A is thereafter established, and the cooperation start condition is satisfied, the operation mode is set to the cooperation mode. However, the default device-side setting value is set.

In contrast, the smartphone 200A receives the continuation state from the MFP 100A. In the case where the communication path between the smartphone 200A and the MFP 100A is disconnected, if the continuation state has been received (YES in the step S254 of FIG. 28), the smartphone 200A maintains the portable-side setting value. If the continuation state has not been received (NO in the step S254 of FIG. 28), the smartphone 200A resets the portable-side setting value. Thus, the device-side setting value set in the MFP 100A and the portable-side setting value set in the smartphone 200A can be synchronized with each other.

Although embodiments of the present invention have been described and illustrated in detail, it is clearly understood that the same is by way of illustration and example only and not limitation, the scope of the present invention should be interpreted by terms of the appended claims.

What is claimed is:

1. An information processing apparatus comprising:
a display that displays an image;
a position detector that detects a position with which an object has been in contact in a display surface of the display; and
a hardware processor, wherein
the hardware processor,
in response to detection by the position detector of the position with which the object has been in contact, detects a portable device,
establishes a communication path with the portable device,
detects a continuation state based on a state of the portable device or a state of the information processing apparatus,
in the case where the communication path is established with the portable device, and the hardware processor detects the portable device, switches from a single mode to a cooperation mode,
the single mode being an operation mode in which the information processing apparatus is not in cooperation with the portable device, and the cooperation mode being an operation mode in which the information processing apparatus is in cooperation with the portable device,
in the case where the hardware processor no longer detects the portable device in the cooperation mode, if the continuation state is detected, maintains the cooperation mode, and
in the case where the hardware processor no longer detects the portable device in the cooperation mode, if the continuation state is not detected, switches from the cooperation mode to the single mode.

2. The information processing apparatus according to claim 1, wherein
the hardware processor,
in response to the detection of the position with which the object has been in contact by the position detector, further accepts an operation by a user,
in the cooperation mode, in accordance with the accepted operation, further sets a device-side setting value used for execution of a device-side process defined as a process, executed by the information processing apparatus, of a cooperation process defining a series of a plurality of processes executed by the information processing apparatus and the portable device that are in cooperation with each other,
in the single mode, in accordance with the accepted operation, further sets a device single setting value used for execution of a device single process different from the device-side process,
further executes the device-side process in the cooperation mode in accordance with the device-side setting value in cooperation with the portable device,
further executes the device single process in the single mode in accordance with the device single setting value,
in the cooperation mode after the portable device is no longer detected, in the case where the communication, path established with the portable device is disconnected, further stores the device-side setting value set in association with the portable device,
in the case where the communication path established with the portable device during the cooperation mode is disconnected, further switches from the cooperation mode to the single mode,
in the case where the operation mode is switched from the single mode to the cooperation mode, if the device-side setting value associated with the portable device is stored, further restarts setting of the device-side setting value, and
in the case where the operation mode is switched from the single mode to the cooperation mode, if the device-side setting value associated with the portable device is not stored, further sets the device-side setting value from its beginning.

3. The information processing apparatus according to claim 1, wherein
the hardware processor, in the case where the portable device is executing a predetermined application program, detects the continuation state.

4. The information processing apparatus according to claim 3, wherein
the predetermined application program is an application program different from an application program for execution of a process in cooperation with information processing apparatus.

5. The information processing apparatus according to claim 1, wherein
the hardware processor, in the case where a predetermined time period has not elapsed since a portable-slide setting value used for execution of a portable-side process defined as a process, executed by the portable device, of a cooperation process, is accepted in the portable device, detects the continuation state.

6. The information processing apparatus according to claim 1, wherein
the hardware processor, in the case where a predetermined time period has not elapsed since a device-side setting value is accepted, detects the continuation state.

7. The information processing apparatus according to claim 1, wherein
the hardware processor, in the case where a defect pf a hardware resource occurs, detects the continuation state.

8. The information processing apparatus according to claim 1, wherein
the hardware processor, in the case where a remaining amount of battery that has power for driving the portable device is equal to or less than a predetermined value, detects the continuation state.

9. A cooperation system that includes the information processing apparatus according to claim 1 and a portable device carried by a user,
the portable device comprising portable-side hardware processor, wherein
the portable-side hardware processor
accepts an operation by the user,
in accordance with the accepted operation, sets a portable-side setting value used for execution of a portable-side process defined as a process, executed by the portable device, of a cooperation process, or a portable single setting value used for execution of a portable single process other than the portable-side process, in the case where the information processing apparatus is in any one of the single mode and the cooperation mode, executes the portable single process, and in the case where the information processing apparatus is in the cooperation mode, executes the portable -side process in cooperation with the information processing apparatus.

10. The cooperation system according to claim 9, wherein the hardware processor of the information processing apparatus, in the case where a communication path is established between the information processing apparatus and the portable device at a time point at which the operation mode is switched from the cooperation mode to the single mode, further notifies the portable device of the switch to the single mode, and the portable-side hardware processor, in the case where the portable device is notified of the switch to the single mode by the information processing apparatus, deletes the portable-side setting value.

11. The cooperation system according to claim 9, wherein the hardware processor of the information processing apparatus further transmits the detected continuation state to the portable device, and the portable-side hardware processor, in the case where notification of the continuation state is not made at a time point at which the communication path between the information processing apparatus and the portable device is disconnected, deletes the portable-side setting value.

12. The cooperation system according to claim 9, wherein the hardware processor of the information processing apparatus, in the case where the operation mode is switched from the single mode to the cooperation mode, further transmits a continuation signal, which indicates whether a device-side setting piton restarts setting of the device-side setting value, to the portable device, and the portable-side hardware processor, in response to reception of a continuation signal, which indicates that the setting of the device-side setting value is not to be restarted, from the information processing apparatus, deletes the portable-side setting value, and in the case where a continuation signal, which indicates that the setting of the device-sift setting value is to be restarted, is received from the information processing apparatus, does not delete the portable-side setting value.

13. The cooperation system according to claim 9, wherein the hardware processor of the information processing, apparatus further acquires the set portable-side setting value from the portable device each time the portably-side setting value is set, and further stores the acquired portable-side setting value in association with the portable device, the portable-side hardware processor, in the case where the operation mode is switched from the single mode to the cooperation mode, if setting of a device-side, setting value is restarted, further transmits the portable-side setting value to the portable device, in the case where the portable-side setting value is rived from the information processing apparatus after the communication path is established between the information processing apparatus and the portable device, sets the received portable-side setting value as a portable-side setting value, and in the case where the portable-side setting value is not received from the information processing apparatus after the communication path is established between the information processing apparatus and the portable device, sets the portable-side setting value from its beginning.

14. An information processing apparatus comprising a hardware processor, wherein the hardware processor establishes a communication path with a portable device, accepts an operation by a user, detects a continuation state based on a state of the portable device or a state of the information processing apparatus, in response to satisfaction of a cooperation start condition corresponding to the portable device, switches from a single mode to a cooperation mode, the single mode being an operation mode in which the information processing apparatus is not in cooperation with the portable device, and the cooperation mode being an operation mode in which the information processing apparatus is in cooperation with the portable device, in response to satisfaction of a predetermined cooperation end condition for ending the cooperation mode, switches from the cooperation mode to the single mode, in the cooperation mode, sets a device-side setting value used for execution of a device-side process defined as a process, executed by the information processing apparatus, of a cooperation process defining a series of a plurality of processes executed by the information processing apparatus and the portable device that are in cooperation with each other, in the single Mode, sets a device single setting value used for execution of a device single process different from the device-side process in accordance with the accepted operation, in the cooperation mode executes the device -side process in accordance with the device-side setting value in cooperation with the portable device, in the single mode, executes the device single process in accordance with the device single setting value, in the case where the cooperation end condition includes disconnection of a communication path established with the portable device, and the continuation state is detected in a stage where the operation mode is switched from the cooperation mode to the single mode, in response to the disconnection of the communication path established with the portable device, stores the device-side setting value set in association with the portable device, in the case where the operation mode is switched from the single mode to the cooperation mode, if the devices-side setting value associated with the portable device is stored, restarts setting of the deice -side setting value associated with the portable device, and in the case where the operation mode is switched from the single mode to the cooperation mode, if the device-side setting value associated with the portable device is not stored, sets the device-side setting value from its beginning.

15. A cooperation system that includes the information processing apparatus according to claim 3 and the portable device carried by the user, the portable device comprising a portable-side hardware processor, wherein the portable-side hardware processor
accepts an operation by the user, in accordance with the accepted operation, sets a portable-side setting value used for execution of a portable side process defined as a process, executed by the portable device, of a cooperation process or a portable single setting value used for execution of a portable single process other than the portable-side process,
in the case where the information processing apparatus is in any one of the single mode end the cooperation mode, executes the portable single process, and
in the case where the information processing apparatus is in the cooperation mode, executes the portable-side process in cooperation with the information processing apparatus.

16. A cooperation method performed in an information processing apparatus,
the information processing apparatus comprising:
a display that displays an image; and
a position detector that detects a position whit which an object has been in contact in display surface of the display, and
the cooperation method causing the information processing apparatus to, in response to detection by the position detector of the position with which an object has been in contact, delete a portable device,
established a communication path with the portable device,
detect a continuation state based on a state of portable device or state of the information processing apparatus,
in the case where the communication path is established with the portable device, and the portable device is detected, switch from a single mode to a cooperation mode,
the single mode being an operation mode in which the information process apparatus is not in cooperation with the portable device, and the cooperation mode being an operation mode in which the information processing apparatus is in cooperation with the portable device,
in the case where the portable device is no longer detected during the cooperation mode, if the continuation stat is detected, maintain the cooperation mode, and
in the case where the portable device is no longer detected during the cooperation mode, if the continuation state is not detected, switch from the cooperation mode to the single mode.

17. A non-transitory computer-readable recording medium encoded with a cooperation program, wherein
the cooperation program causes a computer, which controls the information processing apparatus, to perform the cooperation method according to claim 16.

18. A cooperation method for causing an information processing apparatus to establish a communication path with a portable device,
accept an operation by a user,
detect a continuation state based on a state of the portable device or a state of the information processing apparatus,
in response to satisfaction of a cooperation start condition corresponding to the portable device, switch from a single mode to a cooperation mode,
the single mode being an operation mode in which the information processing apparatus is not in cooperation with the portable device, and the cooperation mode being an operation mode in which the information processing apparatus is in cooperation with the portable device,
in response to satisfaction of a predetermined cooperation end condition for ending the cooperation mode, switch from the cooperation mode to the single mode,
in the cooperation mode, set a device-side setting value used for execution of a device-side process defined as a process, executed by the information processing apparatus, of a cooperation process defining a series of a plurality of processes executed by the information processing apparatus and the portable device that are in cooperation with each other, and
in the single mode, set a device single setting value used to execution of a device single process different from the device-side process in accordance with an accepted operation,
in the cooperation mode, execute the device-side process in accordance with the device-side setting value in cooperation with the portable device,
in the single mode, execute the device single process in accordance with the device single setting value,
in the case where the cooperation end condition includes disconnection of a communication path established with the portable device, and the continuation state is detected in a stage where the operation mode is switched from the cooperation mode to the single mode in response to the disconnection of the communication path established with the portable device, store the device-side setting value set in association with the portable device,
in the case where the operation mode is switched from the single mode to the cooperation mode if the device-side setting value associated with The portable device is stored, restart setting of the device-side setting value associated with the portable device, and
in the case where the operation mode is switched from the single mode to the cooperation mode, if the device-side setting value associated with the portable device is not stored, set a device-side setting value from its beginning.

19. A non-transitory computer-readable recording medium encoded with a cooperation program, wherein
the cooperation program causes a computer, which controls the information processing apparatus, to perform the cooperation method according to claim 18.

* * * * *